(12) United States Patent
Richter et al.

(10) Patent No.: US 8,725,654 B2
(45) Date of Patent: *May 13, 2014

(54) MANAGING CONSISTENT INTERFACES FOR EMPLOYEE DATA REPLICATION BUSINESS OBJECTS ACROSS HETEROGENEOUS SYSTEMS

(75) Inventors: Matthias Richter, Sinsheim (DE); Thomas Moser, Wiesloch (DE)

(73) Assignee: SAP AG, Walldorf (DE)

( * ) Notice: Subject to any disclaimer, the term of this patent is extended or adjusted under 35 U.S.C. 154(b) by 129 days.

This patent is subject to a terminal disclaimer.

(21) Appl. No.: 13/192,548

(22) Filed: Jul. 28, 2011

(65) Prior Publication Data

US 2013/0031014 A1    Jan. 31, 2013

(51) Int. Cl.
G06Q 10/00 (2012.01)
G06F 15/02 (2006.01)

(52) U.S. Cl.
USPC .............................. 705/320; 705/7.11; 705/32

(58) Field of Classification Search
USPC .................................. 705/1.1, 7.11, 32, 320
See application file for complete search history.

(56) References Cited

U.S. PATENT DOCUMENTS

| | | |
|---|---|---|
| 3,223,321 A | 12/1965 | Baumgartner |
| 5,126,936 A | 6/1992 | Champion et al. |
| 5,210,686 A | 5/1993 | Jernigan |
| 5,247,575 A | 9/1993 | Sprague et al. |
| 5,255,181 A | 10/1993 | Chapman et al. |
| 5,321,605 A | 6/1994 | Chapman et al. |
| 5,463,555 A | 10/1995 | Ward et al. |
| 5,627,764 A | 5/1997 | Schutzman et al. |
| 5,717,925 A | 2/1998 | Harper et al. |
| 5,787,237 A | 7/1998 | Reilly |
| 5,812,987 A | 9/1998 | Luskin et al. |
| 5,966,695 A | 10/1999 | Melchione et al. |
| 5,970,465 A | 10/1999 | Dietrich et al. |
| 5,970,475 A | 10/1999 | Barnes et al. |
| 5,983,284 A | 11/1999 | Argade |
| 6,044,134 A | 3/2000 | De La Huerga |
| 6,047,264 A | 4/2000 | Fisher et al. |
| 6,058,378 A | 5/2000 | Clark et al. |
| 6,073,137 A | 6/2000 | Brown et al. |

(Continued)

FOREIGN PATENT DOCUMENTS

| | | |
|---|---|---|
| CN | 1501296 | 6/2004 |
| CN | 1609866 | 4/2005 |

(Continued)

OTHER PUBLICATIONS

SAP Structured Entity Relationship Model (SAP-SERM) for R/3 System Release 4.0 Introduction and Index; Dec. 1998; 26 pages.

(Continued)

*Primary Examiner* — Lynda Jasmin
*Assistant Examiner* — Sangeeta Bahl
(74) *Attorney, Agent, or Firm* — Fish & Richardson P.C.

(57) ABSTRACT

A business object model, which reflects data that is used during a given business transaction, is utilized to generate interfaces. This business object model facilitates commercial transactions by providing consistent interfaces that are suitable for use across industries, across businesses, and across different departments within a business during a business transaction. In some operations, software creates, updates, or otherwise processes information related to an employee master data replication request and/or an organizational center replication request business object.

6 Claims, 53 Drawing Sheets

(56) References Cited

U.S. PATENT DOCUMENTS

| | | |
|---|---|---|
| 6,092,196 A | 7/2000 | Reiche |
| 6,104,393 A | 8/2000 | Santos-Gomez |
| 6,115,690 A | 9/2000 | Wong |
| 6,125,391 A | 9/2000 | Meltzer et al. |
| 6,138,118 A | 10/2000 | Koppstein et al. |
| 6,154,732 A | 11/2000 | Tarbox |
| 6,222,533 B1 | 4/2001 | Notani et al. |
| 6,226,675 B1 | 5/2001 | Meltzer et al. |
| 6,229,551 B1 | 5/2001 | Huang |
| 6,295,548 B1 | 9/2001 | Klein et al. |
| 6,308,163 B1 | 10/2001 | Du et al. |
| 6,311,165 B1 | 10/2001 | Coutts et al. |
| 6,327,700 B1 | 12/2001 | Chen et al. |
| 6,331,972 B1 | 12/2001 | Harris et al. |
| 6,332,163 B1 | 12/2001 | Bowman-Amuah |
| 6,374,252 B1 | 4/2002 | Althoff et al. |
| 6,375,252 B1 | 4/2002 | Cheron et al. |
| 6,401,101 B1 | 6/2002 | Britton et al. |
| 6,424,979 B1 | 7/2002 | Livingston et al. |
| 6,434,159 B1 | 8/2002 | Woodward et al. |
| 6,438,594 B1 | 8/2002 | Bowman-Amuah |
| 6,442,620 B1 | 8/2002 | Thatte et al. |
| 6,446,136 B1 | 9/2002 | Pohlmann et al. |
| 6,457,041 B1 | 9/2002 | Hutchison |
| 6,496,825 B1 | 12/2002 | Klein et al. |
| 6,513,019 B2 | 1/2003 | Lewis |
| 6,523,027 B1 | 2/2003 | Underwood |
| 6,542,912 B2 | 4/2003 | Meltzer et al. |
| 6,591,260 B1 | 7/2003 | Schwarzhoff et al. |
| 6,643,660 B1 | 11/2003 | Miller et al. |
| 6,725,122 B2 | 4/2004 | Mori et al. |
| 6,738,747 B1 | 5/2004 | Tanaka et al. |
| 6,745,229 B1 | 6/2004 | Gobin et al. |
| 6,763,353 B2 | 7/2004 | Li et al. |
| 6,775,647 B1 | 8/2004 | Evans et al. |
| 6,868,370 B1 | 3/2005 | Burbridge et al. |
| 6,937,992 B1 | 8/2005 | Benda et al. |
| 6,957,230 B2 | 10/2005 | Cameron et al. |
| 6,970,844 B1 | 11/2005 | Bierenbaum |
| 7,020,594 B1 | 3/2006 | Chacon |
| 7,039,606 B2 | 5/2006 | Hoffman et al. |
| 7,055,132 B2 | 5/2006 | Bogdan et al. |
| 7,069,278 B2 | 6/2006 | Telkowski |
| 7,076,449 B2 | 7/2006 | Tsunenari et al. |
| 7,131,069 B1 | 10/2006 | Rush et al. |
| 7,206,768 B1 | 4/2007 | deGroeve et al. |
| 7,249,157 B2 | 7/2007 | Stewart et al. |
| 7,249,195 B2 | 7/2007 | Panec et al. |
| 7,269,569 B2 | 9/2007 | Spira et al. |
| 7,292,965 B1 | 11/2007 | Mehta et al. |
| 7,321,864 B1 | 1/2008 | Gendler |
| 7,363,271 B2 | 4/2008 | Morimoto |
| 7,379,931 B2 | 5/2008 | Morinville |
| 7,383,990 B2 | 6/2008 | Veit |
| 7,406,358 B2 | 7/2008 | Preiss |
| 7,426,520 B2 | 9/2008 | Gorelik et al. |
| 7,451,177 B1 | 11/2008 | Johnson et al. |
| 7,454,362 B1 | 11/2008 | Hayes et al. |
| 7,481,367 B2 | 1/2009 | Fees et al. |
| 7,509,278 B2 | 3/2009 | Jones |
| 7,515,697 B2 | 4/2009 | Eng et al. |
| 7,516,088 B2 | 4/2009 | Johnson et al. |
| 7,523,466 B2 | 4/2009 | DeAngelis |
| 7,536,697 B2 | 5/2009 | Wiseman et al. |
| 7,574,383 B1 | 8/2009 | Parasnis et al. |
| 7,617,128 B2 | 11/2009 | Greak |
| 7,617,328 B2 | 11/2009 | Lewis et al. |
| 7,627,504 B2 | 12/2009 | Brady et al. |
| 7,634,482 B2 | 12/2009 | Mukherjee et al. |
| 7,641,110 B2 | 1/2010 | Hursta et al. |
| 7,657,466 B2 | 2/2010 | Klingenberg et al. |
| 7,689,711 B2 | 3/2010 | Brouk et al. |
| 7,788,319 B2 | 8/2010 | Schmidt et al. |
| 7,797,204 B2 | 9/2010 | Balent |
| 7,805,383 B2 | 9/2010 | Veit et al. |
| 7,813,949 B2 | 10/2010 | Grendel et al. |
| 7,853,491 B2 | 12/2010 | Wittmer et al. |
| 7,865,426 B2 | 1/2011 | Volpert |
| 7,873,965 B2 | 1/2011 | Hayton et al. |
| 7,895,209 B2 | 2/2011 | Spence et al. |
| 7,941,236 B2 | 5/2011 | Spearman |
| 7,962,385 B2 | 6/2011 | Falk et al. |
| 8,010,376 B2 | 8/2011 | Buchmann et al. |
| 8,082,243 B2 | 12/2011 | Gorelik et al. |
| 8,104,681 B2 | 1/2012 | Eisenson |
| 8,127,035 B1 | 2/2012 | Hood et al. |
| 8,150,798 B2 | 4/2012 | Ma et al. |
| 8,185,430 B2 | 5/2012 | Edwards et al. |
| 8,219,444 B2 | 7/2012 | Zuerl et al. |
| 8,234,375 B2 | 7/2012 | Ghadialy et al. |
| 8,326,795 B2 | 12/2012 | Markovic |
| RE43,905 E | 1/2013 | Bierenbaum |
| 8,370,272 B2 | 2/2013 | Wicket et al. |
| 8,396,749 B2 | 3/2013 | Koegler et al. |
| 8,396,751 B2 | 3/2013 | Becker et al. |
| 8,423,428 B2 | 4/2013 | Grendel et al. |
| 8,433,585 B2 | 4/2013 | Sr et al. |
| 8,463,666 B2 | 6/2013 | Dorais et al. |
| 8,473,317 B2 | 6/2013 | Santoso et al. |
| 2001/0042032 A1 | 11/2001 | Crawshaw et al. |
| 2001/0047372 A1 | 11/2001 | Gorelik et al. |
| 2002/0013721 A1 | 1/2002 | Dabbiere et al. |
| 2002/0026394 A1 | 2/2002 | Savage et al. |
| 2002/0046053 A1 | 4/2002 | Hare et al. |
| 2002/0052754 A1 | 5/2002 | Joyce et al. |
| 2002/0065680 A1 | 5/2002 | Kojima et al. |
| 2002/0072988 A1 | 6/2002 | Aram |
| 2002/0087481 A1 | 7/2002 | Harif |
| 2002/0087483 A1 | 7/2002 | Harif |
| 2002/0099634 A1 | 7/2002 | Coutts et al. |
| 2002/0107765 A1 | 8/2002 | Walker |
| 2002/0112171 A1 | 8/2002 | Ginter et al. |
| 2002/0138318 A1 | 9/2002 | Ellis et al. |
| 2002/0147668 A1 | 10/2002 | Smith et al. |
| 2002/0152104 A1 | 10/2002 | Ojha et al. |
| 2002/0152145 A1 | 10/2002 | Wanta et al. |
| 2002/0156693 A1 | 10/2002 | Stewart et al. |
| 2002/0156930 A1 | 10/2002 | Velasquez |
| 2002/0157017 A1 | 10/2002 | Mi et al. |
| 2002/0169657 A1 | 11/2002 | Singh et al. |
| 2002/0184070 A1 | 12/2002 | Chen et al. |
| 2002/0186876 A1 | 12/2002 | Jones et al. |
| 2002/0194045 A1 | 12/2002 | Shay et al. |
| 2003/0004799 A1 | 1/2003 | Kish |
| 2003/0041178 A1 | 2/2003 | Brouk et al. |
| 2003/0046639 A1 | 3/2003 | Fai et al. |
| 2003/0069648 A1 | 4/2003 | Douglas et al. |
| 2003/0083910 A1 | 5/2003 | Sayal et al. |
| 2003/0083955 A1 | 5/2003 | Ookura |
| 2003/0084428 A1 | 5/2003 | Agostini et al. |
| 2003/0086594 A1 | 5/2003 | Gross |
| 2003/0097287 A1 | 5/2003 | Franz et al. |
| 2003/0120502 A1 | 6/2003 | Robb et al. |
| 2003/0120665 A1 | 6/2003 | Fox et al. |
| 2003/0126077 A1 | 7/2003 | Kantor et al. |
| 2003/0167193 A1 | 9/2003 | Jones et al. |
| 2003/0171962 A1 | 9/2003 | Hirth et al. |
| 2003/0172007 A1 | 9/2003 | Helmolt et al. |
| 2003/0172135 A1 | 9/2003 | Bobick et al. |
| 2003/0172343 A1 | 9/2003 | Leymaster et al. |
| 2003/0177139 A1 | 9/2003 | Cameron et al. |
| 2003/0195815 A1 | 10/2003 | Li et al. |
| 2003/0204452 A1 | 10/2003 | Wheeler |
| 2003/0204637 A1 | 10/2003 | Chong |
| 2003/0208389 A1 | 11/2003 | Kurihara et al. |
| 2003/0212614 A1 | 11/2003 | Chu et al. |
| 2003/0216978 A1 | 11/2003 | Sweeney et al. |
| 2003/0220835 A1 | 11/2003 | Barnes, Jr. |
| 2003/0220875 A1 | 11/2003 | Lam et al. |
| 2003/0229522 A1 | 12/2003 | Thompson et al. |
| 2003/0229550 A1 | 12/2003 | DiPrima et al. |
| 2003/0233295 A1 | 12/2003 | Tozawa et al. |
| 2003/0236748 A1 | 12/2003 | Gressel et al. |
| 2004/0002883 A1 | 1/2004 | Andrews et al. |

(56) References Cited

U.S. PATENT DOCUMENTS

| | | |
|---|---|---|
| 2004/0006653 A1 | 1/2004 | Kamen et al. |
| 2004/0015366 A1 | 1/2004 | Wiseman et al. |
| 2004/0024662 A1 | 2/2004 | Gray et al. |
| 2004/0024862 A1 | 2/2004 | Wall et al. |
| 2004/0034577 A1 | 2/2004 | Van Hoose et al. |
| 2004/0039665 A1 | 2/2004 | Ouchi |
| 2004/0073510 A1 | 4/2004 | Logan |
| 2004/0083201 A1 | 4/2004 | Sholl et al. |
| 2004/0083233 A1 | 4/2004 | Willoughby |
| 2004/0122730 A1 | 6/2004 | Tucciarone et al. |
| 2004/0133445 A1 | 7/2004 | Rajan et al. |
| 2004/0138942 A1 | 7/2004 | Pearson et al. |
| 2004/0148227 A1 | 7/2004 | Tabuchi et al. |
| 2004/0167894 A1 | 8/2004 | Ziv |
| 2004/0172360 A1 | 9/2004 | Mabrey et al. |
| 2004/0186891 A1 | 9/2004 | Panec et al. |
| 2004/0187140 A1 | 9/2004 | Aigner et al. |
| 2004/0220910 A1 | 11/2004 | Zang et al. |
| 2004/0254945 A1 | 12/2004 | Schmidt et al. |
| 2004/0267597 A1 | 12/2004 | Kobrosly et al. |
| 2004/0267714 A1 | 12/2004 | Frid et al. |
| 2005/0005190 A1 | 1/2005 | Ofir et al. |
| 2005/0015273 A1 | 1/2005 | Iyer |
| 2005/0021366 A1 | 1/2005 | Pool et al. |
| 2005/0033588 A1 | 2/2005 | Ruiz et al. |
| 2005/0038718 A1 | 2/2005 | Barnes et al. |
| 2005/0038744 A1 | 2/2005 | Viijoen |
| 2005/0049903 A1 | 3/2005 | Raja |
| 2005/0055369 A1 | 3/2005 | Gorelik et al. |
| 2005/0065987 A1 | 3/2005 | Telkowski et al. |
| 2005/0066240 A1 | 3/2005 | Sykes et al. |
| 2005/0071262 A1 | 3/2005 | Kobeh et al. |
| 2005/0080640 A1 | 4/2005 | Bhaskaran et al. |
| 2005/0102250 A1 | 5/2005 | Carr et al. |
| 2005/0108085 A1 | 5/2005 | Dakar et al. |
| 2005/0108168 A1 | 5/2005 | Halpin et al. |
| 2005/0108276 A1 | 5/2005 | Sriram |
| 2005/0131947 A1 | 6/2005 | Laub et al. |
| 2005/0149539 A1 | 7/2005 | Cameron et al. |
| 2005/0159997 A1 | 7/2005 | John |
| 2005/0171833 A1 | 8/2005 | Jost et al. |
| 2005/0182639 A1 | 8/2005 | Dale |
| 2005/0187797 A1 | 8/2005 | Johnson |
| 2005/0187866 A1 | 8/2005 | Lee |
| 2005/0194431 A1 | 9/2005 | Fees et al. |
| 2005/0194439 A1 | 9/2005 | Zuerl et al. |
| 2005/0197849 A1 | 9/2005 | Fotteler et al. |
| 2005/0197851 A1 | 9/2005 | Veit |
| 2005/0197878 A1 | 9/2005 | Fotteler et al. |
| 2005/0197881 A1 | 9/2005 | Fotteler et al. |
| 2005/0197882 A1 | 9/2005 | Fotteler et al. |
| 2005/0197886 A1 | 9/2005 | Veit |
| 2005/0197887 A1 | 9/2005 | Zuerl et al. |
| 2005/0197896 A1 | 9/2005 | Veit et al. |
| 2005/0197897 A1 | 9/2005 | Veit et al. |
| 2005/0197898 A1 | 9/2005 | Veit et al. |
| 2005/0197899 A1 | 9/2005 | Veit et al. |
| 2005/0197900 A1 | 9/2005 | Veit |
| 2005/0197901 A1 | 9/2005 | Veit et al. |
| 2005/0197902 A1 | 9/2005 | Veit |
| 2005/0197913 A1 | 9/2005 | Grendel et al. |
| 2005/0197928 A1 | 9/2005 | Fotteler et al. |
| 2005/0197941 A1 | 9/2005 | Veit |
| 2005/0209732 A1 | 9/2005 | Audimoolam et al. |
| 2005/0210406 A1 | 9/2005 | Biwer et al. |
| 2005/0216321 A1 | 9/2005 | Veit |
| 2005/0216359 A1 | 9/2005 | Welter et al. |
| 2005/0216371 A1 | 9/2005 | Fotteler et al. |
| 2005/0216421 A1 | 9/2005 | Barry et al. |
| 2005/0222888 A1 | 10/2005 | Hosoda et al. |
| 2005/0222896 A1 | 10/2005 | Rhyne et al. |
| 2005/0222945 A1 | 10/2005 | Pannicke et al. |
| 2005/0228821 A1 | 10/2005 | Gold |
| 2005/0234754 A1 | 10/2005 | Veit |
| 2005/0240488 A1 | 10/2005 | Grendel et al. |
| 2005/0246240 A1 | 11/2005 | Padilla |
| 2005/0256753 A1 | 11/2005 | Veit et al. |
| 2005/0278693 A1 | 12/2005 | Brunell et al. |
| 2006/0004934 A1 | 1/2006 | Guldner et al. |
| 2006/0005098 A1 | 1/2006 | Lotz et al. |
| 2006/0020515 A1 | 1/2006 | Lee et al. |
| 2006/0026552 A1 | 2/2006 | Mazzitelli et al. |
| 2006/0026586 A1 | 2/2006 | Remmel et al. |
| 2006/0036941 A1 | 2/2006 | Neil |
| 2006/0047574 A1 | 3/2006 | Sundaram et al. |
| 2006/0047598 A1 | 3/2006 | Hansen |
| 2006/0059005 A1 | 3/2006 | Horn et al. |
| 2006/0059059 A1 | 3/2006 | Horn et al. |
| 2006/0059060 A1 | 3/2006 | Horn et al. |
| 2006/0069598 A1 | 3/2006 | Schweitzer et al. |
| 2006/0069629 A1 | 3/2006 | Schweitzer et al. |
| 2006/0069632 A1 | 3/2006 | Kahn et al. |
| 2006/0074728 A1 | 4/2006 | Schweitzer et al. |
| 2006/0080338 A1 | 4/2006 | Seubert et al. |
| 2006/0085336 A1 | 4/2006 | Seubert et al. |
| 2006/0085412 A1 | 4/2006 | Johnson et al. |
| 2006/0085450 A1 | 4/2006 | Seubert et al. |
| 2006/0089885 A1 | 4/2006 | Finke et al. |
| 2006/0095373 A1 | 5/2006 | Venkatasubramanian et al. |
| 2006/0106824 A1 | 5/2006 | Stuhec |
| 2006/0184435 A1 | 8/2006 | Mostowfi |
| 2006/0195563 A1 | 8/2006 | Chapin et al. |
| 2006/0212376 A1 | 9/2006 | Snyder et al. |
| 2006/0280302 A1 | 12/2006 | Baumann et al. |
| 2006/0282360 A1 | 12/2006 | Kahn et al. |
| 2007/0016601 A1 | 1/2007 | Cameron et al. |
| 2007/0027742 A1 | 2/2007 | Emuchay et al. |
| 2007/0027891 A1 | 2/2007 | Schauerte et al. |
| 2007/0043583 A1 | 2/2007 | Davulcu et al. |
| 2007/0055688 A1 | 3/2007 | Blattner |
| 2007/0061154 A1 | 3/2007 | Markvoort et al. |
| 2007/0067411 A1 | 3/2007 | Angelov |
| 2007/0067753 A1 | 3/2007 | Pocklington et al. |
| 2007/0078799 A1 | 4/2007 | Huber-Buschbeck et al. |
| 2007/0100491 A1 | 5/2007 | Burrell et al. |
| 2007/0112574 A1 | 5/2007 | Greene |
| 2007/0118391 A1 | 5/2007 | Malaney et al. |
| 2007/0124227 A1 | 5/2007 | Dembo et al. |
| 2007/0129978 A1 | 6/2007 | Shirasu et al. |
| 2007/0132585 A1 | 6/2007 | Llorca et al. |
| 2007/0150387 A1 | 6/2007 | Seubert et al. |
| 2007/0150836 A1 | 6/2007 | Deggelmann et al. |
| 2007/0156428 A1 | 7/2007 | Brecht-Tillinger et al. |
| 2007/0156545 A1 | 7/2007 | Lin |
| 2007/0156552 A1 | 7/2007 | Manganiello |
| 2007/0156690 A1 | 7/2007 | Moser et al. |
| 2007/0165622 A1 | 7/2007 | O'Rourke et al. |
| 2007/0174811 A1 | 7/2007 | Kaetker et al. |
| 2007/0214065 A1 | 9/2007 | Kahlon et al. |
| 2007/0219864 A1 | 9/2007 | Vollrath et al. |
| 2007/0225949 A1 | 9/2007 | Sundararajan et al. |
| 2007/0226066 A1 | 9/2007 | Brunner et al. |
| 2007/0226090 A1 | 9/2007 | Stratton |
| 2007/0233574 A1 | 10/2007 | Koegler et al. |
| 2007/0255639 A1 | 11/2007 | Seifert |
| 2007/0265860 A1 | 11/2007 | Herrmann et al. |
| 2007/0265862 A1 | 11/2007 | Freund et al. |
| 2007/0288250 A1 | 12/2007 | Lemcke et al. |
| 2007/0294159 A1 | 12/2007 | Cottle |
| 2007/0295803 A1 | 12/2007 | Levine et al. |
| 2008/0005012 A1 | 1/2008 | Deneef |
| 2008/0016242 A1 | 1/2008 | Panec et al. |
| 2008/0021754 A1 | 1/2008 | Horn et al. |
| 2008/0027836 A1 | 1/2008 | Chapin |
| 2008/0040243 A1 | 2/2008 | Chang et al. |
| 2008/0046104 A1 | 2/2008 | Van Camp et al. |
| 2008/0046421 A1 | 2/2008 | Bhatia et al. |
| 2008/0065443 A1 | 3/2008 | Gorur et al. |
| 2008/0120129 A1* | 5/2008 | Seubert et al. .............. 705/1 |
| 2008/0120190 A1 | 5/2008 | Joao et al. |
| 2008/0120204 A1 | 5/2008 | Conner et al. |
| 2008/0120206 A1 | 5/2008 | Weiler et al. |
| 2008/0120313 A1 | 5/2008 | O'Brien et al. |
| 2008/0133303 A1 | 6/2008 | Singh et al. |

(56) References Cited

U.S. PATENT DOCUMENTS

| | | |
|---|---|---|
| 2008/0144791 A1 | 6/2008 | Hariri et al. |
| 2008/0154969 A1 | 6/2008 | DeBie |
| 2008/0162266 A1 | 7/2008 | Griessmann et al. |
| 2008/0184265 A1 | 7/2008 | Kasi et al. |
| 2008/0189360 A1 | 8/2008 | Kiley et al. |
| 2008/0196108 A1 | 8/2008 | Dent et al. |
| 2008/0215354 A1 | 9/2008 | Halverson et al. |
| 2008/0243578 A1 | 10/2008 | Veit |
| 2008/0288317 A1 | 11/2008 | Kakar |
| 2008/0300962 A1 | 12/2008 | Cawston et al. |
| 2008/0314981 A1 | 12/2008 | Eisenson |
| 2009/0006203 A1 | 1/2009 | Fordyce et al. |
| 2009/0063287 A1 | 3/2009 | Tribout et al. |
| 2009/0077074 A1 | 3/2009 | Hosokawa |
| 2009/0089198 A1 | 4/2009 | Kroutik |
| 2009/0094274 A1 | 4/2009 | Gorelik et al. |
| 2009/0144624 A1 | 6/2009 | Barnes, Jr. |
| 2009/0164497 A1 | 6/2009 | Steinmaier et al. |
| 2009/0192926 A1 | 7/2009 | Tarapata |
| 2009/0193432 A1 | 7/2009 | McKegney et al. |
| 2009/0222360 A1 | 9/2009 | Schmitt et al. |
| 2009/0248429 A1 | 10/2009 | Doenig et al. |
| 2009/0248430 A1 | 10/2009 | Hubert et al. |
| 2009/0248431 A1 | 10/2009 | Schoknecht et al. |
| 2009/0248463 A1 | 10/2009 | Piochon et al. |
| 2009/0248473 A1 | 10/2009 | Doenig et al. |
| 2009/0248487 A1 | 10/2009 | Santoso et al. |
| 2009/0248547 A1 | 10/2009 | Doenig et al. |
| 2009/0248558 A1 | 10/2009 | Hollberg et al. |
| 2009/0248586 A1 | 10/2009 | Kaisermayr et al. |
| 2009/0248698 A1 | 10/2009 | Rehmann |
| 2009/0249358 A1 | 10/2009 | Schuette |
| 2009/0249362 A1 | 10/2009 | Lindemann et al. |
| 2009/0254971 A1 | 10/2009 | Herz et al. |
| 2009/0271245 A1 | 10/2009 | Joshi et al. |
| 2009/0276338 A1 | 11/2009 | Masermann et al. |
| 2009/0300544 A1* | 12/2009 | Psenka et al. .......... 715/810 |
| 2009/0300578 A1 | 12/2009 | Neil |
| 2009/0326988 A1 | 12/2009 | Barth et al. |
| 2009/0327009 A1 | 12/2009 | Schmitt et al. |
| 2009/0327105 A1 | 12/2009 | Moussa et al. |
| 2009/0327106 A1 | 12/2009 | Bartelt et al. |
| 2010/0001834 A1 | 1/2010 | Brunswig et al. |
| 2010/0014510 A1 | 1/2010 | Boreli et al. |
| 2010/0070391 A1 | 3/2010 | Storr et al. |
| 2010/0070395 A1 | 3/2010 | Elkeles et al. |
| 2010/0106555 A1 | 4/2010 | Mneimneh et al. |
| 2010/0131379 A1 | 5/2010 | Dorais et al. |
| 2010/0131394 A1 | 5/2010 | Rutsch et al. |
| 2010/0153297 A1 | 6/2010 | Haaf et al. |
| 2010/0161366 A1 | 6/2010 | Clemens et al. |
| 2010/0161425 A1 | 6/2010 | Sideman |
| 2010/0169888 A1 | 7/2010 | Hare et al. |
| 2010/0198631 A1 | 8/2010 | Edwards et al. |
| 2010/0217645 A1 | 8/2010 | Jin et al. |
| 2010/0217820 A1 | 8/2010 | Brouk et al. |
| 2010/0218245 A1 | 8/2010 | Brouk et al. |
| 2010/0241729 A1 | 9/2010 | Angelov |
| 2010/0306536 A1 | 12/2010 | Brouk et al. |
| 2011/0046775 A1 | 2/2011 | Bailey et al. |
| 2011/0077999 A1 | 3/2011 | Becker et al. |
| 2011/0078048 A1 | 3/2011 | Becker et al. |
| 2011/0088000 A1 | 4/2011 | Mackay |
| 2011/0153505 A1 | 6/2011 | Brunswig et al. |
| 2011/0153767 A1 | 6/2011 | Coldicott et al. |
| 2011/0276360 A1 | 11/2011 | Barth et al. |
| 2011/0276636 A1 | 11/2011 | Cheng et al. |
| 2011/0307289 A1 | 12/2011 | Hosur et al. |
| 2011/0307353 A1 | 12/2011 | Ringl et al. |
| 2012/0117000 A1 | 5/2012 | Haaf et al. |
| 2012/0118983 A1 | 5/2012 | Harris |
| 2013/0021978 A1 | 1/2013 | Tamura et al. |
| 2013/0144741 A1 | 6/2013 | Becker et al. |
| 2013/0159146 A1 | 6/2013 | Schmitt et al. |

FOREIGN PATENT DOCUMENTS

| | | |
|---|---|---|
| CN | 1632806 | 6/2005 |
| CN | 1765138 | 4/2006 |
| CN | 1767537 | 5/2006 |
| CN | 101174957 | 5/2008 |
| CN | 101288092 | 10/2008 |
| WO | WO 2008/005102 | 1/2008 |

OTHER PUBLICATIONS

SAP Structured Entity Relationship Model (SAP-SERM) for R/3 System Release 4.0 (Part 1); Dec. 1998; 5954 pages.

SAP Structured Entity Relationship Model (SAP-SERM) for R/3 System Release 4.0 (Part 2); Dec. 1998; 7838 pages.

Zencke, Peter; "Engineering a Business Platform"; SAP AG 2005; Engineering BPP; [Online] previously available at URL www.sap.com/community/pub/webcast/2006_01_16_Analyst_Summit_Vegas/2006_01_16_Analyst_Summit_Vegas_009.pdf ; 36 pages.

"UML in the .com Enterprise: Modeling CORBA, Components, XML/XMI and Metadata Workshop"; <http://www.omg.org/news/meetings/workshops/uml_presentations.htm> retrieved on Mar. 17, 2005.

Medjahed, Brahim et al; "Business-to-Business Interactions: Issues and Enabling Technologies"; The VLDB Journal; vol. 12, No. 1; Apr. 3, 2003; pp. 59-89.

Medjahed, Brahim et al.; "Composing Web Services on the Semantic Web"; The VLDB Journal; vol. 12, No. 4, Sep. 23, 2003; pp. 333-351.

Born, Marc et al.; "Customizing UML for Component Design"; www.dot-profile.de; UML Workshop, Palm Springs, CA; Nov. 2000.

Kappel, Gerti et al.; "A Framework for Workflow Management Systems Based on Objects, Rules, and Roles"; ACM Computing Surveys; ACM Press; vol. 32; Mar. 2000; 5 pages.

Skonnard, Aaron et al.; "BizTalk Server 2000: Architecture and Tools for Trading Partner Integration"; MSDn Magazine; 2000; ms-help://ms.msdnqtr.2003apr.1033/dnmag00/htmal/biztalk.htm; 7 pages.

Microsoft; "Creating an XML Web Service Proxy"; 2001; mshelp://ms.msdnqtr.2003apr.1033/cpguide/html/cpconcreatingwebserviceproxy.htm; 3 pages.

Proceedings of OMG Workshops; http://www.omg.org/news/meetings/workshops/proceedings.htm; pp. 1-3. Retrieved on Mar. 17, 2005.

Meltzer, Bart et al.; "XML and Electronic Commerce: Enabling the Network Economy"; SIGMOD Record; ACM Press; vol. 27, No. 4; Dec. 1998; pp. 21-24.

Huhns, Michael N. et al.; "Automating Supply-Chain Mangement"; Jul. 15-19, 2002; pp. 1017-1024.

Soederstroem, Eva; "Standardising the Business Vocabulary of Standards"; SAC, Madrid, Spain; 2002; pp. 1048-1052.

Bastide, Remi et al.; "Formal Specification of CORBA Services: Experience and Lessons Learned"; 2000; pp. 105-117.

Glushko, Robert J. et al.; "An XML Framework for Agent-Based E-Commerce"; Communications of the ACM; vol. 42, No. 3; Mar. 1999; pp. 106-114.

Coen-Porisini, Alberto et al.; "A Formal Approach for Designing CORBA-Based Applications"; ACM Transactions on Software Engineering and Methodology; vol. 12, No. 2; Apr. 2003; pp. 107-151.

Yang, J. et al.; "Service Deployment for Virtual Enterprises"; IEEE; 2001; pp. 107-115.

Karp, Alan H.; "E-speak E-xplained"; Communications of the ACM; vol. 46, No. 7; Jul. 2003; pp. 113-118.

Gillibrand, David; "Essential Business Object Design"; Communications of the ACM; vol. 43, No. 2; Feb. 2000; pp. 117-119.

Cole, James et al.; "Extending Support for Contracts in ebXML"; IEEE; 2001; pp. 119-127.

DiNitto, Elisabetta et al.; "Deriving Executable Process Descriptions from UML"; ICSE '02; May 19-25, 2002; pp. 155-165.

Stumptner, Markus et al.; "On the Road to Behavior-Based Integration"; First Asia-Pacific Conferences on Conceptual Modelling; Dunedin, New Zealand; Jan. 2004; pp. 15-22.

(56) References Cited

OTHER PUBLICATIONS

Gosain, Sanjay et al.; "The Impact of Common E-Business Interfaces"; Communications of the ACM; vol. 46, No. 2; Dec. 2003; pp. 186-195.
Damodaran, Suresh; "B2B Integration over the Internet with XML—RosettaNet Successes and Challenges"; WWW2004; May 17-22, 2004; pp. 188-195.
Schulze, Wolfgang et al.; "Standardising on Workflow-Management—The OMG Workflow Management Facility"; SIGGROUP Bulletin; vol. 19, No. 1; Apr. 1998; pp. 24-30.
Sutherland, Jeff; "Business Objects in Corporate Information Systems"; ACM Computing Surveys; vol. 27, No. 2; Jun. 1995; pp. 274-276.
Arsanjani, Ali; "Developing and Integrating Enterprise Components and Services"; Communications of the ACM; vol. 45, No. 10; Oct. 2002; pp. 31-34.
Kim, Dan Jong et al.; "A Comparison of B2B E-Service Solutions"; Communications of the ACM; vol. 46, No. 12; Dec. 2003; pp. 317-324.
Hasselbring, Wilhelm; "Information System Integration"; Communications of the ACM; vol. 43, No. 6; Jun. 2000; pp. 33-38.
Khosravi, Navid et al.; "An Approach to Building Model Driven Enterprise Systems in Nebras Enterprise Framework"; OOPSLA '02: Companion of the 17th Annual ACM SIGPLAN Conference on Object-Oriented Programming, Systems, Languages, and Applications; Nov. 4-8, 2002; pp. 32-33.
Hogg, K. et al.; "An Evaluation of Web Services in the Design of a B2B Application"; 27th Australasian Computer Science Conference; Dunedin, New Zealand; 2004; pp. 331-340.
Gruhn, Volker et al.; "Workflow Management Based on Process Model Repositories"; IEEE 1998; pp. 379-388.
Kim, HyoungDo; "Conceptual Modeling and Specification Generation for B2B Business Processes Based on ebXML"; SIGMOD Record; vol. 31, No. 1; Mar. 2002; pp. 37-42.
Siegel, Jon; "OMG Overview: CORBA and the OMA in Enterprise Computing"; Communications of the ACM; vol. 41, No. 10; Oct. 1998; pp. 37-43.
Yang, Jian et al.; "Interoperation Support for Electronic Business"; Communications of the ACM; vol. 43, No. 6; Jun. 2000; pp. 39-47.
Levi, Keith et al.; "A Goal-Driven Approach to Enterprise Component Identification and Specification"; Communications of the ACM; vol. 45, No. 10; Oct. 2002; pp. 45-52.
Terai, Koichi et al.; "Coordinating Web Services Based on Business Models"; 2003; pp. 473-478.
Aversano, Lerina et al.; "Introducing eServices in Business Process Models"; SEKE '02; Ischia Italy; Jul. 15-19, 2002; pp. 481-488.
Quix, Christoph et al.; "Business Data Management for Business-to-Business Electronic Commerce"; SIGMOD Record; vol. 31, No. 1; Mar. 2002; pp. 49-54.
Sutherland, Jeff; "Why I Love the OMG: Emergence of a Business Object Component Architecture"; StandardView; vol. 6, No. 1; Mar. 1998; pp. 4-13.
Dogac, Asuman et al.; "An ebXML Infrastructure Implementation through UDDI Registries and RosettaNet PIPs"; ACM SIGMOD; Madison, Wisconsin; Jun. 4-6, 2002; pp. 512-523.
Lee, Jinyoul et al.; "Enterprise Integration with ERP and EAI"; Communications of the ACM; vol. 46, No. 2; Feb. 2003; pp. 54-60.
Bratthall, Lars G. et al.; "Integrating Hundreds of Products through One Architecture—The Industrial IT Architecture"; ICSE '02; Orlando, Florida; May 19-25, 2002; pp. 604-614.
Fingar, Peter; "Component-Based Frameworks for E-Commerce"; Communications of the ACM; vol. 43, No. 10; Oct. 2000; pp. 61-66.
Sprott, David; "Componentizing the Enterprise Application Packages"; Communications of the ACM; vol. 43, No. 4; Apr. 2000; pp. 63-69.
Gokhale, Aniruddha et al.; "Applying Model-Integrated Computing to Component Middleware and Enterprise Applications"; Communications of the ACM; vol. 45, No. 10; Oct. 2002; pp. 65-70.

Bussler, Christoph; "The Role of B2B Engines in B2B Integration Architectures"; SIGMOD Record; vol. 31, No. 1; Mar. 2002; pp. 67-72.
Fremantle, Paul et al.; "Enterprise Services"; Communications of the ACM; vol. 45, No. 10; Oct. 2002; pp. 77-79.
Trastour, David et al.; "Semantic Web Support for the Business-to-Business E-Commerce Lifecycle"; WWW2002, Honolulu, Hawaii; May 7-11, 2002; pp. 89-98.
Jaeger, Dirk et al.; "Using UML for Software Process Modeling"; 1999; pp. 91-108.
Han, Zaw Z. et al.; "Interoperability from Electronic Commerce to Litigation Using XML Rules"; 2003; pp. 93-94.
Carlson, David A.; "Designing XML Vocabularies with UML"; OOPSLA 2000 Companion; Minneapolis, Minnesota; 2000; pp. 95-96.
Stonebraker, Michael; "Too Much Middleware"; SIGMOD Record; vol. 31, No. 1; Mar. 2002; pp. 97-106.
Maamar, Zakaria et al.; "Toward Intelligent Business Objects"; Communications of the ACM; vol. 43, No. 10; Oct. 2000; pp. 99-101.
Tenenbaum, Jay M. et al.; "Eco System: An Internet Commerce Architecture"; IEEE; May 1997; pp. 48-55.
Eyal, Anat et al.; "Integrating and Customizing Heterogeneous E-Commerce Applications"; The VLDB Journal; Aug. 2001; pp. 16-38.
He, Ning et al.; "B2B Contract Implementation Using Windows DNS"; 2001; pp. 71-79.
FSML-Financial Services Markup Language (Jul. 14, 1999) http://xml.coverpages.org/FSML-v1500a.pdf; pp. 1-159 (2 parts).
Webster's Revised Unabridged Dictionary (1913+1828); Def. "merchandise"; <http://machaut.uchicago.edu/?resource=Webster%27s& word=merchandise&use1913=on&u>. Retrieved on Sep. 1, 2009.
Statement in Accordance with the Notice from the European Patent Office dated Oct. 1, 2007 Concerning Business Methods—EPC; Official Journal of the European Patent Office; Munich; Nov. 1, 2007; pp. 592-593.
Lynn, Chris; "Sony Enters Brand Asset Management Market"; The Seybold Report; Analyzing Publishing Technologies; Aug. 4, 2004; <www.Seybold365.com>; 3 pages.
"Header", Newton's Telecom Dictionary; 12th Edition, 2004; pp. 389-390.
Definition of "header" and "message header"; Newton's Telecom Dictionary; 18th Edition; 2002; pp. 347, 464.
Baker, Stacy; "Benefits of Assortment Planning"; Assortment Planning for Apparel Retailers—2005 Management Briefing; Just Style; Jun. 2005; 3 pages.
"Visual and Quantitative Assortment Planning Applications Drive Partnership and Profit"; PR Newswire; Jan. 12, 2006; 3 pages.
"DOTS Inc. Selects Compass Software's smartmerchandising for Merchandise Planning and Assortment Planning"; PR Newswire; Dec. 11, 2002; 2 pages.
SAP; "BC-Central Maintenance and Transport Objects"; Release 4.6C; Apr. 200; 15 pages.
Annevelink et al.; "Heterogeneous Database Intergration in a Physician Workstation"; 1992; 5 pages.
Ketabchi et al.; "Object-Oriented Database Management Support for Software Maintenance and Reverse Engineering"; Department of Electrical Engineering and Computer Science, Santa Clara University; 1989; 4 pages.
Diehl et al.; "Service Architecture for an Object-Oriented Next Generation Profile Register"; date unknown; 8 pages.
Lockemann et al.; "Flexibility through Multi-Agent Systems: Solutions or Illusions"; SOFSEM 2004; pp. 41-56.
Mascolo et al.; "An Analytical Method for Performance Evaluation of Kanban Controlled Production Systems"; Operations Research; vol. 44, No. 1; 1996; pp. 50-64.
Altintas et al.; "Aurora Software Product Line"; Cybersoft Information Technologies Co.; 2005; pp. 1-8.
Himoff et al.; "MAGENTA Technology: Multi-Agent Systems for Industrial Logistics"; AAMAS'05; Jul. 25-29, 2005; 2005 ACM; pp. 60-66:1-7).
International Search Report and Written Opinion of the International Searching Authority issued in International Application No. PCT/US2007/011378 on Apr. 30, 2008; 17 pages.

(56) References Cited

OTHER PUBLICATIONS

International Preliminary Report on Patentability under Chapter I issued in International Application No. PCT/US2007/011378 on Nov. 17, 2008; 11 pages.
International Search Report and Written Opinion of the International Searching Authority issued in International Application No. PCT/IB2006/001401 on Aug. 27, 2008; 8 pages.
International Search Report and Written Opinion of the International Searching Authority issued in International Application No. PCT/US2005/019961 on Sep. 22, 2005; 8 pages.
International Preliminary Report on Patentability under Chapter I issued in International Application No. PCT/US2005/019961 on Dec. 4, 2006; 6 pages.
International Search Report and Written Opinion of the International Searching Authority issued in International Application No. PCT/US2005/021481 on Apr. 11, 2006; 7 pages.
International Search Report and Written Opinion of the International Searching Authority issued in International Application No. PCT/US2005/021481 on May 29, 2007; 6 pages.
International Preliminary Report on Patentability under Chapter I issued in International Application No. PCT/US2005/021481 on Dec. 20, 2006; 6 pages.
International Preliminary Report on Patentability under Chapter I issued in International Application No. PCT/US2005/021481 on Jul. 15, 2008; 5 pages.
International Search Report and Written Opinion of the International Searching Authority issued in International Application No. PCT/US2005/022137 on Sep. 23, 2005; 7 pages.
International Search Report and Written Opinion of the International Searching Authority issued in International Application No. PCT/US2005/022137 on May 12, 2006; 7 pages.
International Preliminary Report on Patentability under Chapter I issued in International Application No. PCT/US2005/022137 on Dec. 28, 2006; 5 pages.
International Search Report and Written Opinion of the International Searching Authority issued in International Application No. PCT/CN2010/073856 on Mar. 17, 2011; 8 pages.
International Search Report and Written Opinion of the International Searching Authority issued in International Application No. PCT/CN2010/073864 on Mar. 3, 2011; 8 pages.
International Search Report and Written Opinion of the International Searching Authority issued in International Application No. PCT/CN2010/073868 on Mar. 17, 2011; 10 pages.
Communication Pursuant to Rules 70(2) and 70a(2) EPC issued in related European Application No. 07835755.5 on Feb. 28, 2011; 6 pages.
Communication Pursuant to Article 94(3) EPC issued in related European Application No. 05757432.9 on Jan. 26, 2009; 4 pages.
Communication Pursuant to Article 94(3) issued in European Application No. 05757432.9 on Apr. 12, 2011; 5 pages.
Supplementary European Search Report issued in related European Application No. 05823434.5 on Sep. 28, 2009; 3 pages.
Supplementary European Search Report issued in related European Application No. 05766672.9 on Oct. 6, 2009; 3 pages.
Communication Pursuant to Article 94(3) issued in European Application No. 05766672.9 on Jul. 14, 2011; 4 pages.
Notice of Allowance issued in related U.S. Appl. No. 12/147,395, Oct. 26, 2010; 10 pages.
Notice of Allowance issued in U.S. Appl. No. 12/147,395, May 4, 2011; 10 pages.
Notice of Allowance issued in related U.S. Appl. No. 12/147,449, Apr. 28, 2011; 9 pages.
Office Action issued in related U.S. Appl. No. 12/147,399, Jan. 26, 2011; 16 pages.
Office Action issued in related U.S. Appl. No. 12/334,175, May 27, 2011; 12 pages.
Office Action issued in related U.S. Appl. No. 11/640,422, filed Apr. 2, 2009; 13 pages.
Office Action issued in related U.S. Appl. No. 11/640,422, filed Dec. 30, 2009; 9 pages.
Office Action issued in U.S. Appl. No. 11/640,422, filed May 14, 2010; 12 pages.
Office Action issued in related U.S. Appl. No. 11/731,857, filed May 15, 2009; 11 pages.
Office Action issued in related U.S. Appl. No. 11/731,857, filed Feb. 4, 2010; 22 pages.
Notice of Allowance issued in related U.S. Appl. No. 11/731,857, filed Nov. 29, 2010; 4 pages.
Notice of Allowance issued in related U.S. Appl. No. 11/731,857, filed Apr. 11, 2011; 8 pages.
Notice of Allowance issued in related U.S. Appl. No. 11/731,857, filed Dec. 14, 2011; 7 pages.
Office Action issued in U.S. Appl. No. 12/147,414, filed Apr. 14, 2011; 30 pages.
Office Action issued in U.S. Appl. No. 12/147,414, filed Oct. 26, 2011; 27 pages.
Office Action issued in U.S. Appl. No. 12/147,378, filed Jun. 17, 2011; 10 pages.
Notice of Allowance issued in U.S. Appl. No. 12/147,378, filed Nov. 9, 2011; 16 pages.
Office Action issued in U.S. Appl. No. 12/323,116, filed Sep. 6, 2011; 8 pages.
Office Action issued in U.S. Appl. No. 12/323,116, filed Jan. 27, 2012; 7 pages.
Notice of Allowance issued in U.S. Appl. No. 12/323,139, filed Mar. 4, 2011; 13 pages.
Office Action issued in U.S. Appl. No. 12/571,140, filed Sep. 26, 2011; 14 pages.
Office Action issued in related U.S. Appl. No. 12/059,971, filed Nov. 4, 2010; 20 pages.
Office Action issued in related U.S. Appl. No. 12/059,971, filed May 18, 2011; 13 pages.
Office Action issued in related U.S. Appl. No. 12/060,054, filed Jun. 29, 2011; 15 pages.
Office Action issued in related U.S. Appl. No. 12/060,054, filed Dec. 7, 2011; 15 pages.
Office Action issued in U.S. Appl. No. 12/060,144, filed Jun. 23, 2011; 16 pages.
Office Action issued in U.S. Appl. No. 12/060,144, filed Dec. 8, 2011; 18 pages.
Office Action issued in related U.S. Appl. No. 12/059,804, filed Apr. 28, 2011; 14 pages.
Office Action issued in U.S. Appl. No. 12/059,804, filed Nov. 14, 2011; 15 pages.
Office Action issued in related U.S. Appl. No. 12/059,867, filed Aug. 18, 2009; 37 pages.
Office Action issued in related U.S. Appl. No. 12/059,867, filed Feb. 22, 2010; 24 pages.
Office Action issued in related U.S. Appl. No. 12/059,860, filed Aug. 3, 2011; 15 pages.
Office Action issued in related U.S. Appl. No. 12/059,860, filed Jan. 23, 2012; 16 pages.
Office Action issued in related U.S. Appl. No. 12/060,149, filed Aug. 26, 2010; 15 pages.
Office Action issued in related U.S. Appl. No. 12/060,149, filed Feb. 4, 2011; 19 pages.
Office Action issued in related U.S. Appl. No. 12/060,192, filed Apr. 14, 2011; 18 pages.
Office Action issued in related U.S. Appl. No. 12/060,192, filed Sep. 6, 2011; 18 pages.
Notice of Allowance issued in U.S. Appl. No. 12/060,192, filed Mar. 2, 2012; 18 pages.
Office Action issued in related U.S. Appl. No. 12/060,178, filed Dec. 7, 2009; 6 pages.
Office Action issued in related U.S. Appl. No. 12/060,178, filed May 25, 2010; 19 pages.
Notice of Allowance issued in related U.S. Appl. No. 12/060,178, filed Dec. 6, 2010; 4 pages.
Notice of Allowance issued in related U.S. Appl. No. 12/060,178, filed Sep. 2, 2011; 9 pages.
Office Action issued in related U.S. Appl. No. 12/060,062, filed Jul. 13, 2011; 16 pages.

(56) References Cited

OTHER PUBLICATIONS

Office Action issued in related U.S. Appl. No. 12/060,155, filed May 10, 2011; 8 pages.
Office Action issued in related U.S. Appl. No. 12/060,155, filed Oct. 31, 2011; 15 pages.
Office Action issued in related U.S. Appl. No. 12/060,171, filed Aug. 11, 2009; 11 pages.
Office Action issued in related U.S. Appl. No. 12/060,171, filed Mar. 19, 2010; 10 pages.
Office Action issued in related U.S. Appl. No. 12/060,171, filed Jul. 1, 2010; 19 pages.
Office Action issued in related U.S. Appl. No. 12/060,171, filed Jan. 26, 2011; 17 pages.
Office Action issued in related U.S. Appl. No. 12/060,171, filed Mar. 1, 2012; 19 pages.
Office Action issued in related U.S. Appl. No. 11/145,464, filed Aug. 5, 2009; 31 pages.
Office Action issued in related U.S. Appl. No. 11/145,464, filed Jan. 22, 2009; 30 pages.
Office Action issued in related U.S. Appl. No. 11/145,464, filed Feb. 5, 2010; 57 pages.
Notice of Allowance issued in related U.S. Appl. No. 11/145,464, filed Nov. 1, 2010; 4 pages.
Notice of Allowance issued in related U.S. Appl. No. 11/145,464, filed Feb. 23, 2011; 7 pages.
Notice of Allowance issued in related U.S. Appl. No. 11/145,464, filed Feb. 6, 2012; 7 pages.
Office Action issued in related U.S. Appl. No. 11/155,368, filed May 14, 2009; 6 pages.
Office Action issued in related U.S. Appl. No. 11/155,368, filed Dec. 10, 2009; 43 pages.
Advisory Action issued in U.S. Appl. No. 11/155,368, filed Mar. 31, 2010; 3 pages.
Notice of Allowance issued in U.S. Appl. No. 11/155,368, filed Oct. 7, 2010; 4 pages.
Notice of Allowance issued in U.S. Appl. No. 11/155,368, filed Mar. 14, 2011; 7 pages.
Notice of Allowance issued in U.S. Appl. No. 11/155,368, filed Nov. 8, 2011; 7 pages.
Office Action issued in related U.S. Appl. No. 11/166,065, filed Jun. 24, 2009; 6 pages.
Office Action issued in related U.S. Appl. No. 11/166,065, filed Mar. 3, 2010; 25 pages.
Notice of Allowance issued in related U.S. Appl. No. 11/166,065, filed Sep. 20, 2010; 6 pages.
Notice of Allowance issued in U.S. Appl. No. 11/166,065, filed Mar. 8, 2011; 5 pages.
Notice of Allowance issued in U.S. Appl. No. 11/166,065, filed Feb. 15, 2012; 7 pages.
Office Action issued in U.S. Appl. No. 12/815,698, filed Jan. 20, 2012; 10 pages.
Office Action issued in U.S. Appl. No. 12/815,618, filed Dec. 22, 2011; 8 pages.
Office Action issued in related U.S. Appl. No. 11/864,866, filed Feb. 3, 2011; 20 pages.
Notice of Allowance issued in related U.S. Appl. No. 11/864,866, filed Jul. 22, 2011; 6 pages.
Notice of Allowance issued in related U.S. Appl. No. 11/864,866, filed Mar. 13, 2012; 7 pages.
Office Action issued in related U.S. Appl. No. 11/775,821, filed Jan. 22, 2010; 16 pages.
Notice of Allowance issued in related U.S. Appl. No. 11/775,821, filed Jul. 16, 2010; 4 pages.
Notice of Allowance issued in related U.S. Appl. No. 11/775,821, filed Oct. 22, 2010; 4 pages.
Notice of Allowance issued in related U.S. Appl. No. 11/775,821, filed Feb. 4, 2011; 4 pages.
Notice of Allowance issued in U.S. Appl. No. 11/775,821, filed Sep. 21, 2011; 5 pages.
Notice of Allowance issued in U.S. Appl. No. 11/775,821, filed Dec. 30, 2011; 5 pages.
Office Action issued in related U.S. Appl. No. 11/364,538, filed Aug. 4, 2009; 5 pages.
Office Action issued in related U.S. Appl. No. 11/364,538, filed Mar. 4, 2010; 40 pages.
Notice of Allowance issued in related U.S. Appl. No. 11/364,538, filed Dec. 13, 2010; 5 pages.
Notice of Allowance issued in related U.S. Appl. No. 11/364,538, filed Jul. 26, 2011; 6 pages.
Office Action issued in U.S. Appl. No. 11/864,811, filed Mar. 18, 2011; 10 pages.
Office Action issued in U.S. Appl. No. 11/864,811, filed Jul. 26, 2011; 7 pages.
Notice of Allowance issued in U.S. Appl. No. 11/864,811, filed Nov. 14, 2011; 8 pages.
Notice of Allowance issued in U.S. Appl. No. 11/864,811, filed Mar. 2, 2012; 8 pages.
Office Action issued in related U.S. Appl. No. 11/864,786, filed Jun. 22, 2009; 7 pages.
Office Action issued in related U.S. Appl. No. 11/864,786, filed Mar. 3, 2010; 12 pages.
Office Action issued in related U.S. Appl. No. 11/864,832, filed Sep. 18, 2009; 14 pages.
Notice of Allowance issued in related U.S. Appl. No. 11/864,832, filed Mar. 24, 2010; 11 pages.
Notice of Allowance issued in related U.S. Appl. No. 11/864,832, filed Aug. 23, 2010; 4 pages.
Notice of Allowance issued in related U.S. Appl. No. 11/864,832, filed Dec. 3, 2010; 9 pages.
Notice of Allowance issued in related U.S. Appl. No. 11/864,832, filed Jul. 7, 2011; 11 pages.
Notice of Allowance issued in related U.S. Appl. No. 11/864,832, filed Jan. 9, 2012; 12 pages.
Office Action issued in related U.S. Appl. No. 11/864,863, filed Jul. 21, 2011; 29 pages.
Office Action issued in related U.S. Appl. No. 11/864,863, filed Dec. 22, 2011; 20 pages.
Office Action issued in related U.S. Appl. No. 11/864,871, filed Apr. 21, 2010; 20 pages.
Office Action issued in related U.S. Appl. No. 11/864,871, filed Oct. 1, 2010; 30 pages.
Office Action issued in related U.S. Appl. No. 11/803,178, filed Jun. 29, 2009; 5 pages.
Office Action issued in related U.S. Appl. No. 11/803,178, filed Mar. 4, 2010; 43 pages.
Notice of Allowance issued in related U.S. Appl. No. 11/803,178, filed May 17, 2011; 13 pages.
Notice of Allowance issued in U.S. Appl. No. 11/640,422, filed Sep. 29, 2011; 7 pages.
Boetterweck, Goetz; "A Model-Driven Approach to the Engineering of Multiple User Interfaces"; Lecture Notes in Computer Science; 2007; vol. 4364/2007; pp. 106-115.
Business Object DTF, Common Business Objects, Ver 1.5; OMG Document bom; Framingham Corporate Center, Framingham, MA; 20 pages.; Dec. 4, 1997.
Chou et al. "Web Services for Service-Oriented Communication", International Conference on Collaborative Computing: Networking, Applications and Worksharing, CollaborateCom 2006, pp. 1-8, 2006.
Gable, Julie; "Enterprise Application Integration"; Information Management Journal; Mar./Apr. 2002; pp. 48-52.
Intersystems, Evaluating Integration Software, Ensemble White Paper, 2007, http://www.intersystems.com/ensemble/whitepapers/pdf/evaluating-integration-software.pdf.
Nemuraite, Lina; "Business Object Modeling Framework for Distributed Enterprise", Kaunas University of Technology, Launas, Lithuania, Jan. 1999; pp. 189-202.
Oracle Application Integration Architecture Enterprise Business Objects (EBO) Concepts—Concepts, Structure, Terminologies and Design Rules, An Oracle White Paper; 29 pages.; Aug. 2009.
SAP 2008 Annual Report; 256 pages.

(56) References Cited

OTHER PUBLICATIONS

"SAP Labs and HP Team to Advance Internet-Based Supply Chain Collaboration"; Business Editors and Technology Writers; Business Wire; New York; Feb. 3, 2000; 4 pages.
Shi, Min-Hua et al.; "MQML—Message Queuing Markup Language"; Proceedings of the 4th IEEE International Workshop on Advanced Issues of E-Commerce and Web-Based Information Systems (WECWIS 2002); 2002; 8 pages.
Communication Pursuant to Article 94(3) EPC issued in European Application No. 07835755.5 on Feb. 22, 2012; 7 pages.
International Search Report and Written Opinion issued in International Application No. PCT/CN2011/001238 on May 3, 2012; 9 pages.
Notice of Allowance issued in U.S. App. No. 11/155,368, filed Jun. 13, 2013; 9 pages.
Notice of Allowance issued in U.S. Appl. No. 11/155,368, filed Jul. 23, 2012; 7 pages.
Notice of Allowance issued in U.S. Appl. No. 11/166,065, filed Oct. 9, 2012; 10 pages.
Notice of Allowance issued in U.S. Appl. No. 11/364,538, filed Jul. 23, 2012; 7 pages.
Notice of Allowance issued in U.S. Appl. No. 11/640,422, filed Apr. 23, 2012; 8 pages.
Notice of Allowance issued in U.S. Appl. No. 11/640,422, filed May 22, 2012; 7 pages.
Notice of Allowance issued in U.S. Appl. No. 11/731,857, filed Oct. 9, 2012; 7 pages.
Notice of Allowance issued in U.S. Appl. No. 11/775,821, filed Nov. 2, 2012; 5 pages.
Notice of Allowance issued in U.S. Appl. No. 11/803,178, filed Jul. 17, 2012; 15 pages.
Notice of Allowance issued in U.S. Appl. No. 11/864,786, filed Nov. 7, 2012; 7 pages.
Notice of Allowance issued in U.S. Appl. No. 11/864,811, filed Mar. 19, 2013; 9 pages.
Notice of Allowance issued in U.S. Appl. No. 11/864,811, filed Sep. 10, 2012; 10 pages.
Notice of Allowance issued in U.S. Appl. No. 11/864,832, filed Jul. 3, 2013; 14 pages.
Notice of Allowance issued in U.S. Appl. No. 11/864,832, filed Jul. 30, 2012; 12 pages.
Notice of Allowance issued in U.S. Appl. No. 11/864,866, filed Jan. 25, 2013; 7 pages.
Notice of Allowance issued in U.S. Appl. No. 12/059,867, filed Jul. 17, 2013; 22 pages.
Notice of Allowance issued in U.S. Appl. No. 12/059,971, filed Jun. 28, 2012; 12 pages.
Notice of Allowance issued in U.S. Appl. No. 12/060,062, filed Mar. 20, 2012; 16 pages.
Notice of Allowance issued in U.S. Appl. No. 12/060,062, filed Nov. 9, 2012; 7 pages.
Notice of Allowance issued in U.S. Appl. No. 12/060,144, filed Mar. 20, 2013; 12 pages.
Notice of Allowance issued in U.S. Appl. No. 12/060,149, filed Jul. 9, 2013; 18 pages.
Notice of Allowance issued in U.S. Appl. No. 12/060,155, filed Apr. 24, 2012; 15 pages.
Notice of Allowance issued in U.S. Appl. No. 12/060,155, filed Jan. 11, 2013; 5 pages.
Notice of Allowance issued in U.S. Appl. No. 12/060,171, filed Oct. 3, 2012; 10 pages.
Notice of Allowance issued in U.S. Appl. No. 12/060,178, filed Feb. 14, 2013; 7 pages.
Notice of Allowance issued in U.S. Appl. No. 12/060,192, filed Oct. 29, 2012; 12 pages.
Notice of Allowance issued in U.S. Appl. No. 12/147,378, filed Aug. 31, 2012; 9 pages.
Notice of Allowance issued in U.S. Appl. No. 12/147,395, filed Dec. 24, 2012; 11 pages.
Notice of Allowance issued in U.S. Appl. No. 12/323,116, Jun. 27, 2013; 8 pages.
Notice of Allowance issued in U.S. Appl. No. 12/323,116, Jun. 11, 2012; 10 pages.
Notice of Allowance issued in U.S. Appl. No. 12/323,139, Feb. 8, 2013; 9 pages.
Notice of Allowance issued in U.S. Appl. No. 12/147,414, Jun. 19, 2013; 23 pages.
Notice of Allowance issued in U.S. Appl. No. 12/323,139, Mar. 14, 2012; 10 pages.
Notice of Allowance issued in U.S. Appl. No. 12/571,140, Mar. 20, 2012; 16 pages.
Notice of Allowance issued in U.S. Appl. No. 12/571,140, Nov. 9, 2012; 8 pages.
Notice of Allowance issued in U.S. Appl. No. 12/815,618, May 7, 2013; 8 pages.
Notice of Allowance issued in U.S. Appl. No. 12/815,618, May 10, 2012; 7 pages.
Notice of Allowance issued in U.S. Appl.n No. 12/815,639, Sep. 24, 2012; 9 pages.
Notice of Allowance issued in U.S. Appl. No. 12/815,802, Nov. 27, 2012; 9 pages.
Notice of Allowance issued in U.S. Appl. No. 12/816,293, Sep. 19, 2012; 7 pages.
Notice of Allowance issued in U.S. Appl. No. 13/186,361, Jun. 10, 2013; 11 pages.
Notice of Allowance issued in U.S. Appl. No. 13/192,553, May 1, 2013; 21 pages.
Notice of Allowance issued in U.S. Appl. No. 13/192,574, Jun. 14, 2013; 11 pages.
Notice of Allowance issued in U.S. Appl. No. 13/754,608, Jul. 9, 2013; 12 pages.
Office Action issued in U.S. Appl. No. 11/864,786, Mar. 30, 2012; 12 pages.
Office Action issued in U.S. Appl. No. 12/571,154, Apr. 2, 2012; 13 pages.
Office Action issued in U.S. Appl. No. 12/571,154, Aug. 15, 2012; 15 pages.
Office Action issued in U.S. Appl. No. 12/815,576, Feb. 15, 2013; 13 pages.
Office Action issued in U.S. Appl. No. 12/815,576, Oct. 12, 2012; 11 pages.
Office Action issued in U.S. Appl. No. 12/815,639, May 24, 2012; 7 pages.
Office Action issued in U.S. Appl. No. 12/815,698, Jul. 20, 2012; 13 pages.
Office Action issued in U.S. Appl. No. 12/815,750, Feb. 21, 2013; 67 pages.
Office Action issued in U.S. Appl. No. 12/815,750, Sep. 28, 2012; 66 pages.
Office Action issued in U.S. Appl. No. 12/815,802, Jul. 20, 2012; 16 pages.
Office Action issued in U.S. Appl. No. 12/815,869, filed Feb. 15, 2013; 27 pages.
Office Action issued in U.S. Appl. No. 12/815,869, filed Jul. 18, 2013; 27 pages.
Office Action issued in U.S. Appl. No. 12/815,911, filed Feb. 25, 2013; 15 pages.
Office Action issued in U.S. Appl. No. 12/815,911, filed Sep. 26, 2012; 14 pages.
Office Action issued in U.S. Appl. No. 12/816,083, filed May 9, 2012; 20 pages.
Office Action issued in U.S. Appl. No. 12/816,083, filed Sep. 21, 2012; 22 pages.
Office Action issued in U.S. Appl. No. 12/816,170, filed Jul. 24, 2012; 9 pages.
Office Action issued in U.S. Appl. No. 12/816,268, filed Apr. 26, 2013; 17 pages.
Office Action issued in U.S. Appl. No. 12/816,268, filed Oct. 11, 2012; 11 pages.
Office Action issued in U.S. Appl. No. 12/816,293, filed Apr. 25, 2012; 10 pages.

(56) References Cited

OTHER PUBLICATIONS

Office Action issued in U.S. Appl. No. 12/823,996, filed Apr. 25, 2013; 8 pages.
Office Action issued in U.S. Appl. No. 12/823,996, filed Mar. 22, 2013, 7 pages.
Office Action issued in U.S. Appl. No. 13/186,361, filed Feb. 26, 2013, 10 pages.
Office Action issued in U.S. Appl. No. 13/192,543, filed Aug. 28, 2012; 14 pages.
Office Action issued in U.S. Appl. No. 13/192,543, filed Dec. 13, 2012; 26 pages.
Office Action issued in U.S. Appl. No. 13/192,553, filed Feb. 11, 2013, 23 pages.
Office Action issued in U.S. Appl. No. 13/192,555, filed Jul. 20, 2012; 7 pages.
Office Action issued in U.S. Appl. No. 13/192,555, filed Mar. 1, 2013; 11 pages.
Office Action issued in U.S. Appl. No. 13/192,564, filed Apr. 22, 2013; 21 pages.
Office Action issued in U.S. Appl. No. 13/192,574, filed Apr. 30, 2013; 5 pages.
Office Action issued in U.S. Appl. No. 13/192,574, filed Oct. 24, 2012; 6 pages.
Office Action issued in U.S. Appl. No. 13/192,599, filed Mar. 21, 2013; 29 pages.
Office Action issued in U.S. Appl. No. 13/192,612, filed Oct. 4, 2012; 12 pages.
Office Action issued in U.S. Appl. No. 13/218,876, filed Apr. 5, 2013; 10 pages.
Office Action issued in U.S. Appl. No. 13/218,876, filed Jul. 16, 2013; 14 pages.
Office Action issued in U.S. Appl. No. 13/349,477, filed Jun. 29, 2012; 13 pages.
Office Action issued in U.S. Appl. No. 13/349,477, filed Nov. 15, 2012; 15 pages.
Office Action issued in U.S. Appl. No. 13/535,419, filed Apr. 19, 2013; 14 pages.
Office Action issued in U.S. Appl. No. 13/535,433, filed Mar. 4, 2013; 11 pages.
Office Action issued in U.S. Appl. No. 13/535,433, filed Aug. 2, 2013; 11 pages.
Office Action issued in U.S. Appl. No. 13/535,453, filed Jul. 5, 2013; 22 pages.
Office Action issued in U.S. Appl. No. 13/535,512, filed Jul. 5, 2013; 10 pages.
Office Action issued in U.S. Appl. No. 13/535,521, filed Apr. 16, 2013; 16 pages.
Office Action issued in U.S. Appl. No. 13/535,648, filed Jun. 21, 2013; 14 pages.
Office Action issued in U.S. Appl. No. 13/535,667, filed Dec. 26, 2012; 9 pages.
Office Action issued in U.S. Appl. No. 13,535,667, filed Jun. 26, 2013; 12 pages.
Office Action issued in U.S. Appl. No. 13/535,674, filed Jul. 3, 2013; 17 pages.
Office Action issued in U.S. Appl. No. 13/535,723, filed Apr. 24, 2013; 16 pages.
Office Action issued in U.S. Appl. No. 13/535,881, filed Dec. 21, 2012; 7 pages.
Office Action Issued in U.S. Appl. No. 13/535,864, filed May 10, 2013; 9 pages.
Office Action issued in U.S. Appl. No. 13/754,608, filed Apr. 215, 2013; 15 pages.
Office Action issued in U.S. Appl. No. 13/535,670, filed Jun. 24, 2013; 13 pages.

* cited by examiner

FIG. 34-1

| Node Element Grouping | Level1 | Level2 | Level3 | Level4 | Cardinality | Data Type Name |
|---|---|---|---|---|---|---|
| EmployeeFundamentalMasterDataReplicateRequest 34000 | EmployeeFundamentalMasterDataReplicateRequest 34002 | | | | | EmployeeFundamentalMasterDataReplicateRequestMessage 34004 |
| | MessageHeader 34006 | MessageHeader 34008 | | | 1 34010 | BusinessDocumentMessageHeader 34012 |
| | EmployeeFundamentalMasterDataReplicateRequest 34014 | EmployeeFundamentalMasterDataReplicateRequest 34016 | | | 1 34018 | EmployeeFundamentalMasterDataReplicateRequest 34020 |
| | | | OrganisationalCentreSourceBusinessSystemIntermediateDocumentLogicalSystemID 34022 | | 0..1 34024 | IntermediateDocumentLogicalSystemID 34026 |

FIG. 34-2

| Node Element Grouping | Level1 | Level2 | Level3 | Level4 | Cardinality | Data Type Name |
|---|---|---|---|---|---|---|
| | | | BusinessDocument-FileName 34028 | | 0..1 34030 | LANGUAGEINDEPENDENT_MEDIUM_Name 34032 |
| | | | BusinessDocument-FileCreationDate 34034 | | 0..1 34036 | Date 34038 |
| | | | FundamentalData 34040 | | 1..N 34042 | EmployeeFundamentalMasterDataReplicateRequestFundamentalData 34044 |
| | | | | EmployeeID 34046 | 1 34048 | EmployeeID 34050 |
| | | | | EmployeeFirstName 34052 | 0..1 34054 | LANGUAGEINDEPENDENT_MEDIUM_Name 34056 |

FIG. 34-3

| Node Element Grouping | Level1 | Level2 | Level3 | Level4 | Cardinality | Data Type Name |
|---|---|---|---|---|---|---|
| | | | | EmployeeLastName 34058 | 0..1 34060 | LANGUAGEINDEPENDENT_MEDIUM_Name 34062 |
| | | | | EmployeeMiddleName 34064 | 0..1 34066 | LANGUAGEINDEPENDENT_MEDIUM_Name 34068 |
| | | | | EmployeeFormOfAddressCode 34070 | 0..1 34072 | FormOfAddressCode 34074 |
| | | | | EmployeeAcademicTitleCode 34076 | 0..1 34078 | AcademicTitleCode 34080 |
| | | | | EmployeeGenderCode 34082 | 0..1 34084 | GenderCode 34086 |
| | | | | EmployeeBirthDate 34088 | 0..1 34090 | Date 34092 |

FIG. 34-4

| Node Element Grouping | Level1 | Level2 | Level3 | Level4 | Cardinality | Data Type Name |
|---|---|---|---|---|---|---|
| | | | | EmployeeBirthPlaceName 34094 | 0..1 | LANGUAGEINDEPENDENT_MEDIUM_Name 34098 |
| | | | | 34096 | | |
| | | | | EmployeeMaritalStatusCode 34100 | 0..1 34102 | MaritalStatusCode 34104 |
| | | | | EmployeeNationalityCode 34106 | 0..1 34108 | CountryCode 34110 |
| | | | | EmployeePrivateAddressPhoneNumber 34112 | 0..1 34114 | LANGUAGEINDEPENDENT_SHORT_Description 34116 |
| | | | | EmployeePrivateAddressEmailURI 34118 | 0..1 34120 | EmailURI 34122 |

FIG. 34-5

| Node Element Grouping | Level1 | Level2 | Level3 | Level4 | Cardinality | Data Type Name |
|---|---|---|---|---|---|---|
| | | | | EmployeePrivateAddressMobilePhoneNumber 34124 | 0..1 | LANGUAGEINDEPENDENT_SHORT_Description 34126 |
| | | | | | | 34128 |
| | | | | EmployeePrivateAddressHouseID 34130 | 0..1 | HouseID 34132 |
| | | | | | | 34134 |
| | | | | EmployeePrivateAddressStreetName 34136 | 0..1 | StreetName 34138 |
| | | | | | | 34140 |
| | | | | EmployeePrivateAddressCityName 34142 | 0..1 | LANGUAGEINDEPENDENT_MEDIUM_Name 34144 |
| | | | | | | 34146 |
| | | | | EmployeePrivateAddressStateCode 34148 | 0..1 | RegionCode 34150 |
| | | | | | | 34152 |

FIG. 34-6

| Node Element Grouping | Level1 | Level2 | Level3 | Level4 | Cardinality | Data Type Name |
|---|---|---|---|---|---|---|
| | | | | EmployeePrivateAd- dressCountryCode  34154 | 0..1  34156 | CountryCode  34158 |
| | | | | EmployeePrivateAd- dressStreetPostalCode  34160 | 0..1  34162 | PostalCode  34164 |
| | | | | EmployeePrivateAd- dressPOBoxPostalCode  34166 | 0..1  34168 | PostalCode  34170 |
| | | | | EmployeePrivateAd- dressPOBoxID  34172 | 0..1  34174 | POBoxID  34176 |
| | | | | EmployeeOfficeAd- dressPhoneNumber  34178 | 0..1  34180 | LANGUAGEINDEPEND ENT_SHORT_Descripti on  34182 |

FIG. 34-7

| Node Element Grouping | Level1 | Level2 | Level3 | Level4 | Cardinality | Data Type Name |
|---|---|---|---|---|---|---|
| | | | | EmployeeOfficeAddress-sEmailURI 34184 | 0..1 34186 | EmailURI 34188 |
| | | | | EmployeeOfficeAddress-MobilePhoneNumber 34190 | 0..1 34192 | LANGUAGEINDEPENDENT_SHORT_Description 34194 |
| | | | | EmployeeOfficeAddress-FaxNumber 34196 | 0..1 34198 | LANGUAGEINDEPENDENT_SHORT_Description 34200 |
| | | | | EmployeeOfficeAddress-BuildingID 34202 | 0..1 34204 | BuildingID 34206 |
| | | | | EmployeeOfficeAddress-RoomID 34208 | 0..1 34210 | RoomID 34212 |

FIG. 34-8

| Node Element Grouping | Level1 | Level2 | Level3 | Level4 | Cardinality | Data Type Name |
|---|---|---|---|---|---|---|
| | | | | EmployeeOfficeAddress-InhouseMailID 34214 | 0..1 34216 | InhouseMailID 34218 |
| | | | | EmployeeHireDate 34220 | 0..1 34222 | Date 34224 |
| | | | | EmployeeLeavingDate 34226 | 1 34228 | Date 34230 |
| | | | | WorkAgreementTermina-tionDismissalIndicator 34232 | 1 34234 | Indicator 34236 |
| | | | | WorkAgreementType-Code 34238 | 0..1 34240 | WorkAgreementType-Code 34242 |
| | | | | WorkAgreementAdminis-trativeCategoryCode 34244 | 0..1 34246 | WorkAgreementAdmin-istrativeCategoryCode 34248 |

FIG. 34-9

| Node Element Grouping | Level1 | Level2 | Level3 | Level4 | Cardinality | Data Type Name |
|---|---|---|---|---|---|---|
| | | | | WorkAgreementServiceStartDate _34250_ | 0..1 _34252_ | Date _34254_ |
| | | | | AgreedWorkingHoursRate _34256_ | 0..1 _34258_ | AgreedWorkingHoursRate _34260_ |
| | | | | EmploymentCountryCode _34262_ | 0..1 _34264_ | CountryCode _34266_ |
| | | | | JobID _34268_ | 0..1 _34270_ | JobID _34272_ |
| | | | | OrganisationalCentreRemoteObjectID _34274_ | 1 _34276_ | NOCONVERSION_ObjectID _34278_ |

FIG. 37-1

| Node Element Grouping | Level1 | Level2 | Level3 | Level4 | Cardinality | Data Type Name |
|---|---|---|---|---|---|---|
| CostCentreReplicateRequest 37000 | CostCentreReplicateRequest 37002 | | | | | CostCentreReplicateRequestMessage 37004 |
| | MessageHeader 37006 | MessageHeader 37008 | | | 1 | BusinessDocumentMessageHeader 37010 37012 |
| | CostCentreReplicateRequest 37014 | CostCentreReplicateRequest 37016 | | | 1 | CostCentreReplicateRequest 37018 37020 |
| | | | BusinessDocumentFileName 37022 | | 0..1 | LANGUAGEINDEPENDENT_MEDIUM_Name 37024 37026 |
| | | | BusinessDocumentFileCreationDate 37028 | | 0..1 | Date 37030 37032 |

FIG. 37-2

| Node Element Grouping | Level1 | Level2 | Level3 | Level4 | Cardinality | Data Type Name |
|---|---|---|---|---|---|---|
| | | | BusinessDocumentFileSourceBusinessSystemIntermediateDocumentLogicalSystemID _37034_ | | 0..1 _37036_ | IntermediateDocumentLogicalSystemID _37038_ |
| | | | CostCentre _37040_ | | 1..N _37042_ | CostCentreReplicateRequestCostCentre _37044_ |
| | | | | ValidityPeriod _37046_ | 0..1 _37048_ | CLOSED_DatePeriod _37050_ |
| | | | | RemoteObjectID _37052_ | 0..1 _37054_ | NOCONVERSION_Object ID _37056_ |
| | | | | Name _37058_ | 0..1 _37060_ | LANGUAGEINDEPENDE NT_MEDIUM_Name _37062_ |

FIG. 37-3

| Node Element Grouping | Level1 | Level2 | Level3 | Level4 | Cardinality | Data Type Name |
|---|---|---|---|---|---|---|
| | | | | CostCentreTypeCode 37064 | 0..1 37066 | CostCentreTypeCode 37068 |
| | | | | PostingAllowedIndicator 37070 | 0..1 37072 | Indicator 37074 |
| | | | | PlanUsageAllowedIndicator 37076 | 0..1 37078 | Indicator 37080 |
| | | | | UpperLegalOrganisationalCentreRemoteObjectID 37082 | 0..1 37084 | NOCONVERSION_ObjectID 37086 |
| | | | | UpperManagerialOrganisationalCentreRemoteObjectID 37088 | 0..1 37090 | NOCONVERSION_ObjectID 37092 |

FIG. 37-4

| Node Element Grouping | Level1 | Level2 | Level3 | Level4 | Cardinality | Data Type Name |
|---|---|---|---|---|---|---|
| | | | | AssignedManagerEm-ployeeID 37094 | 0..1 37096 | EmployeeID 37098 |
| | | | | AssignedManagerEm-ployeeFormattedName 37100 | 0..1 37102 | LANGUAGEINDEPENDENT_LONG_Name 37104 |
| | | | | AssignedManagerEm-ployeeUserAccountID 37106 | 0..1 37108 | UserAccountID 37110 |

MANAGING CONSISTENT INTERFACES FOR EMPLOYEE DATA REPLICATION BUSINESS OBJECTS ACROSS HETEROGENEOUS SYSTEMS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The subject matter described herein relates generally to the generation and use of consistent interfaces (or services) derived from a business object model. More particularly, the present disclosure relates to the generation and use of consistent interfaces or services that are suitable for use across industries, across businesses, and across different departments within a business.

BACKGROUND

Transactions are common among businesses and between business departments within a particular business. During any given transaction, these business entities exchange information. For example, during a sales transaction, numerous business entities may be involved, such as a sales entity that sells merchandise to a customer, a financial institution that handles the financial transaction, and a warehouse that sends the merchandise to the customer. The end-to-end business transaction may require a significant amount of information to be exchanged between the various business entities involved. For example, the customer may send a request for the merchandise as well as some form of payment authorization for the merchandise to the sales entity, and the sales entity may send the financial institution a request for a transfer of funds from the customer's account to the sales entity's account.

Exchanging information between different business entities is not a simple task. This is particularly true because the information used by different business entities is usually tightly tied to the business entity itself. Each business entity may have its own program for handling its part of the transaction. These programs differ from each other because they typically are created for different purposes and because each business entity may use semantics that differ from the other business entities. For example, one program may relate to accounting, another program may relate to manufacturing, and a third program may relate to inventory control. Similarly, one program may identify merchandise using the name of the product while another program may identify the same merchandise using its model number. Further, one business entity may use U.S. dollars to represent its currency while another business entity may use Japanese Yen. A simple difference in formatting, e.g., the use of upper-case lettering rather than lower-case or title-case, makes the exchange of information between businesses a difficult task. Unless the individual businesses agree upon particular semantics, human interaction typically is required to facilitate transactions between these businesses. Because these "heterogeneous" programs are used by different companies or by different business areas within a given company, a need exists for a consistent way to exchange information and perform a business transaction between the different business entities.

Currently, many standards exist that offer a variety of interfaces used to exchange business information. Most of these interfaces, however, apply to only one specific industry and are not consistent between the different standards. Moreover, a number of these interfaces are not consistent within an individual standard.

SUMMARY

In a first aspect, a tangible computer readable medium includes program code for providing a message-based interface for exchanging information for employee master data replication requests. The medium comprises program code for receiving via a message-based interface derived from a common business object model, where the common business object model includes business objects having relationships that enable derivation of message-based interfaces and message packages, the message-based interface exposing at least one service as defined in a service registry and from a heterogeneous application executing in an environment of computer systems providing message-based services, a first message for providing a request to replicate fundamental employee master data that includes a first message package derived from the common business object model and hierarchically organized in memory as an employee fundamental master data replicate request message entity; and an employee fundamental master data replicate request package comprising an employee fundamental master data replicate request entity, where the employee fundamental master data replicate request entity comprises at least one fundamental data entity, where each fundamental data entity includes an employee identifier (ID), an employee leaving date, a work agreement termination dismissal indicator and an organisational centre remote object ID.

The medium further comprises program code for processing the first message according to the hierarchical organization of the first message package, where processing the first message includes unpacking the first message package based on the common business object model.

The medium further comprises program code for sending a second message to the heterogeneous application responsive to the first message, where the second message includes a second message package derived from the common business object model to provide consistent semantics with the first message package.

Implementations can include the following. The employee fundamental master data replicate request entity includes at least one of the following: an organisational centre source business system intermediate document logical system ID, a business document file name, and a business document file creation date. Each fundamental data entity further includes at least one of the following: an employee first name, an employee last name, an employee middle name, an employee form of address code, an employee academic title code, an employee gender code, an employee birth date, an employee birth place name, an employee marital status code, an employee nationality code, an employee private address phone number, an employee private address email uniform resource identifier (URI), an employee private address mobile phone number, an employee private address house ID, an employee private address street name, an employee private address city name, an employee private address state code, an employee private address country code, an employee private address street postal code, an employee private address post office (PO) box postal code, an employee private address PO box ID, an employee office address phone number, an employee office address email URI, an employee office address mobile phone number, an employee office address fax number, an employee office address building ID, an employee office address room ID, an employee office address in-house mail ID, an employee hire date, a work agreement type code, a work agreement administrative category code, a work agreement service start date, an agreed working hours rate, an employment country code, and a job ID.

In another aspect, a distributed system operates in a landscape of computer systems providing message-based services defined in a service registry. The system comprises a graphical user interface comprising computer readable instructions, embedded on tangible media, for providing a request to replicate fundamental employee master data using a request.

The system further comprises a first memory storing a user interface controller for processing the request and involving a message including a message package derived from a common business object model, where the common business object model includes business objects having relationships that enable derivation of message-based service interfaces and message packages, the message package hierarchically organized as an employee fundamental master data replicate request message entity; and an employee fundamental master data replicate request package comprising an employee fundamental master data replicate request entity, where the employee fundamental master data replicate request entity comprises at least one fundamental data entity, where each fundamental data entity includes an employee ID, an employee leaving date, a work agreement termination dismissal indicator and an organisational centre remote object ID.

The system further comprises a second memory, remote from the graphical user interface, storing a plurality of message-based service interfaces derived from the common business object model to provide consistent semantics with messages derived from the common business object model, where one of the message-based service interfaces processes the message according to the hierarchical organization of the message package, where processing the message includes unpacking the first message package based on the common business object model.

In another aspect, a tangible computer readable medium includes program code for providing a message-based interface for exchanging organisational centre replication request information. The medium comprises program code for receiving via a message-based interface derived from a common business object model, where the common business object model includes business objects having relationships that enable derivation of message-based interfaces and message packages, the message-based interface exposing at least one service as defined in a service registry and from a heterogeneous application executing in an environment of computer systems providing message-based services, a first message for providing a request to replicate cost centres that includes a first message package derived from the common business object model and hierarchically organized in memory as a cost centre replicate request message entity and a cost centre replicate request package comprising a cost centre replicate request entity, where the cost centre replicate request entity includes at least one cost centre entity.

The medium further comprises program code for processing the first message according to the hierarchical organization of the first message package, where processing the first message includes unpacking the first message package based on the common business object model.

The medium further comprises program code for sending a second message to the heterogeneous application responsive to the first message, where the second message includes a second message package derived from the common business object model to provide consistent semantics with the first message package.

Implementations can include the following. The cost centre replicate request entity includes at least one of the following: a business document file name, a business document file creation date, and a business document file source business system intermediate document logical system identifier (ID). Each cost centre entity includes at least one of the following: a validity period, a remote object ID, a name, a cost centre type code, a posting allowed indicator, a plan usage allowed indicator, an upper legal organisational centre remote object ID, an upper managerial organisational centre remote object ID, an assigned manager employee ID, an assigned manager employee formatted name, and an assigned manager employee user account ID.

In another aspect, a distributed system operates in a landscape of computer systems providing message-based services defined in a service registry. The system comprises a graphical user interface comprising computer readable instructions, embedded on tangible media, for providing a request to replicate cost centres using a request.

The system further comprises a first memory storing a user interface controller for processing the request and involving a message including a message package derived from a common business object model, where the common business object model includes business objects having relationships that enable derivation of message-based service interfaces and message packages, the message package hierarchically organized as a cost centre replicate request message entity and a cost centre replicate request package comprising a cost centre replicate request entity, where the cost centre replicate request entity includes at least one cost centre entity The system further comprises a second memory, remote from the graphical user interface, storing a plurality of message-based service interfaces derived from the common business object model to provide consistent semantics with messages derived from the common business object model, where one of the message-based service interfaces processes the message according to the hierarchical organization of the message package, where processing the message includes unpacking the first message package based on the common business object model.

Implementations can include the following. The first memory is remote from the graphical user interface. The first memory is remote from the second memory.

BRIEF DESCRIPTION OF THE DRAWINGS

FIGS. 34-1 through 34-9 collectively depict an example Employee Fundamental Master Data Replicate Request Element Structure.

FIGS. 37-1 through 37-4 collectively depict an example CostCentreReplicateRequest Element Structure.

DETAILED DESCRIPTION

A. Overview

Figure 1:
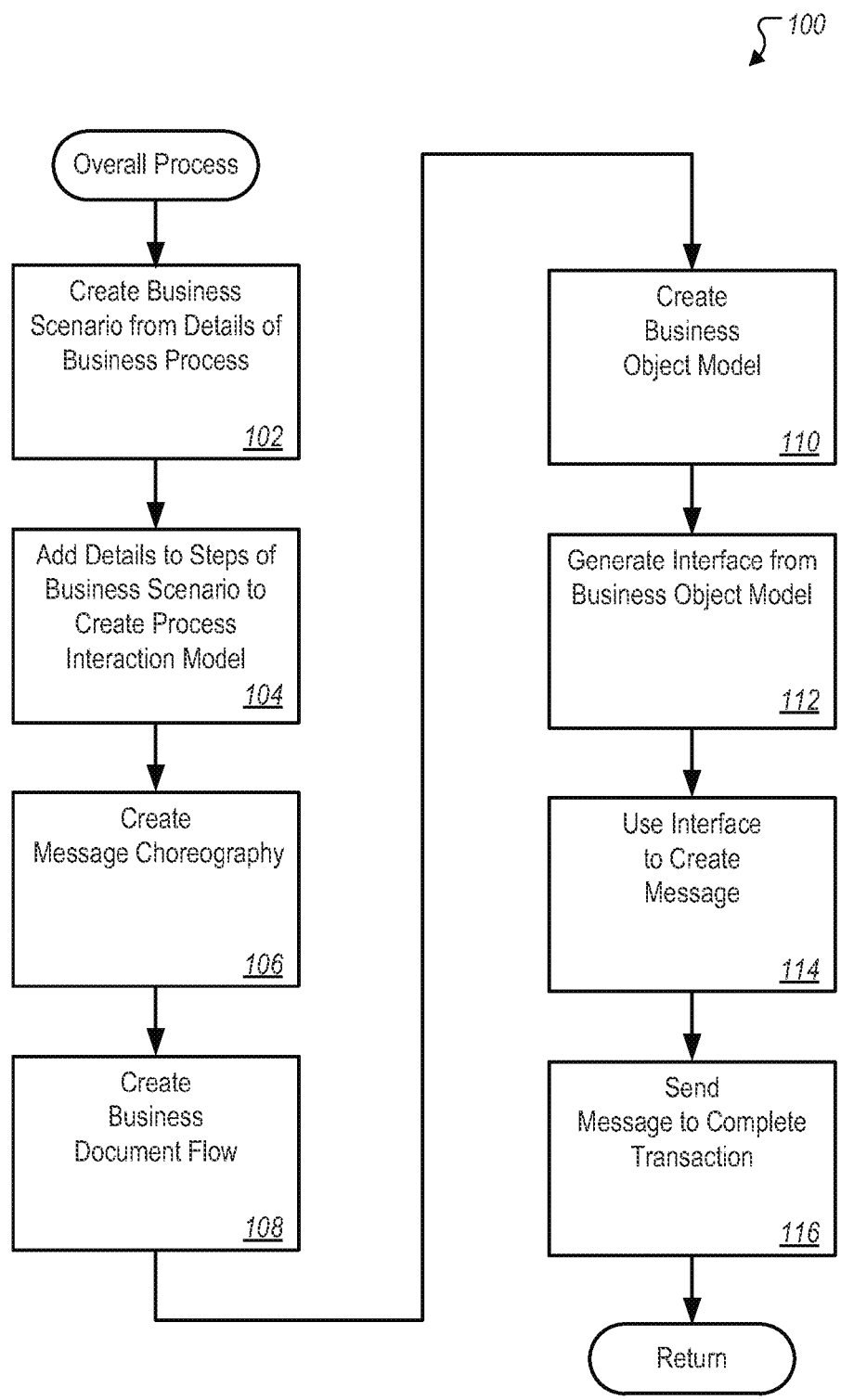
FIG. 1 depicts a flow diagram of the overall steps performed by methods and systems consistent with the subject matter described herein.

Methods and systems consistent with the subject matter described herein facilitate e-commerce by providing consistent interfaces that are suitable for use across industries, across businesses, and across different departments within a business during a business transaction. To generate consistent interfaces, methods and systems consistent with the subject matter described herein utilize a business object model, which reflects the data that will be used during a given business transaction. An example of a business transaction is the exchange of purchase orders and order confirmations between a buyer and a seller. The business object model is generated in a hierarchical manner to ensure that the same type of data is represented the same way throughout the business object model. This ensures the consistency of the information in the business object model. Consistency is also reflected in the semantic meaning of the various structural elements. That is, each structural element has a consistent business meaning. For example, the location entity, regardless of in which package it is located, refers to a location.

From this business object model, various interfaces are derived to accomplish the functionality of the business transaction. Interfaces provide an entry point for components to access the functionality of an application. For example, the interface for a Purchase Order Request provides an entry point for components to access the functionality of a Purchase Order, in particular, to transmit and/or receive a Purchase Order Request. One skilled in the art will recognize that each of these interfaces may be provided, sold, distributed, utilized, or marketed as a separate product or as a major component of a separate product. Alternatively, a group of related interfaces may be provided, sold, distributed, utilized, or marketed as a product or as a major component of a separate product. Because the interfaces are generated from the business object model, the information in the interfaces is consistent, and the interfaces are consistent among the business entities. Such consistency facilitates heterogeneous business entities in cooperating to accomplish the business transaction.

Generally, the business object is a representation of a type of a uniquely identifiable business entity (an object instance) described by a structural model. In the architecture, processes may typically operate on business objects. Business objects represent a specific view on some well-defined business content. In other words, business objects represent content, which a typical business user would expect and understand with little explanation. Business objects are further categorized as business process objects and master data objects. A master data object is an object that encapsulates master data (i.e., data that is valid for a period of time). A business process object, which is the kind of business object generally found in a process component, is an object that encapsulates transactional data (i.e., data that is valid for a point in time). The term business object will be used generically to refer to a business process object and a master data object, unless the context requires otherwise. Properly implemented, business objects are implemented free of redundancies.

The architectural elements also include the process component. The process component is a software package that realizes a business process and generally exposes its functionality as services. The functionality contains business transactions. In general, the process component contains one or more semantically related business objects. Often, a particular business object belongs to no more than one process component. Interactions between process component pairs involving their respective business objects, process agents, operations, interfaces, and messages are described as process component interactions, which generally determine the interactions of a pair of process components across a deployment unit boundary. Interactions between process components within a deployment unit are typically not constrained by the architectural design and can be implemented in any convenient fashion. Process components may be modular and context-independent. In other words, process components may not be specific to any particular application and as such, may be reusable. In some implementations, the process component is the smallest (most granular) element of reuse in the architecture. An external process component is generally used to represent the external system in describing interactions with the external system; however, this should be understood to require no more of the external system than that able to produce and receive messages as required by the process component that interacts with the external system. For example, process components may include multiple operations that may provide interaction with the external system. Each operation generally belongs to one type of process component in the architecture. Operations can be synchronous or asynchronous, corresponding to synchronous or asynchronous process agents, which will be described below. The operation is often the smallest, separately-callable function, described by a set of data types used as input, output, and fault parameters serving as a signature.

The architectural elements may also include the service interface, referred to simply as the interface. The interface is a named group of operations. The interface often belongs to one process component and process component might contain multiple interfaces. In one implementation, the service interface contains only inbound or outbound operations, but not a mixture of both. One interface can contain both synchronous and asynchronous operations. Normally, operations of the same type (either inbound or outbound) which belong to the same message choreography will belong to the same interface. Thus, generally, all outbound operations to the same other process component are in one interface.

The architectural elements also include the message. Operations transmit and receive messages. Any convenient messaging infrastructure can be used. A message is information conveyed from one process component instance to another, with the expectation that activity will ensue. Operation can use multiple message types for inbound, outbound, or error messages. When two process components are in different deployment units, invocation of an operation of one process component by the other process component is accomplished by the operation on the other process component sending a message to the first process component.

The architectural elements may also include the process agent. Process agents do business processing that involves the sending or receiving of messages. Each operation normally has at least one associated process agent. Each process agent can be associated with one or more operations. Process agents can be either inbound or outbound and either synchronous or asynchronous. Asynchronous outbound process agents are called after a business object changes such as after a "create", "update", or "delete" of a business object instance. Synchronous outbound process agents are generally triggered directly by business object. An outbound process agent will generally perform some processing of the data of the business object instance whose change triggered the event. The outbound agent triggers to subsequent business process steps by sending messages using well-defined outbound services to another process component, which generally will be in another deployment unit, or to an external system. The outbound process agent is linked to the one business object that triggers the agent, but it is sent not to another business object but rather to another process component. Thus, the outbound process agent can be implemented without knowledge of the exact business object design of the recipient process component. Alternatively, the process agent may be inbound. For example, inbound process agents may be used for the inbound part of a message-based communication. Inbound process agents are called after a message has been received. The inbound process agent starts the execution of the business process step requested in a message by creating or updating one or multiple business object instances. Inbound process agent is not generally the agent of business object but of its process component. Inbound process agent can act on multiple business objects in a process component. Regardless of whether the process agent is inbound or outbound, an agent may be synchronous if used when a process component requires a more or less immediate response from another process component, and is waiting for that response to continue its work.

The architectural elements also include the deployment unit. Each deployment unit may include one or more process components that are generally deployed together on a single computer system platform. Conversely, separate deployment units can be deployed on separate physical computing systems. The process components of one deployment unit can interact with those of another deployment unit using messages passed through one or more data communication networks or other suitable communication channels. Thus, a deployment unit deployed on a platform belonging to one business can interact with a deployment unit software entity deployed on a separate platform belonging to a different and unrelated business, allowing for business-to-business communication. More than one instance of a given deployment unit can execute at the same time, on the same computing system or on separate physical computing systems. This arrangement allows the functionality offered by the deployment unit to be scaled to meet demand by creating as many instances as needed.

Since interaction between deployment units is through process component operations, one deployment unit can be replaced by other another deployment unit as long as the new deployment unit supports the operations depended upon by other deployment units as appropriate. Thus, while deployment units can depend on the external interfaces of process components in other deployment units, deployment units are not dependent on process component interaction within other deployment units. Similarly, process components that interact with other process components or external systems only through messages, e.g., as sent and received by operations, can also be replaced as long as the replacement generally supports the operations of the original.

Services (or interfaces) may be provided in a flexible architecture to support varying criteria between services and systems. The flexible architecture may generally be provided by a service delivery business object. The system may be able to schedule a service asynchronously as necessary, or on a regular basis. Services may be planned according to a schedule manually or automatically. For example, a follow-up service may be scheduled automatically upon completing an initial service. In addition, flexible execution periods may be possible (e.g. hourly, daily, every three months, etc.). Each customer may plan the services on demand or reschedule service execution upon request.

FIG. 1 depicts a flow diagram 100 showing an example technique, perhaps implemented by systems similar to those disclosed herein. Initially, to generate the business object model, design engineers study the details of a business process, and model the business process using a "business scenario" (step 102). The business scenario identifies the steps performed by the different business entities during a business process. Thus, the business scenario is a complete representation of a clearly defined business process.

After creating the business scenario, the developers add details to each step of the business scenario (step 104). In particular, for each step of the business scenario, the developers identify the complete process steps performed by each business entity. A discrete portion of the business scenario reflects a "business transaction," and each business entity is referred to as a "component" of the business transaction. The developers also identify the messages that are transmitted between the components. A "process interaction model" represents the complete process steps between two components.

After creating the process interaction model, the developers create a "message choreography" (step 106), which depicts the messages transmitted between the two components in the process interaction model. The developers then represent the transmission of the messages between the components during a business process in a "business document flow" (step 108). Thus, the business document flow illustrates the flow of information between the business entities during a business process.

Figure 2:
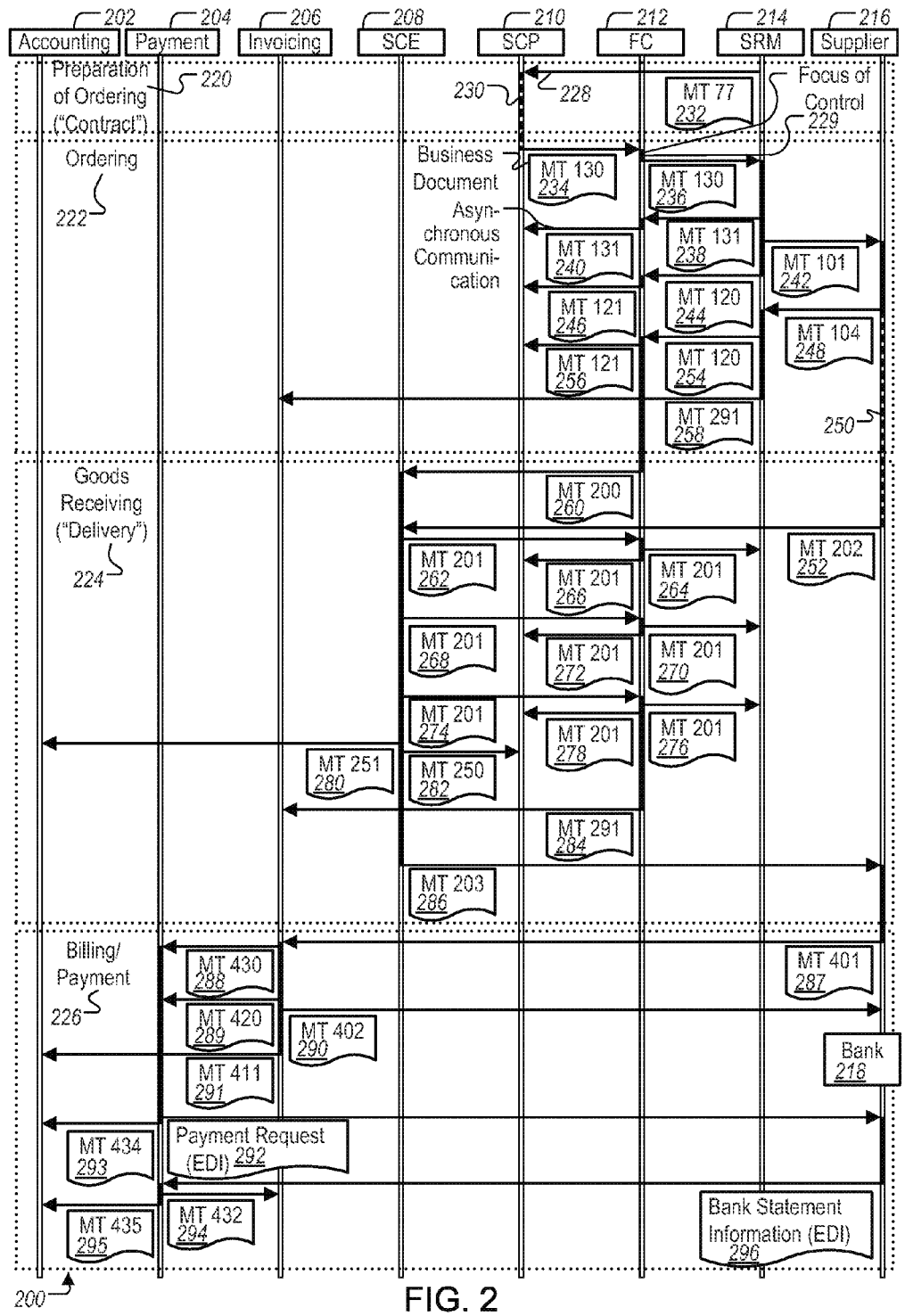
FIG. 2 depicts a business document flow for an invoice request in accordance with methods and systems consistent with the subject matter described herein.

FIG. 2 depicts an example business document flow 200 for the process of purchasing a product or service. The business entities involved with the illustrative purchase process include Accounting 202, Payment 204, Invoicing 206, Supply Chain Execution ("SCE") 208, Supply Chain Planning ("SCP") 210, Fulfillment Coordination ("FC") 212, Supply Relationship Management ("SRM") 214, Supplier 216, and Bank 218. The business document flow 200 is divided into four different transactions: Preparation of Ordering ("Contract") 220, Ordering 222, Goods Receiving ("Delivery") 224, and Billing/Payment 226. In the business document flow, arrows 228 represent the transmittal of documents. Each document reflects a message transmitted between entities. One of ordinary skill in the art will appreciate that the messages transferred may be considered to be a communications protocol. The process flow follows the focus of control, which is depicted as a solid vertical line (e.g., 229) when the step is required, and a dotted vertical line (e.g., 230) when the step is optional.

During the Contract transaction 220, the SRM 214 sends a Source of Supply Notification 232 to the SCP 210. This step is optional, as illustrated by the optional control line 230 coupling this step to the remainder of the business document flow 200. During the Ordering transaction 222, the SCP 210 sends a Purchase Requirement Request 234 to the FC 212, which forwards a Purchase Requirement Request 236 to the SRM 214. The SRM 214 then sends a Purchase Requirement Confirmation 238 to the FC 212, and the FC 212 sends a Purchase Requirement Confirmation 240 to the SCP 210. The SRM 214 also sends a Purchase Order Request 242 to the Supplier 216, and sends Purchase Order Information 244 to the FC 212. The FC 212 then sends a Purchase Order Planning Notification 246 to the SCP 210. The Supplier 216, after receiving the Purchase Order Request 242, sends a Purchase Order Confirmation 248 to the SRM 214, which sends a Purchase Order Information confirmation message 254 to the FC 212, which sends a message 256 confirming the Purchase Order Planning Notification to the SCP 210. The SRM 214 then sends an Invoice Due Notification 258 to Invoicing 206.

During the Delivery transaction 224, the FC 212 sends a Delivery Execution Request 260 to the SCE 208. The Supplier 216 could optionally (illustrated at control line 250) send a Dispatched Delivery Notification 252 to the SCE 208. The SCE 208 then sends a message 262 to the FC 212 notifying the FC 212 that the request for the Delivery Information was created. The FC 212 then sends a message 264 notifying the SRM 214 that the request for the Delivery Information was created. The FC 212 also sends a message 266 notifying the SCP 210 that the request for the Delivery Information was created. The SCE 208 sends a message 268 to the FC 212 when the goods have been set aside for delivery. The FC 212 sends a message 270 to the SRM 214 when the goods have been set aside for delivery. The FC 212 also sends a message 272 to the SCP 210 when the goods have been set aside for delivery.

The SCE 208 sends a message 274 to the FC 212 when the goods have been delivered. The FC 212 then sends a message 276 to the SRM 214 indicating that the goods have been delivered, and sends a message 278 to the SCP 210 indicating that the goods have been delivered. The SCE 208 then sends an Inventory Change Accounting Notification 280 to Accounting 202, and an Inventory Change Notification 282 to the SCP 210. The FC 212 sends an Invoice Due Notification 284 to Invoicing 206, and SCE 208 sends a Received Delivery Notification 286 to the Supplier 216.

During the Billing/Payment transaction 226, the Supplier 216 sends an Invoice Request 287 to Invoicing 206. Invoicing 206 then sends a Payment Due Notification 288 to Payment 204, a Tax Due Notification 289 to Payment 204, an Invoice Confirmation 290 to the Supplier 216, and an Invoice Accounting Notification 291 to Accounting 202. Payment 204 sends a Payment Request 292 to the Bank 218, and a Payment Requested Accounting Notification 293 to Accounting 202. Bank 218 sends a Bank Statement Information 296 to Payment 204. Payment 204 then sends a Payment Done Information 294 to Invoicing 206 and a Payment Done Accounting Notification 295 to Accounting 202.

Within a business document flow, business documents having the same or similar structures are marked. For example, in the business document flow 200 depicted in FIG. 2, Purchase Requirement Requests 234, 236 and Purchase Requirement Confirmations 238, 240 have the same structures. Thus, each of these business documents is marked with an "O6." Similarly, Purchase Order Request 242 and Purchase Order Confirmation 248 have the same structures. Thus, both documents are marked with an "O1." Each business document or message is based on a message type.

From the business document flow, the developers identify the business documents having identical or similar structures, and use these business documents to create the business object model (step 110). The business object model includes the objects contained within the business documents. These objects are reflected as packages containing related information, and are arranged in a hierarchical structure within the business object model, as discussed below.

Methods and systems consistent with the subject matter described herein then generate interfaces from the business object model (step 112). The heterogeneous programs use instantiations of these interfaces (called "business document objects" below) to create messages (step 114), which are sent to complete the business transaction (step 116). Business entities use these messages to exchange information with other business entities during an end-to-end business transaction. Since the business object model is shared by heterogeneous programs, the interfaces are consistent among these programs. The heterogeneous programs use these consistent interfaces to communicate in a consistent manner, thus facilitating the business transactions.

Standardized Business-to-Business ("B2B") messages are compliant with at least one of the e-business standards (i.e., they include the business-relevant fields of the standard). The e-business standards include, for example, RosettaNet for the high-tech industry, Chemical Industry Data Exchange ("CIDX"), Petroleum Industry Data Exchange ("PIDX") for the oil industry, UCCnet for trade, PapiNet for the paper industry, Odette for the automotive industry, HR-XML for human resources, and XML Common Business Library ("xCBL"). Thus, B2B messages enable simple integration of components in heterogeneous system landscapes. Application-to-Application ("A2A") messages often exceed the standards and thus may provide the benefit of the full functionality of application components. Although various steps of FIG. 1 were described as being performed manually, one skilled in the art will appreciate that such steps could be computer-assisted or performed entirely by a computer, including being performed by either hardware, software, or any other combination thereof.

B. Implementation Details

As discussed above, methods and systems consistent with the subject matter described herein create consistent interfaces by generating the interfaces from a business object model. Details regarding the creation of the business object model, the generation of an interface from the business object model, and the use of an interface generated from the business object model are provided below.

Figure 3A:
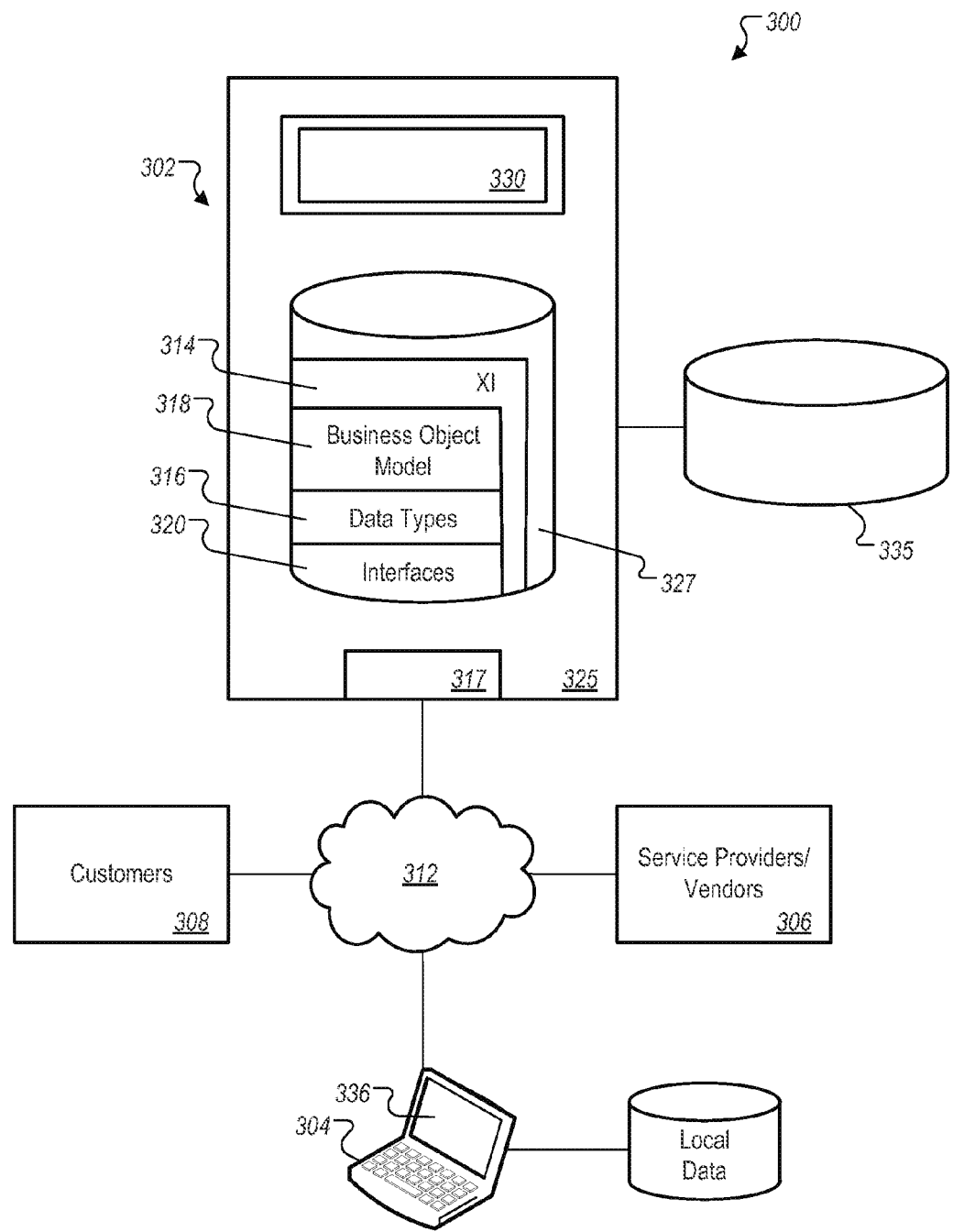
FIGS. 3A-B illustrate example environments implementing the transmission, receipt, and processing of data between heterogeneous applications in accordance with certain embodiments included in the present disclosure.

Turning to the illustrated embodiment in FIG. 3A, environment 300 includes or is communicably coupled (such as via a one-, bi- or multi-directional link or network) with server 302, one or more clients 304, one or more or vendors 306, one or more customers 308, at least some of which communicate across network 312. But, of course, this illustration is for example purposes only, and any distributed system or environment implementing one or more of the techniques described herein may be within the scope of this disclosure. Server 302 comprises an electronic computing device operable to receive, transmit, process and store data associated with environment 300. Generally, FIG. 3A provides merely one example of computers that may be used with the disclosure. Each computer is generally intended to encompass any suitable processing device. For example, although FIG. 3A illustrates one server 302 that may be used with the disclosure, environment 300 can be implemented using computers other than servers, as well as a server pool. Indeed, server 302 may be any computer or processing device such as, for example, a blade server, general-purpose personal computer (PC), Macintosh, workstation, Unix-based computer, or any other suitable device. In other words, the present disclosure contemplates computers other than general purpose computers as well as computers without conventional operating systems. Server 302 may be adapted to execute any operating system including Linux, UNIX, Windows Server, or any other suitable operating system. According to one embodiment, server 302 may also include or be communicably coupled with a web server and/or a mail server.

As illustrated (but not required), the server 302 is communicably coupled with a relatively remote repository 335 over a portion of the network 312. The repository 335 is any electronic storage facility, data processing center, or archive that may supplement or replace local memory (such as 327). The repository 335 may be a central database communicably coupled with the one or more servers 302 and the clients 304 via a virtual private network (VPN), SSH (Secure Shell) tunnel, or other secure network connection. The repository 335 may be physically or logically located at any appropriate location including in one of the example enterprises or offshore, so long as it remains operable to store information associated with the environment 300 and communicate such data to the server 302 or at least a subset of plurality of the clients 304.

Illustrated server 302 includes local memory 327. Memory 327 may include any memory or database module and may take the form of volatile or non-volatile memory including, without limitation, magnetic media, optical media, random access memory (RAM), read-only memory (ROM), removable media, or any other suitable local or remote memory component. Illustrated memory 327 includes an exchange infrastructure ("XI") 314, which is an infrastructure that supports the technical interaction of business processes across heterogeneous system environments. XI 314 centralizes the communication between components within a business entity and between different business entities. When appropriate, XI 314 carries out the mapping between the messages. XI 314 integrates different versions of systems implemented on different platforms (e.g., Java and ABAP). XI 314 is based on an open architecture, and makes use of open standards, such as eXtensible Markup Language (XML)™ and Java environments. XI 314 offers services that are useful in a heterogeneous and complex system landscape. In particular, XI 314 offers a runtime infrastructure for message exchange, configuration options for managing business processes and message flow, and options for transforming message contents between sender and receiver systems.

XI 314 stores data types 316, a business object model 318, and interfaces 320. The details regarding the business object model are described below. Data types 316 are the building blocks for the business object model 318. The business object model 318 is used to derive consistent interfaces 320. XI 314 allows for the exchange of information from a first company having one computer system to a second company having a second computer system over network 312 by using the standardized interfaces 320.

While not illustrated, memory 327 may also include business objects and any other appropriate data such as services, interfaces, VPN applications or services, firewall policies, a security or access log, print or other reporting files, HTML files or templates, data classes or object interfaces, child software applications or sub-systems, and others. This stored data may be stored in one or more logical or physical repositories. In some embodiments, the stored data (or pointers thereto) may be stored in one or more tables in a relational database described in terms of SQL statements or scripts. In the same or other embodiments, the stored data may also be formatted, stored, or defined as various data structures in text files, XML documents, Virtual Storage Access Method (VSAM) files, flat files, Btrieve files, comma-separated-value (CSV) files, internal variables, or one or more libraries. For example, a particular data service record may merely be a pointer to a particular piece of third party software stored remotely. In another example, a particular data service may be an internally stored software object usable by authenticated customers or internal development. In short, the stored data may comprise one table or file or a plurality of tables or files stored on one computer or across a plurality of computers in any appropriate format. Indeed, some or all of the stored data may be local or remote without departing from the scope of this disclosure and store any type of appropriate data.

Server 302 also includes processor 325. Processor 325 executes instructions and manipulates data to perform the operations of server 302 such as, for example, a central processing unit (CPU), a blade, an application specific integrated circuit (ASIC), or a field-programmable gate array (FPGA). Although FIG. 3A illustrates a single processor 325 in server 302, multiple processors 325 may be used according to particular needs and reference to processor 325 is meant to include multiple processors 325 where applicable. In the illustrated embodiment, processor 325 executes at least business application 330.

Figure 4:
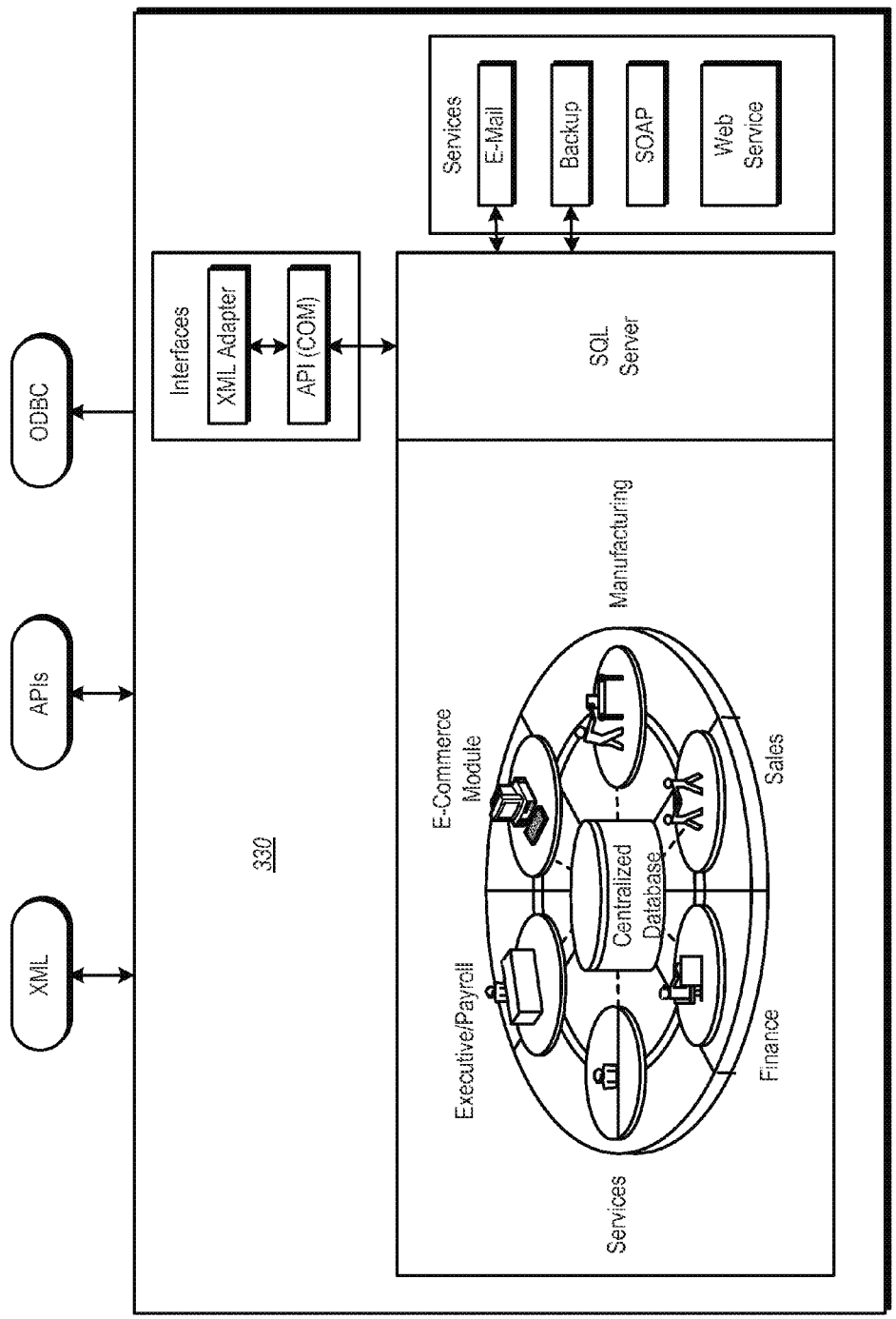
FIG. 4 illustrates an example application implementing certain techniques and components in accordance with one embodiment of the system of FIG. 1.

At a high level, business application 330 is any application, program, module, process, or other software that utilizes or facilitates the exchange of information via messages (or services) or the use of business objects. For example, application 330 may implement, utilize or otherwise leverage an enterprise service-oriented architecture (enterprise SOA), which may be considered a blueprint for an adaptable, flexible, and open IT architecture for developing services-based, enterprise-scale business solutions. This example enterprise service may be a series of web services combined with business logic that can be accessed and used repeatedly to support a particular business process. Aggregating web services into business-level enterprise services helps provide a more meaningful foundation for the task of automating enterprise-scale business scenarios Put simply, enterprise services help provide a holistic combination of actions that are semantically linked to complete the specific task, no matter how many cross-applications are involved. In certain cases, environment 300 may implement a composite application 330, as described below in FIG. 4. Regardless of the particular implementation, "software" may include software, firmware, wired or programmed hardware, or any combination thereof as appropriate. Indeed, application 330 may be written or described in any appropriate computer language including C, C++, Java, Visual Basic, assembler, Perl, any suitable version of 4GL, as well as others. For example, returning to the above mentioned composite application, the composite application portions may be implemented as Enterprise Java Beans (EJBs) or the design-time components may have the ability to generate run-time implementations into different platforms, such as J2EE (Java 2 Platform, Enterprise Edition), ABAP (Advanced Business Application Programming) objects, or Microsoft's .NET. It will be understood that while application 330 is illustrated in FIG. 4 as including various sub-modules, application 330 may include numerous other sub-modules or may instead be a single multi-tasked module that implements the various features and functionality through various objects, methods, or other processes. Further, while illustrated as internal to server 302, one or more processes associated with application 330 may be stored, referenced, or executed remotely. For example, a portion of application 330 may be a web service that is remotely called, while another portion of application 330 may be an interface object bundled for processing at remote client 304. Moreover, application 330 may be a child or sub-module of another software module or enterprise application (not illustrated) without departing from the scope of this disclosure. Indeed, application 330 may be a hosted solution that allows multiple related or third parties in different portions of the process to perform the respective processing.

More specifically, as illustrated in FIG. 4, application 330 may be a composite application, or an application built on other applications, that includes an object access layer (OAL) and a service layer. In this example, application 330 may execute or provide a number of application services, such as customer relationship management (CRM) systems, human resources management (HRM) systems, financial management (FM) systems, project management (PM) systems, knowledge management (KM) systems, and electronic file and mail systems. Such an object access layer is operable to exchange data with a plurality of enterprise base systems and to present the data to a composite application through a uniform interface. The example service layer is operable to provide services to the composite application. These layers may help the composite application to orchestrate a business process in synchronization with other existing processes (e.g., native processes of enterprise base systems) and leverage existing investments in the IT platform. Further, composite application 330 may run on a heterogeneous IT platform. In doing so, composite application may be cross-functional in that it may drive business processes across different applications, technologies, and organizations. Accordingly, composite application 330 may drive end-to-end business processes across heterogeneous systems or sub-systems. Application 330 may also include or be coupled with a persistence layer and one or more application system connectors. Such application system connectors enable data exchange and integration with enterprise sub-systems and may include an Enterprise Connector (EC) interface, an Internet Communication Manager/Internet Communication Framework (ICM/ICF) interface, an Encapsulated PostScript (EPS) interface, and/or other interfaces that provide Remote Function Call (RFC) capability. It will be understood that while this example describes a composite application 330, it may instead be a standalone or (relatively) simple software program. Regardless, application 330 may also perform processing automatically, which may indicate that the appropriate processing is substantially performed by at least one component of environment 300. It should be understood that automatically further contemplates any suitable administrator or other user interaction with application 330 or other components of environment 300 without departing from the scope of this disclosure.

Returning to FIG. 3A, illustrated server 302 may also include interface 317 for communicating with other computer systems, such as clients 304, over network 312 in a client-server or other distributed environment. In certain embodiments, server 302 receives data from internal or external senders through interface 317 for storage in memory 327, for storage in DB 335, and/or processing by processor 325. Generally, interface 317 comprises logic encoded in software and/or hardware in a suitable combination and operable to communicate with network 312. More specifically, interface 317 may comprise software supporting one or more communications protocols associated with communications network 312 or hardware operable to communicate physical signals.

Network 312 facilitates wireless or wireline communication between computer server 302 and any other local or remote computer, such as clients 304. Network 312 may be all or a portion of an enterprise or secured network. In another example, network 312 may be a VPN merely between server 302 and client 304 across wireline or wireless link. Such an example wireless link may be via 802.11a, 802.11b, 802.11g, 802.20, WiMax, and many others. While illustrated as a single or continuous network, network 312 may be logically divided into various sub-nets or virtual networks without departing from the scope of this disclosure, so long as at least portion of network 312 may facilitate communications between server 302 and at least one client 304. For example, server 302 may be communicably coupled to one or more "local" repositories through one sub-net while communicably coupled to a particular client 304 or "remote" repositories through another. In other words, network 312 encompasses any internal or external network, networks, sub-network, or combination thereof operable to facilitate communications between various computing components in environment 300. Network 312 may communicate, for example, Internet Protocol (IP) packets, Frame Relay frames, Asynchronous Transfer Mode (ATM) cells, voice, video, data, and other suitable information between network addresses. Network 312 may include one or more local area networks (LANs), radio access networks (RANs), metropolitan area networks (MANs), wide area networks (WANs), all or a portion of the global computer network known as the Internet, and/or any other communication system or systems at one or more locations. In certain embodiments, network 312 may be a secure network associated with the enterprise and certain local or remote vendors 306 and customers 308. As used in this disclosure, customer 308 is any person, department, organization, small business, enterprise, or any other entity that may use or request others to use environment 300. As described above, vendors 306 also may be local or remote to customer 308. Indeed, a particular vendor 306 may provide some content to business application 330, while receiving or purchasing other content (at the same or different times) as customer 308. As illustrated, customer 308 and vendor 06 each typically perform some processing (such as uploading or purchasing content) using a computer, such as client 304.

Client 304 is any computing device operable to connect or communicate with server 302 or network 312 using any communication link. For example, client 304 is intended to encompass a personal computer, touch screen terminal, workstation, network computer, kiosk, wireless data port, smart phone, personal data assistant (PDA), one or more processors within these or other devices, or any other suitable processing device used by or for the benefit of business 308, vendor 306, or some other user or entity. At a high level, each client 304 includes or executes at least GUI 336 and comprises an electronic computing device operable to receive, transmit, process and store any appropriate data associated with environment 300. It will be understood that there may be any number of clients 304 communicably coupled to server 302. Further, "client 304," "business," "business analyst," "end user," and "user" may be used interchangeably as appropriate without departing from the scope of this disclosure. Moreover, for ease of illustration, each client 304 is described in terms of being used by one user. But this disclosure contemplates that many users may use one computer or that one user may use multiple computers. For example, client 304 may be a PDA operable to wirelessly connect with external or unsecured network. In another example, client 304 may comprise a laptop that includes an input device, such as a keypad, touch screen, mouse, or other device that can accept information, and an output device that conveys information associated with the operation of server 302 or clients 304, including digital data, visual information, or GUI 336. Both the input device and output device may include fixed or removable storage media such as a magnetic computer disk, CD-ROM, or other suitable media to both receive input from and provide output to users of clients 304 through the display, namely the client portion of GUI or application interface 336.

GUI 336 comprises a graphical user interface operable to allow the user of client 304 to interface with at least a portion of environment 300 for any suitable purpose, such as viewing application or other transaction data. Generally, GUI 336 provides the particular user with an efficient and user-friendly presentation of data provided by or communicated within environment 300. For example, GUI 336 may present the user with the components and information that is relevant to their task, increase reuse of such components, and facilitate a sizable developer community around those components. GUI 336 may comprise a plurality of customizable frames or views having interactive fields, pull-down lists, and buttons operated by the user. For example, GUI 336 is operable to display data involving business objects and interfaces in a user-friendly form based on the user context and the displayed data. In another example, GUI 336 is operable to display different levels and types of information involving business objects and interfaces based on the identified or supplied user role. GUI 336 may also present a plurality of portals or dashboards. For example, GUI 336 may display a portal that allows users to view, create, and manage historical and real-time reports including role-based reporting and such. Of course, such reports may be in any appropriate output format including PDF, HTML, and printable text. Real-time dashboards often provide table and graph information on the current state of the data, which may be supplemented by business objects and interfaces. It should be understood that the term graphical user interface may be used in the singular or in the plural to describe one or more graphical user interfaces and each of the displays of a particular graphical user interface. Indeed, reference to GUI 336 may indicate a reference to the front-end or a component of business application 330, as well as the particular interface accessible via client 304, as appropriate, without departing from the scope of this disclosure. Therefore, GUI 336 contemplates any graphical user interface, such as a generic web browser or touchscreen, that processes information in environment 300 and efficiently presents the results to the user. Server 302 can accept data from client 304 via the web browser (e.g., Microsoft Internet Explorer or Netscape Navigator) and return the appropriate HTML or XML responses to the browser using network 312.

Figure 3B:
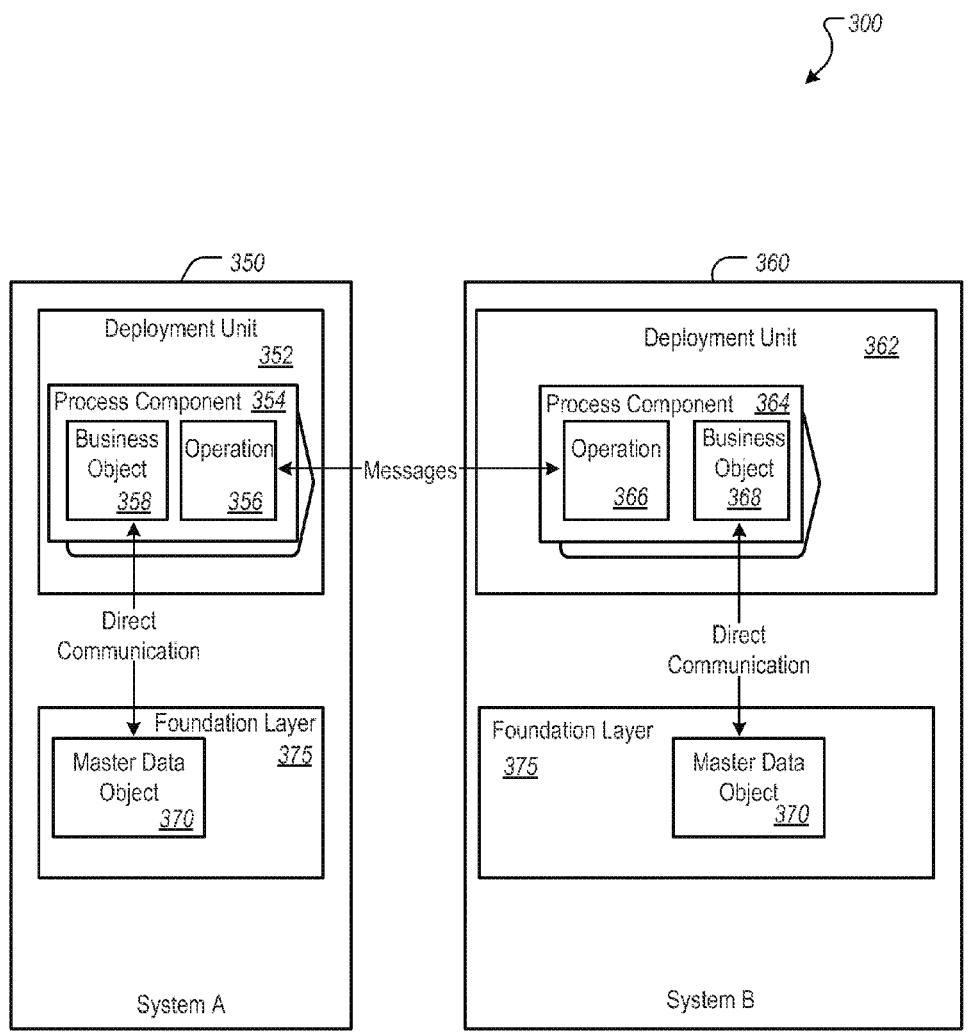

More generally in environment 300 as depicted in FIG. 3B, a Foundation Layer 375 can be deployed on multiple separate and distinct hardware platforms, e.g., System A 350 and System B 360, to support application software deployed as two or more deployment units distributed on the platforms, including deployment unit 352 deployed on System A and deployment unit 362 deployed on System B. In this example, the foundation layer can be used to support application software deployed in an application layer. In particular, the foundation layer can be used in connection with application software implemented in accordance with a software architecture that provides a suite of enterprise service operations having various application functionality. In some implementations, the application software is implemented to be deployed on an application platform that includes a foundation layer that contains all fundamental entities that can used from multiple deployment units. These entities can be process components, business objects, and reuse service components. A reuse service component is a piece of software that is reused in different transactions. A reuse service component is used by its defined interfaces, which can be, e.g., local APIs or service interfaces. As explained above, process components in separate deployment units interact through service operations, as illustrated by messages passing between service operations 356 and 366, which are implemented in process components 354 and 364, respectively, which are included in deployment units 352 and 362, respectively. As also explained above, some form of direct communication is generally the form of interaction used between a business object, e.g., business object 358 and 368, of an application deployment unit and a business object, such as master data object 370, of the Foundation Layer 375.

Various components of the present disclosure may be modeled using a model-driven environment. For example, the model-driven framework or environment may allow the developer to use simple drag-and-drop techniques to develop pattern-based or freestyle user interfaces and define the flow of data between them. The result could be an efficient, customized, visually rich online experience. In some cases, this model-driven development may accelerate the application development process and foster business-user self-service. It further enables business analysts or IT developers to compose visually rich applications that use analytic services, enterprise services, remote function calls (RFCs), APIs, and stored procedures. In addition, it may allow them to reuse existing applications and create content using a modeling process and a visual user interface instead of manual coding.

Figure 5A:
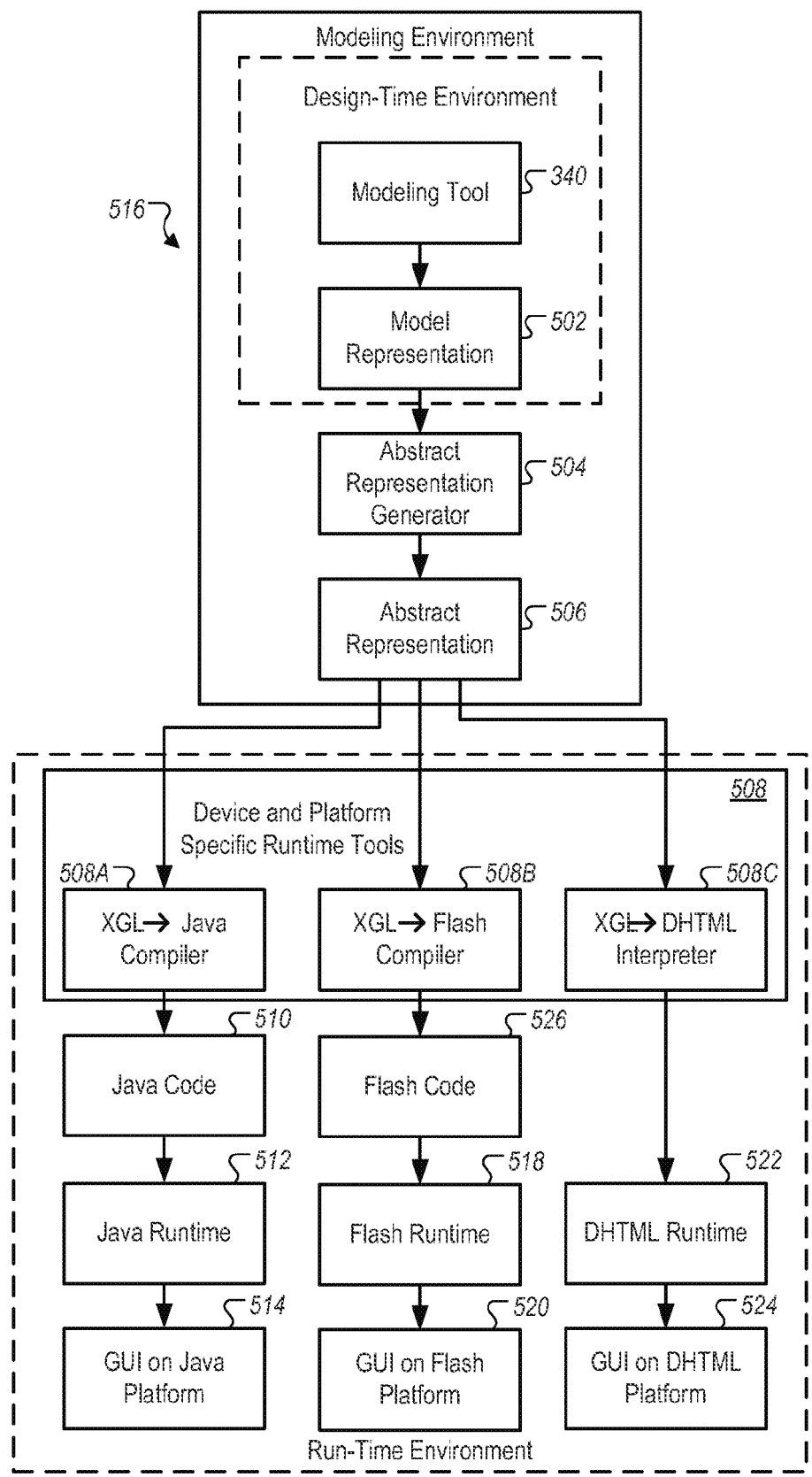
FIG. 5A depicts an example development environment in accordance with one embodiment of FIG. 1.

FIG. 5A depicts an example modeling environment 516, namely a modeling environment, in accordance with one embodiment of the present disclosure. Thus, as illustrated in FIG. 5A, such a modeling environment 516 may implement techniques for decoupling models created during design-time from the runtime environment. In other words, model representations for GUIs created in a design time environment are decoupled from the runtime environment in which the GUIs are executed. Often in these environments, a declarative and executable representation for GUIs for applications is provided that is independent of any particular runtime platform, GUI framework, device, or programming language.

According to some embodiments, a modeler (or other analyst) may use the model-driven modeling environment 516 to create pattern-based or freestyle user interfaces using simple drag-and-drop services. Because this development may be model-driven, the modeler can typically compose an application using models of business objects without having to write much, if any, code. In some cases, this example modeling environment 516 may provide a personalized, secure interface that helps unify enterprise applications, information, and processes into a coherent, role-based portal experience. Further, the modeling environment 516 may allow the developer to access and share information and applications in a collaborative environment. In this way, virtual collaboration rooms allow developers to work together efficiently, regardless of where they are located, and may enable powerful and immediate communication that crosses organizational boundaries while enforcing security requirements. Indeed, the modeling environment 516 may provide a shared set of services for finding, organizing, and accessing unstructured content stored in third-party repositories and content management systems across various networks 312. Classification tools may automate the organization of information, while subject-matter experts and content managers can publish information to distinct user audiences. Regardless of the particular implementation or architecture, this modeling environment 516 may allow the developer to easily model hosted business objects 140 using this model-driven approach.

In certain embodiments, the modeling environment 516 may implement or utilize a generic, declarative, and executable GUI language (generally described as XGL). This example XGL is generally independent of any particular GUI framework or runtime platform. Further, XGL is normally not dependent on characteristics of a target device on which the graphic user interface is to be displayed and may also be independent of any programming language. XGL is used to generate a generic representation (occasionally referred to as the XGL representation or XGL-compliant representation) for a design-time model representation. The XGL representation is thus typically a device-independent representation of a GUI. The XGL representation is declarative in that the representation does not depend on any particular GUI framework, runtime platform, device, or programming language. The XGL representation can be executable and therefore can unambiguously encapsulate execution semantics for the GUI described by a model representation. In short, models of different types can be transformed to XGL representations.

The XGL representation may be used for generating representations of various different GUIs and supports various GUI features including full windowing and componentization support, rich data visualizations and animations, rich modes of data entry and user interactions, and flexible connectivity to any complex application data services. While a specific embodiment of XGL is discussed, various other types of XGLs may also be used in alternative embodiments. In other words, it will be understood that XGL is used for example description only and may be read to include any abstract or modeling language that can be generic, declarative, and executable.

Turning to the illustrated embodiment in FIG. 5A, modeling tool 340 may be used by a GUI designer or business analyst during the application design phase to create a model representation 502 for a GUI application. It will be understood that modeling environment 516 may include or be compatible with various different modeling tools 340 used to generate model representation 502. This model representation 502 may be a machine-readable representation of an application or a domain specific model. Model representation 502 generally encapsulates various design parameters related to the GUI such as GUI components, dependencies between the GUI components, inputs and outputs, and the like. Put another way, model representation 502 provides a form in which the one or more models can be persisted and transported, and possibly handled by various tools such as code generators, runtime interpreters, analysis and validation tools, merge tools, and the like. In one embodiment, model representation 502 may be a collection of XML documents with a well-formed syntax.

Illustrated modeling environment 516 also includes an abstract representation generator (or XGL generator) 504 operable to generate an abstract representation (for example, XGL representation or XGL-compliant representation) 506 based upon model representation 502. Abstract representation generator 504 takes model representation 502 as input and outputs abstract representation 506 for the model representation. Model representation 502 may include multiple instances of various forms or types depending on the tool/language used for the modeling. In certain cases, these various different model representations may each be mapped to one or more abstract representations 506. Different types of model representations may be transformed or mapped to XGL representations. For each type of model representation, mapping rules may be provided for mapping the model representation to the XGL representation 506. Different mapping rules may be provided for mapping a model representation to an XGL representation.

This XGL representation 506 that is created from a model representation may then be used for processing in the runtime environment. For example, the XGL representation 506 may be used to generate a machine-executable runtime GUI (or some other runtime representation) that may be executed by a target device. As part of the runtime processing, the XGL representation 506 may be transformed into one or more runtime representations, which may indicate source code in a particular programming language, machine-executable code for a specific runtime environment, executable GUI, and so forth, which may be generated for specific runtime environments and devices. Since the XGL representation 506, rather than the design-time model representation, is used by the runtime environment, the design-time model representation is decoupled from the runtime environment. The XGL representation 506 can thus serve as the common ground or interface between design-time user interface modeling tools and a plurality of user interface runtime frameworks. It provides a self-contained, closed, and deterministic definition of all aspects of a graphical user interface in a device-independent and programming-language independent manner. Accordingly, abstract representation 506 generated for a model representation 502 is generally declarative and executable in that it provides a representation of the GUI of model representation 502 that is not dependent on any device or runtime platform, is not dependent on any programming language, and unambiguously encapsulates execution semantics for the GUI. The execution semantics may include, for example, identification of various components of the GUI, interpretation of connections between the various GUI components, information identifying the order of sequencing of events, rules governing dynamic behavior of the GUI, rules governing handling of values by the GUI, and the like. The abstract representation 506 is also not GUI runtime-platform specific. The abstract representation 506 provides a self-contained, closed, and deterministic definition of all aspects of a graphical user interface that is device independent and language independent.

Abstract representation 506 is such that the appearance and execution semantics of a GUI generated from the XGL representation work consistently on different target devices irrespective of the GUI capabilities of the target device and the target device platform. For example, the same XGL representation may be mapped to appropriate GUIs on devices of differing levels of GUI complexity (i.e., the same abstract representation may be used to generate a GUI for devices that support simple GUIs and for devices that can support complex GUIs), the GUI generated by the devices are consistent with each other in their appearance and behavior.

Abstract representation generator 504 may be configured to generate abstract representation 506 for models of different types, which may be created using different modeling tools 340. It will be understood that modeling environment 516 may include some, none, or other sub-modules or components as those shown in this example illustration. In other words, modeling environment 516 encompasses the design-time environment (with or without the abstract generator or the various representations), a modeling toolkit (such as 340) linked with a developer's space, or any other appropriate software operable to decouple models created during design-time from the runtime environment. Abstract representation 506 provides an interface between the design time environment and the runtime environment. As shown, this abstract representation 506 may then be used by runtime processing.

As part of runtime processing, modeling environment 516 may include various runtime tools 508 and may generate different types of runtime representations based upon the abstract representation 506. Examples of runtime representations include device or language-dependent (or specific) source code, runtime platform-specific machine-readable code, GUIs for a particular target device, and the like. The runtime tools 508 may include compilers, interpreters, source code generators, and other such tools that are configured to generate runtime platform-specific or target device-specific runtime representations of abstract representation 506. The runtime tool 508 may generate the runtime representation from abstract representation 506 using specific rules that map abstract representation 506 to a particular type of runtime representation. These mapping rules may be dependent on the type of runtime tool, characteristics of the target device to be used for displaying the GUI, runtime platform, and/or other factors. Accordingly, mapping rules may be provided for transforming the abstract representation 506 to any number of target runtime representations directed to one or more target GUI runtime platforms. For example, XGL-compliant code generators may conform to semantics of XGL, as described below. XGL-compliant code generators may ensure that the appearance and behavior of the generated user interfaces is preserved across a plurality of target GUI frameworks, while accommodating the differences in the intrinsic characteristics of each and also accommodating the different levels of capability of target devices.

For example, as depicted in example FIG. 5A, an XGL-to-Java compiler 508A may take abstract representation 506 as input and generate Java code 510 for execution by a target device comprising a Java runtime 512. Java runtime 512 may execute Java code 510 to generate or display a GUI 514 on a Java-platform target device. As another example, an XGL-to-Flash compiler 508B may take abstract representation 506 as input and generate Flash code 526 for execution by a target device comprising a Flash runtime 518. Flash runtime 518 may execute Flash code 516 to generate or display a GUI 520 on a target device comprising a Flash platform. As another example, an XGL-to-DHTML (dynamic HTML) interpreter 508C may take abstract representation 506 as input and generate DHTML statements (instructions) on the fly which are then interpreted by a DHTML runtime 522 to generate or display a GUI 524 on a target device comprising a DHTML platform.

It should be apparent that abstract representation 506 may be used to generate GUIs for Extensible Application Markup Language (XAML) or various other runtime platforms and devices. The same abstract representation 506 may be mapped to various runtime representations and device-specific and runtime platform-specific GUIs. In general, in the runtime environment, machine executable instructions specific to a runtime environment may be generated based upon the abstract representation 506 and executed to generate a GUI in the runtime environment. The same XGL representation may be used to generate machine executable instructions specific to different runtime environments and target devices.

According to certain embodiments, the process of mapping a model representation 502 to an abstract representation 506 and mapping an abstract representation 506 to some runtime representation may be automated. For example, design tools may automatically generate an abstract representation for the model representation using XGL and then use the XGL abstract representation to generate GUIs that are customized for specific runtime environments and devices. As previously indicated, mapping rules may be provided for mapping model representations to an XGL representation. Mapping rules may also be provided for mapping an XGL representation to a runtime platform-specific representation.

Since the runtime environment uses abstract representation 506 rather than model representation 502 for runtime processing, the model representation 502 that is created during design-time is decoupled from the runtime environment. Abstract representation 506 thus provides an interface between the modeling environment and the runtime environment. As a result, changes may be made to the design time environment, including changes to model representation 502 or changes that affect model representation 502, generally to not substantially affect or impact the runtime environment or tools used by the runtime environment. Likewise, changes may be made to the runtime environment generally to not substantially affect or impact the design time environment. A designer or other developer can thus concentrate on the design aspects and make changes to the design without having to worry about the runtime dependencies such as the target device platform or programming language dependencies.

Figure 5B:
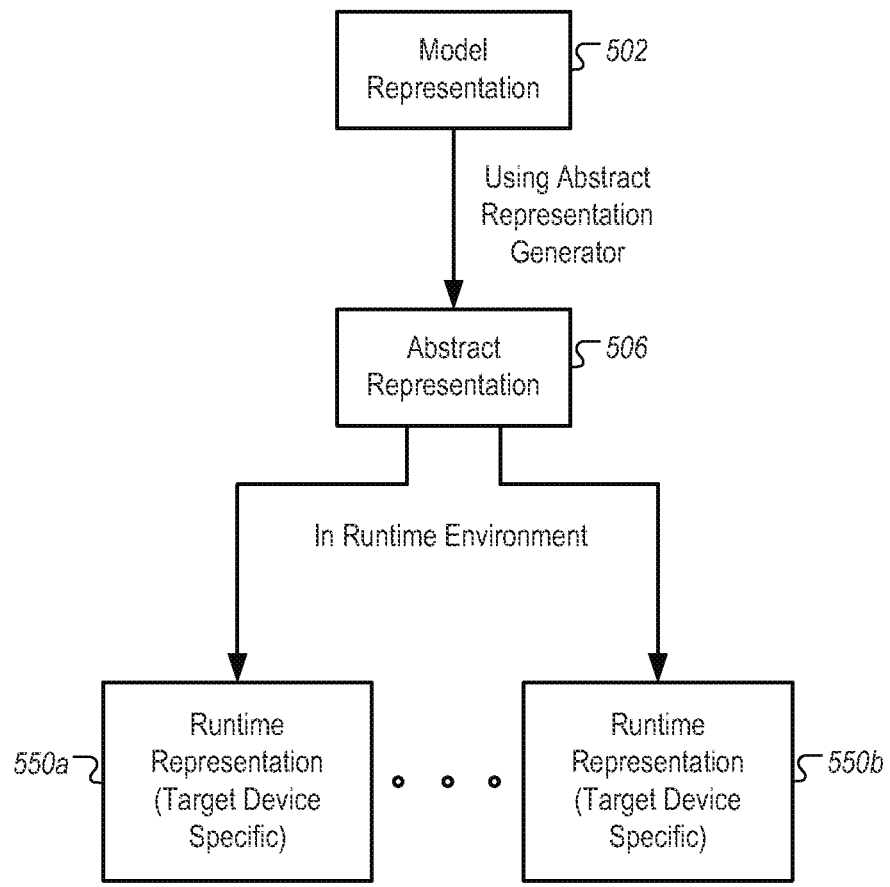
FIG. 5B depicts a simplified process for mapping a model representation to a runtime representation using the example development environment of FIG. 5A or some other development environment.

FIG. 5B depicts an example process for mapping a model representation 502 to a runtime representation using the example modeling environment 516 of FIG. 5A or some other modeling environment. Model representation 502 may comprise one or more model components and associated properties that describe a data object, such as hosted business objects and interfaces. As described above, at least one of these model components is based on or otherwise associated with these hosted business objects and interfaces. The abstract representation 506 is generated based upon model representation 502. Abstract representation 506 may be generated by the abstract representation generator 504. Abstract representation 506 comprises one or more abstract GUI components and properties associated with the abstract GUI components. As part of generation of abstract representation 506, the model GUI components and their associated properties from the model representation are mapped to abstract GUI components and properties associated with the abstract GUI components. Various mapping rules may be provided to facilitate the mapping. The abstract representation encapsulates both appearance and behavior of a GUI. Therefore, by mapping model components to abstract components, the abstract representation not only specifies the visual appearance of the GUI but also the behavior of the GUI, such as in response to events whether clicking/dragging or scrolling, interactions between GUI components and such.

One or more runtime representations 550a, including GUIs for specific runtime environment platforms, may be generated from abstract representation 506. A device-dependent runtime representation may be generated for a particular type of target device platform to be used for executing and displaying the GUI encapsulated by the abstract representation. The GUIs generated from abstract representation 506 may comprise various types of GUI elements such as buttons, windows, scrollbars, input boxes, etc. Rules may be provided for mapping an abstract representation to a particular runtime representation. Various mapping rules may be provided for different runtime environment platforms.

Methods and systems consistent with the subject matter described herein provide and use interfaces 320 derived from the business object model 318 suitable for use with more than one business area, for example different departments within a company such as finance, or marketing. Also, they are suitable across industries and across businesses. Interfaces 320 are used during an end-to-end business transaction to transfer business process information in an application-independent manner. For example the interfaces can be used for fulfilling a sales order.

1. Message Overview

To perform an end-to-end business transaction, consistent interfaces are used to create business documents that are sent within messages between heterogeneous programs or modules.

a) Message Categories

Figure 6:
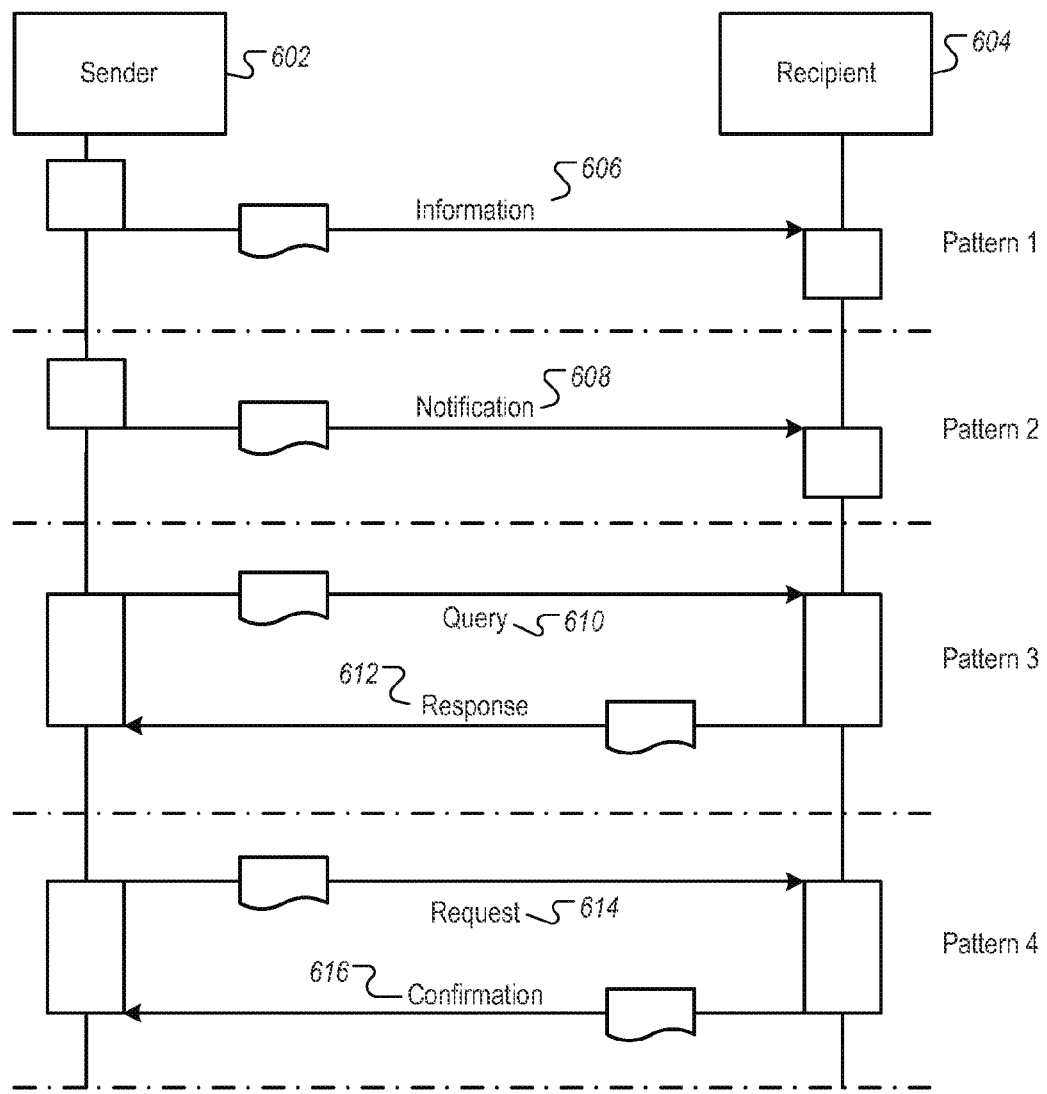
FIG. 6 depicts message categories in accordance with methods and systems consistent with the subject matter described herein.

As depicted in FIG. 6, the communication between a sender 602 and a recipient 604 can be broken down into basic categories that describe the type of the information exchanged and simultaneously suggest the anticipated reaction of the recipient 604. A message category is a general business classification for the messages. Communication is sender-driven. In other words, the meaning of the message categories is established or formulated from the perspective of the sender 602. The message categories include information 606, notification 608, query 610, response 612, request 614, and confirmation 616.

(1) Information

Information 606 is a message sent from a sender 602 to a recipient 604 concerning a condition or a statement of affairs. No reply to information is expected. Information 606 is sent to make business partners or business applications aware of a situation. Information 606 is not compiled to be application-specific. Examples of "information" are an announcement, advertising, a report, planning information, and a message to the business warehouse.

(2) Notification

A notification 608 is a notice or message that is geared to a service. A sender 602 sends the notification 608 to a recipient 604. No reply is expected for a notification. For example, a billing notification relates to the preparation of an invoice while a dispatched delivery notification relates to preparation for receipt of goods.

(3) Query

A query 610 is a question from a sender 602 to a recipient 604 to which a response 612 is expected. A query 610 implies no assurance or obligation on the part of the sender 602. Examples of a query 610 are whether space is available on a specific flight or whether a specific product is available. These queries do not express the desire for reserving the flight or purchasing the product.

(4) Response

A response 612 is a reply to a query 610. The recipient 604 sends the response 612 to the sender 602. A response 612 generally implies no assurance or obligation on the part of the recipient 604. The sender 602 is not expected to reply. Instead, the process is concluded with the response 612. Depending on the business scenario, a response 612 also may include a commitment, i.e., an assurance or obligation on the part of the recipient 604. Examples of responses 612 are a response stating that space is available on a specific flight or that a specific product is available. With these responses, no reservation was made.

(5) Request

A request 614 is a binding requisition or requirement from a sender 602 to a recipient 604. Depending on the business scenario, the recipient 604 can respond to a request 614 with a confirmation 616. The request 614 is binding on the sender 602. In making the request 614, the sender 602 assumes, for example, an obligation to accept the services rendered in the request 614 under the reported conditions. Examples of a request 614 are a parking ticket, a purchase order, an order for delivery and a job application.

(6) Confirmation

A confirmation 616 is a binding reply that is generally made to a request 614. The recipient 604 sends the confirmation 616 to the sender 602. The information indicated in a confirmation 616, such as deadlines, products, quantities and prices, can deviate from the information of the preceding request 614. A request 614 and confirmation 616 may be used in negotiating processes. A negotiating process can consist of a series of several request 614 and confirmation 616 messages. The confirmation 616 is binding on the recipient 604. For example, 100 units of X may be ordered in a purchase order request; however, only the delivery of 80 units is confirmed in the associated purchase order confirmation.

b) Message Choreography

A message choreography is a template that specifies the sequence of messages between business entities during a given transaction. The sequence with the messages contained in it describes in general the message "lifecycle" as it proceeds between the business entities. If messages from a choreography are used in a business transaction, they appear in the transaction in the sequence determined by the choreography. This illustrates the template character of a choreography, i.e., during an actual transaction, it is not necessary for all messages of the choreography to appear. Those messages that are contained in the transaction, however, follow the sequence within the choreography. A business transaction is thus a derivation of a message choreography. The choreography makes it possible to determine the structure of the individual message types more precisely and distinguish them from one another.

2. Components of the Business Object Model

The overall structure of the business object model ensures the consistency of the interfaces that are derived from the business object model. The derivation ensures that the same business-related subject matter or concept is represented and structured in the same way in all interfaces.

The business object model defines the business-related concepts at a central location for a number of business transactions. In other words, it reflects the decisions made about modeling the business entities of the real world acting in business transactions across industries and business areas. The business object model is defined by the business objects and their relationship to each other (the overall net structure).

Each business object is generally a capsule with an internal hierarchical structure, behavior offered by its operations, and integrity constraints. Business objects are semantically disjoint, i.e., the same business information is represented once. In the business object model, the business objects are arranged in an ordering framework. From left to right, they are arranged according to their existence dependency to each other. For example, the customizing elements may be arranged on the left side of the business object model, the strategic elements may be arranged in the center of the business object model, and the operative elements may be arranged on the right side of the business object model. Similarly, the business objects are arranged from the top to the bottom based on defined order of the business areas, e.g., finance could be arranged at the top of the business object model with CRM below finance and SRM below CRM.

To ensure the consistency of interfaces, the business object model may be built using standardized data types as well as packages to group related elements together, and package templates and entity templates to specify the arrangement of packages and entities within the structure.

a) Data Types

Data types are used to type object entities and interfaces with a structure. This typing can include business semantic. Such data types may include those generally described at pages 96 through 1642 (which are incorporated by reference herein) of U.S. patent application Ser. No. 11/803,178, filed on May 11, 2007 and entitled "Consistent Set Of Interfaces Derived From A Business Object Model". For example, the data type BusinessTransactionDocumentID is a unique identifier for a document in a business transaction. Also, as an example, Data type BusinessTransactionDocumentParty contains the information that is exchanged in business documents about a party involved in a business transaction, and includes the party's identity, the party's address, the party's contact person and the contact person's address. BusinessTransactionDocumentParty also includes the role of the party, e.g., a buyer, seller, product recipient, or vendor.

The data types are based on Core Component Types ("CCTs"), which themselves are based on the World Wide Web Consortium ("W3C") data types. "Global" data types represent a business situation that is described by a fixed structure. Global data types include both context-neutral generic data types ("GDTs") and context-based context data types ("CDTs"). GDTs contain business semantics, but are application-neutral, i.e., without context. CDTs, on the other hand, are based on GDTs and form either a use-specific view of the GDTs, or a context-specific assembly of GDTs or CDTs. A message is typically constructed with reference to a use and is thus a use-specific assembly of GDTs and CDTs. The data types can be aggregated to complex data types.

To achieve a harmonization across business objects and interfaces, the same subject matter is typed with the same data type. For example, the data type "GeoCoordinates" is built using the data type "Measure" so that the measures in a GeoCoordinate (i.e., the latitude measure and the longitude measure) are represented the same as other "Measures" that appear in the business object model.

b) Entities

Entities are discrete business elements that are used during a business transaction. Entities are not to be confused with business entities or the components that interact to perform a transaction. Rather, "entities" are one of the layers of the business object model and the interfaces. For example, a Catalogue entity is used in a Catalogue Publication Request and a Purchase Order is used in a Purchase Order Request. These entities are created using the data types defined above to ensure the consistent representation of data throughout the entities.

c) Packages

Packages group the entities in the business object model and the resulting interfaces into groups of semantically associated information. Packages also may include "sub"-packages, i.e., the packages may be nested.

Figure 7:
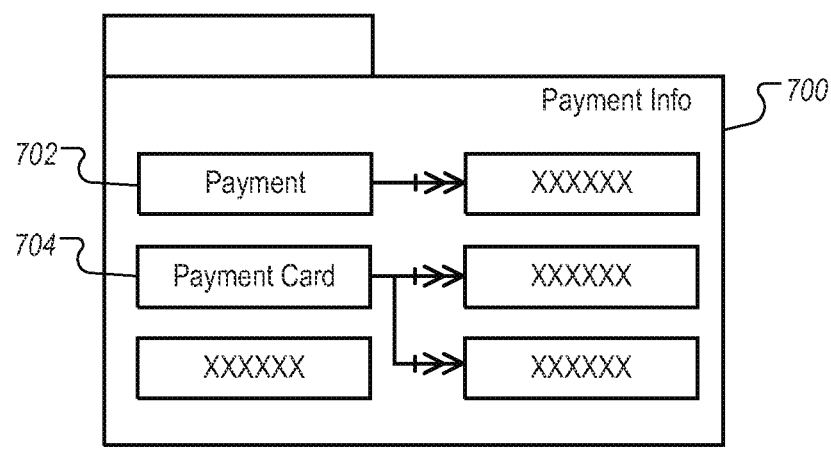
FIG. 7 depicts an example of a package in accordance with methods and systems consistent with the subject matter described herein.

Packages may group elements together based on different factors, such as elements that occur together as a rule with regard to a business-related aspect. For example, as depicted in FIG. 7, in a Purchase Order, different information regarding the purchase order, such as the type of payment 702, and payment card 704, are grouped together via the PaymentInformation package 700.

Figure 8:
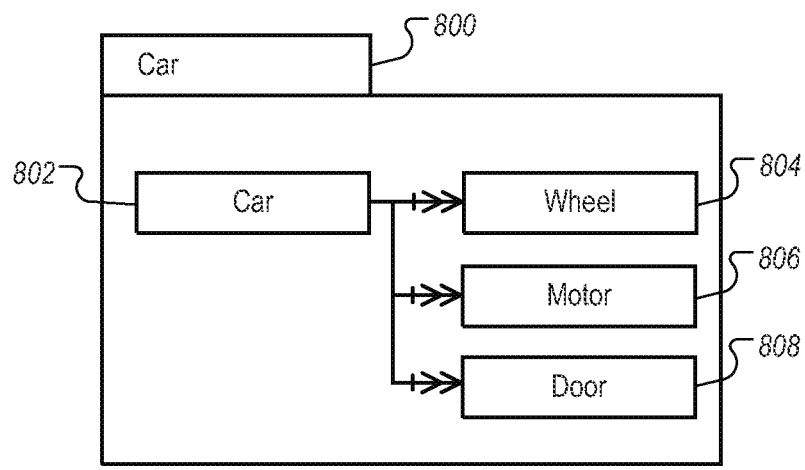
FIG. 8 depicts another example of a package in accordance with methods and systems consistent with the subject matter described herein.

Packages also may combine different components that result in a new object. For example, as depicted in FIG. 8, the components wheels 804, motor 806, and doors 808 are combined to form a composition "Car" 802. The "Car" package 800 includes the wheels, motor and doors as well as the composition "Car."

Figure 9:
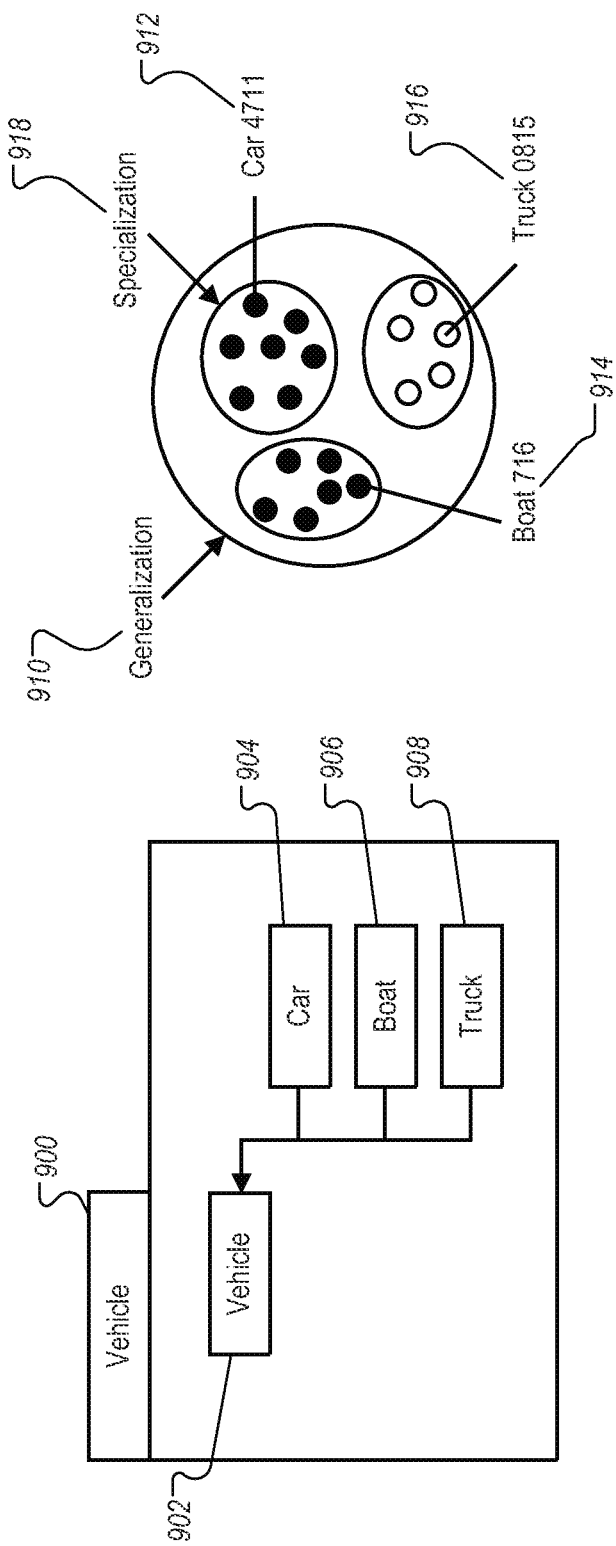
FIG. 9 depicts a third example of a package in accordance with methods and systems consistent with the subject matter described herein.

Another grouping within a package may be subtypes within a type. In these packages, the components are specialized forms of a generic package. For example, as depicted in FIG. 9, the components Car 904, Boat 906, and Truck 908 can be generalized by the generic term Vehicle 902 in Vehicle package 900. Vehicle in this case is the generic package 910, while Car 912, Boat 914, and Truck 916 are the specializations 918 of the generalized vehicle 910.

Figure 10:
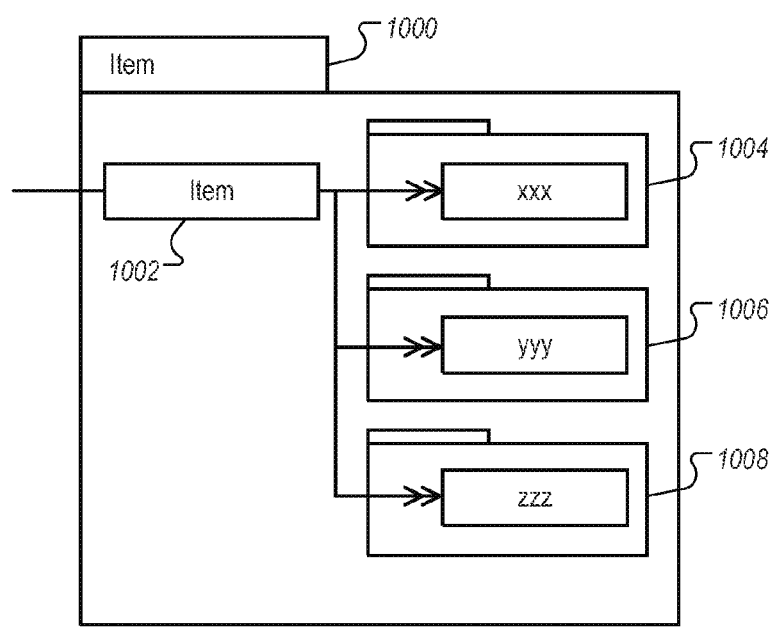
FIG. 10 depicts a fourth example of a package in accordance with methods and systems consistent with the subject matter described herein.

Packages also may be used to represent hierarchy levels. For example, as depicted in FIG. 10, the Item Package 1000 includes Item 1002 with subitem xxx 1004, subitem yyy 1006, and subitem zzz 1008.

Figure 11:
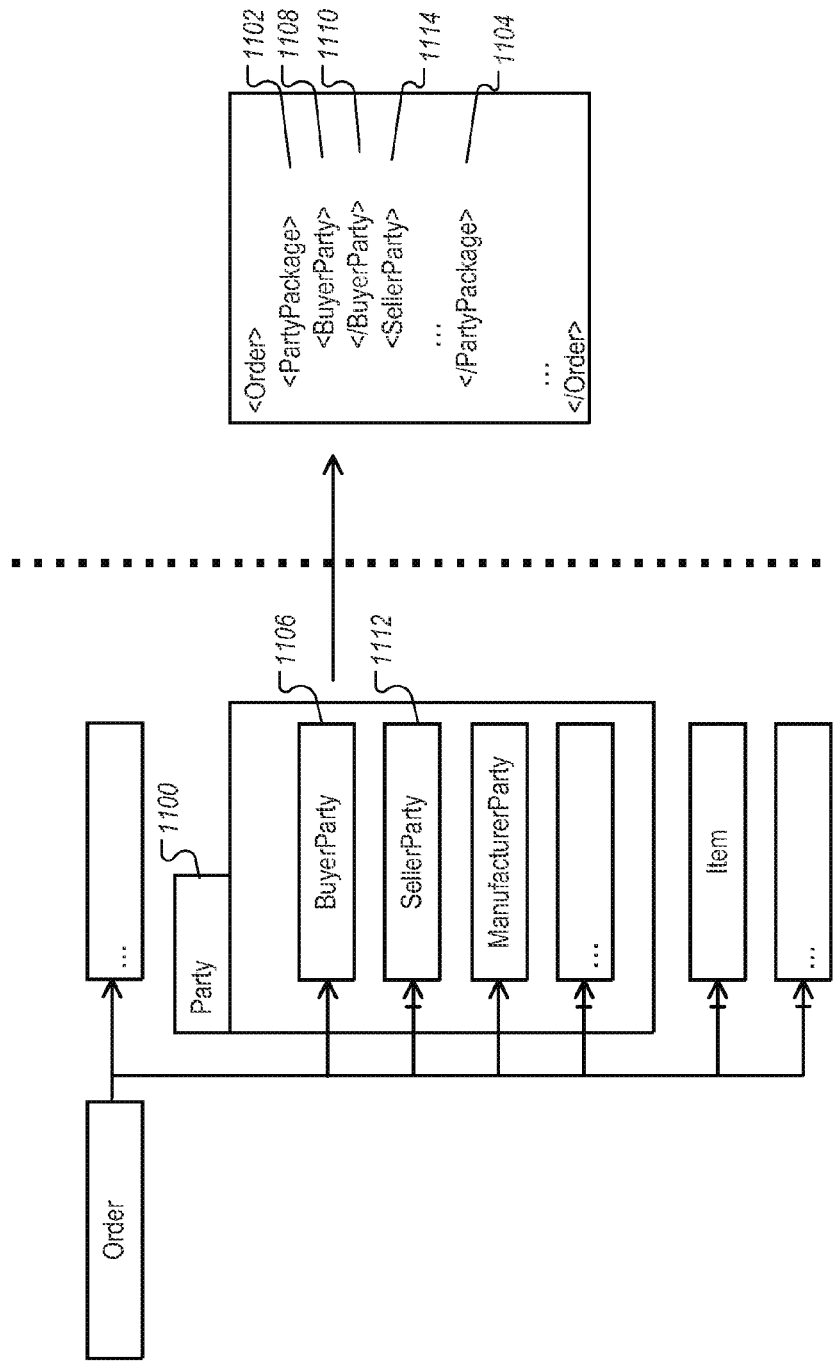
FIG. 11 depicts the representation of a package in the XML schema in accordance with methods and systems consistent with the subject matter described herein.

Packages can be represented in the XML schema as a comment. One advantage of this grouping is that the document structure is easier to read and is more understandable. The names of these packages are assigned by including the object name in brackets with the suffix "Package." For example, as depicted in FIG. 11, Party package 1100 is enclosed by <PartyPackage> 1102 and </PartyPackage> 1104. Party package 1100 illustratively includes a Buyer Party 1106, identified by <BuyerParty> 1108 and </BuyerParty> 1110, and a Seller Party 1112, identified by <SellerParty> 1114 and </SellerParty>, etc.

d) Relationships

Relationships describe the interdependencies of the entities in the business object model, and are thus an integral part of the business object model.

(1) Cardinality of Relationships

Figure 12:
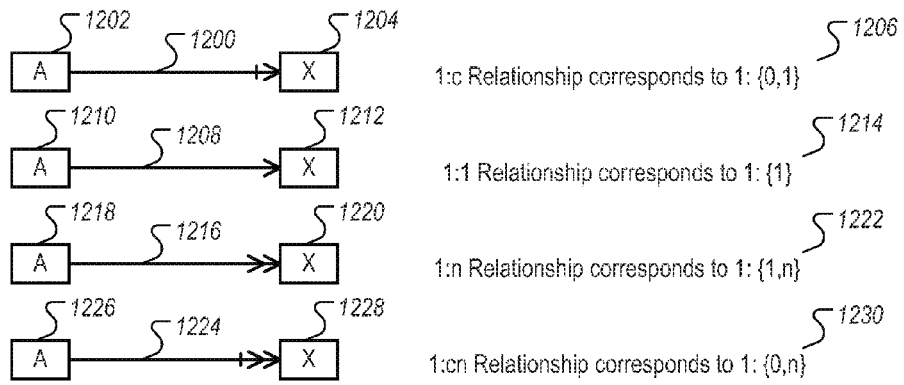
FIG. 12 depicts a graphical representation of cardinalities between two entities in accordance with methods and systems consistent with the subject matter described herein.

FIG. 12 depicts a graphical representation of the cardinalities between two entities. The cardinality between a first entity and a second entity identifies the number of second entities that could possibly exist for each first entity. Thus, a 1:c cardinality 1200 between entities A 1202 and X 1204 indicates that for each entity A 1202, there is either one or zero 1206 entity X 1204. A 1:1 cardinality 1208 between entities A 1210 and X 1212 indicates that for each entity A 1210, there is exactly one 1214 entity X 1212. A 1:n cardinality 1216 between entities A 1218 and X 1220 indicates that for each entity A 1218, there are one or more 1222 entity Xs 1220. A 1:cn cardinality 1224 between entities A 1226 and X 1228 indicates that for each entity A 1226, there are any number 1230 of entity Xs 1228 (i.e., 0 through n Xs for each A).

(2) Types of Relationships (a) Composition

Figure 13:
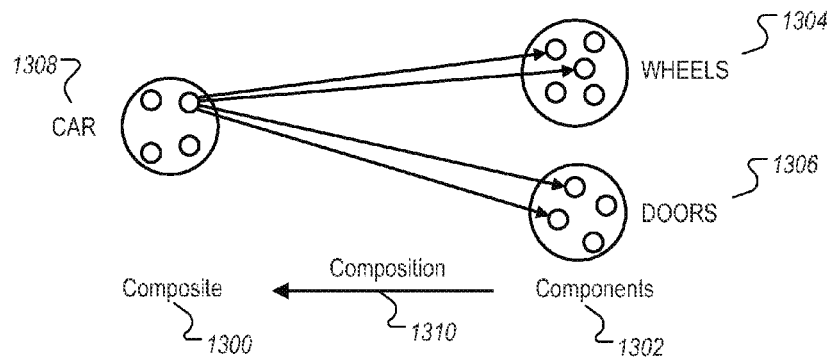
FIG. 13 depicts an example of a composition in accordance with methods and systems consistent with the subject matter described herein.
Figure 14:
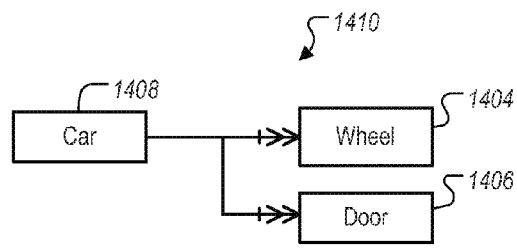
FIG. 14 depicts an example of a hierarchical relationship in accordance with methods and systems consistent with the subject matter described herein.

A composition or hierarchical relationship type is a strong whole-part relationship which is used to describe the structure within an object. The parts, or dependent entities, represent a semantic refinement or partition of the whole, or less dependent entity. For example, as depicted in FIG. 13, the components 1302, wheels 1304, and doors 1306 may be combined to form the composite 1300 "Car" 1308 using the composition 1310. FIG. 14 depicts a graphical representation of the composition 1410 between composite Car 1408 and components wheel 1404 and door 1406.

(b) Aggregation

Figure 15:
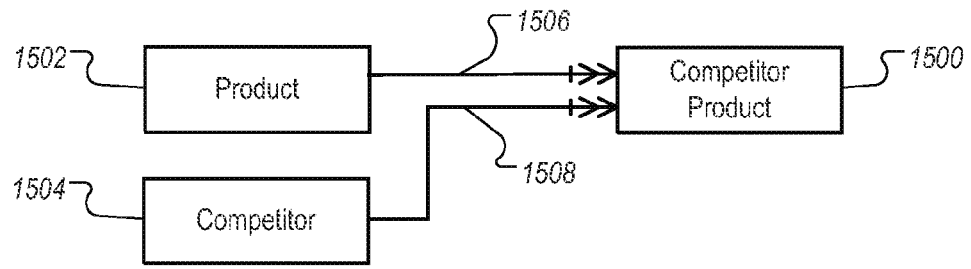
FIG. 15 depicts an example of an aggregating relationship in accordance with methods and systems consistent with the subject matter described herein.

An aggregation or an aggregating relationship type is a weak whole-part relationship between two objects. The dependent object is created by the combination of one or several less dependent objects. For example, as depicted in FIG. 15, the properties of a competitor product 1500 are determined by a product 1502 and a competitor 1504. A hierarchical relationship 1506 exists between the product 1502 and the competitor product 1500 because the competitor product 1500 is a component of the product 1502. Therefore, the values of the attributes of the competitor product 1500 are determined by the product 1502. An aggregating relationship 1508 exists between the competitor 1504 and the competitor product 1500 because the competitor product 1500 is differentiated by the competitor 1504. Therefore the values of the attributes of the competitor product 1500 are determined by the competitor 1504.

(c) Association

Figure 16:
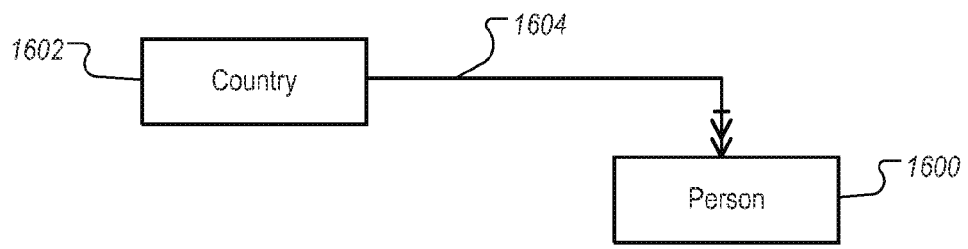
FIG. 16 depicts an example of an association in accordance with methods and systems consistent with the subject matter described herein.

An association or a referential relationship type describes a relationship between two objects in which the dependent object refers to the less dependent object. For example, as depicted in FIG. 16, a person 1600 has a nationality, and thus, has a reference to its country 1602 of origin. There is an association 1604 between the country 1602 and the person 1600. The values of the attributes of the person 1600 are not determined by the country 1602.

(3) Specialization

Figure 17:
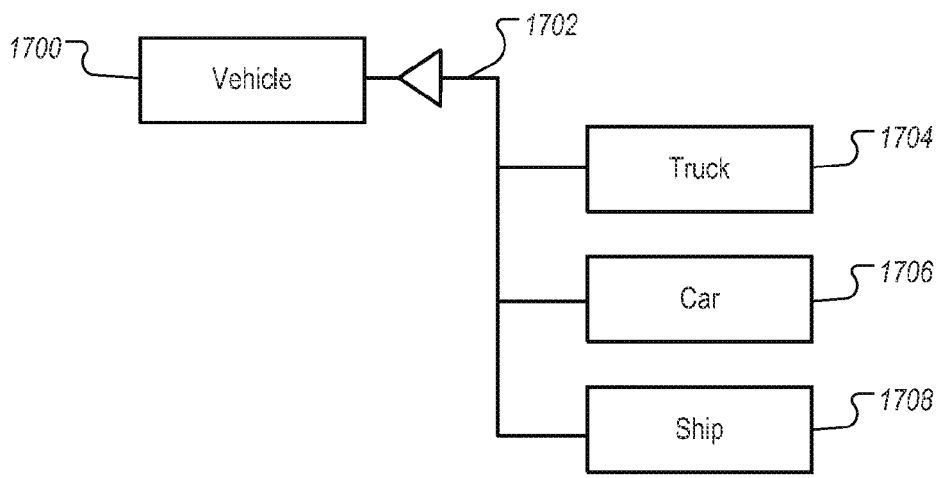
FIG. 17 depicts an example of a specialization in accordance with methods and systems consistent with the subject matter described herein.

Entity types may be divided into subtypes based on characteristics of the entity types. For example, FIG. 17 depicts an entity type "vehicle" 1700 specialized 1702 into subtypes "truck" 1704, "car" 1706, and "ship" 1708. These subtypes represent different aspects or the diversity of the entity type.

Subtypes may be defined based on related attributes. For example, although ships and cars are both vehicles, ships have an attribute, "draft," that is not found in cars. Subtypes also may be defined based on certain methods that can be applied to entities of this subtype and that modify such entities. For example, "drop anchor" can be applied to ships. If outgoing relationships to a specific object are restricted to a subset, then a subtype can be defined which reflects this subset.

Figure 18:
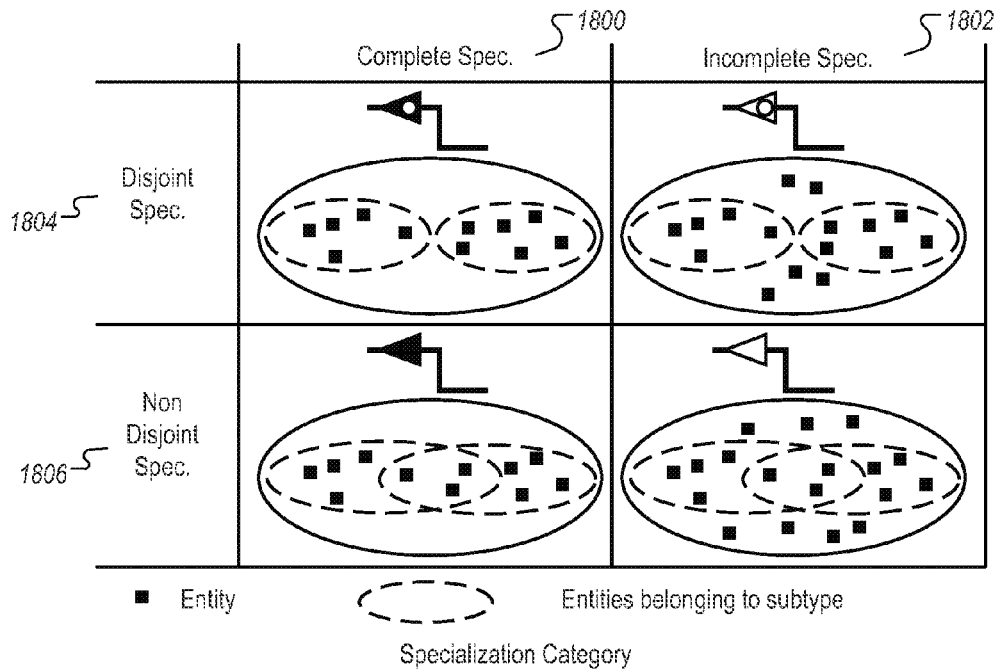
FIG. 18 depicts the categories of specializations in accordance with methods and systems consistent with the subject matter described herein.

As depicted in FIG. 18, specializations may further be characterized as complete specializations 1800 or incomplete specializations 1802. There is a complete specialization 1800 where each entity of the generalized type belongs to at least one subtype. With an incomplete specialization 1802, there is at least one entity that does not belong to a subtype. Specializations also may be disjoint 1804 or nondisjoint 1806. In a disjoint specialization 1804, each entity of the generalized type belongs to a maximum of one subtype. With a nondisjoint specialization 1806, one entity may belong to more than one subtype. As depicted in FIG. 18, four specialization categories result from the combination of the specialization characteristics.

e) Structural Patterns (1) Item

An item is an entity type which groups together features of another entity type. Thus, the features for the entity type chart of accounts are grouped together to form the entity type chart of accounts item. For example, a chart of accounts item is a category of values or value flows that can be recorded or represented in amounts of money in accounting, while a chart of accounts is a superordinate list of categories of values or value flows that is defined in accounting.

The cardinality between an entity type and its item is often either 1:n or 1:cn. For example, in the case of the entity type chart of accounts, there is a hierarchical relationship of the cardinality 1:n with the entity type chart of accounts item since a chart of accounts has at least one item in all cases.

(2) Hierarchy

Figure 19:
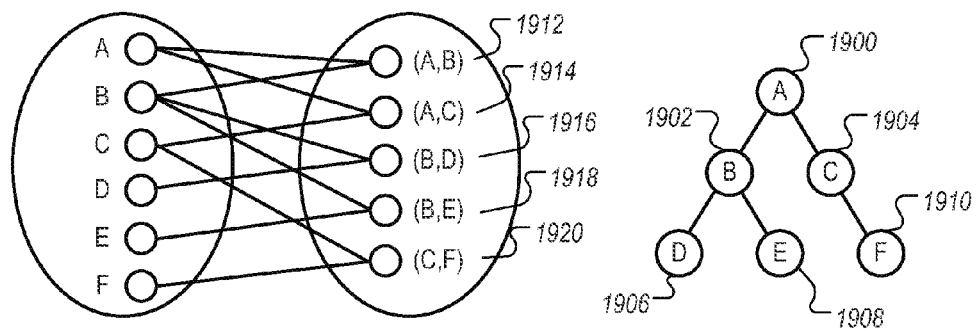
FIG. 19 depicts an example of a hierarchy in accordance with methods and systems consistent with the subject matter described herein.

A hierarchy describes the assignment of subordinate entities to superordinate entities and vice versa, where several entities of the same type are subordinate entities that have, at most, one directly superordinate entity. For example, in the hierarchy depicted in FIG. 19, entity B 1902 is subordinate to entity A 1900, resulting in the relationship (A,B) 1912. Similarly, entity C 1904 is subordinate to entity A 1900, resulting in the relationship (A,C) 1914. Entity D 1906 and entity E 1908 are subordinate to entity B 1902, resulting in the relationships (B,D) 1916 and (B,E) 1918, respectively. Entity F 1910 is subordinate to entity C 1904, resulting in the relationship (C,F) 1920.

Figure 20:
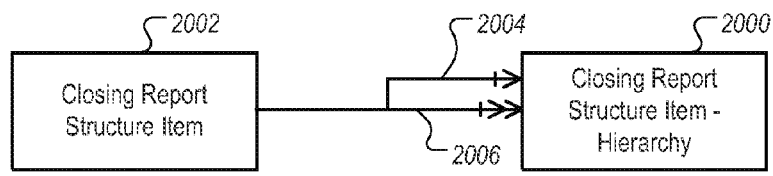
FIG. 20 depicts a graphical representation of a hierarchy in accordance with methods and systems consistent with the subject matter described herein.

Because each entity has at most one superordinate entity, the cardinality between a subordinate entity and its superordinate entity is 1:c. Similarly, each entity may have 0, 1 or many subordinate entities. Thus, the cardinality between a superordinate entity and its subordinate entity is 1:cn. FIG. 20 depicts a graphical representation of a Closing Report Structure Item hierarchy 2000 for a Closing Report Structure Item 2002. The hierarchy illustrates the 1:c cardinality 2004 between a subordinate entity and its superordinate entity, and the 1:cn cardinality 2006 between a superordinate entity and its subordinate entity.

3. Creation of the Business Object Model

Figure 21A:
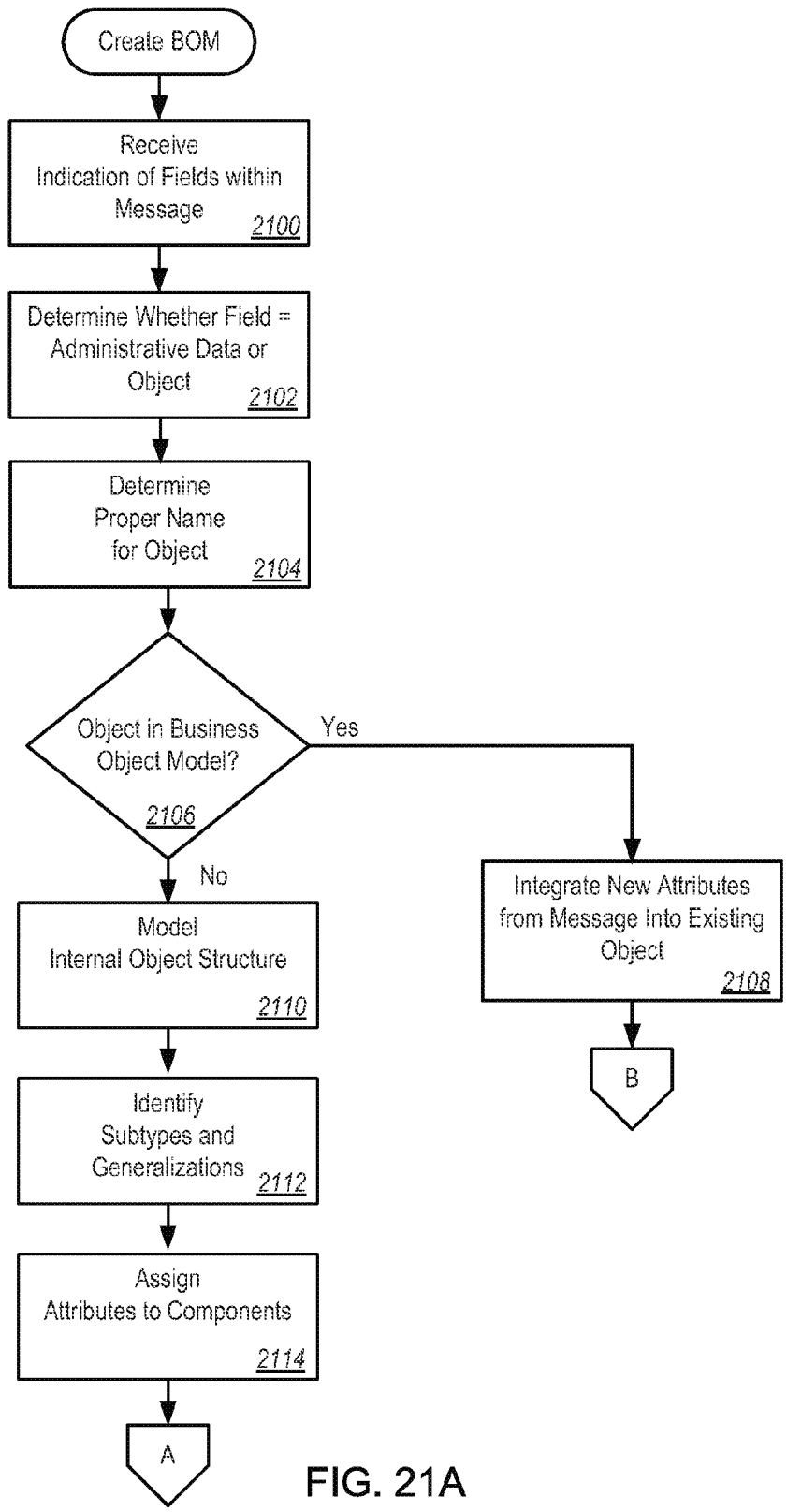
FIGS. 21A-B depict a flow diagram of the steps performed to create a business object model in accordance with methods and systems consistent with the subject matter described herein.
Figure 21B:
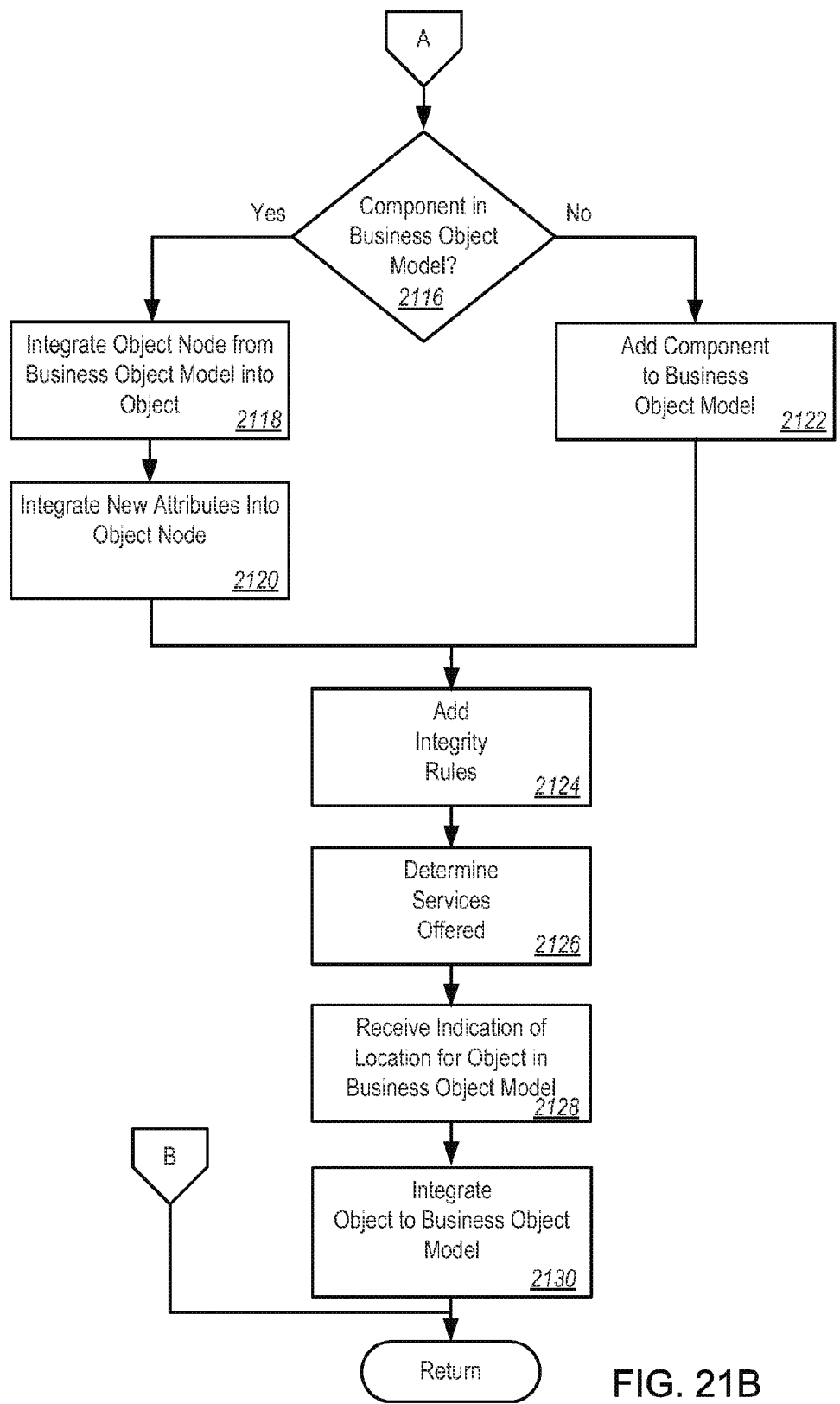

FIGS. 21A-B depict the steps performed using methods and systems consistent with the subject matter described herein to create a business object model. Although some steps are described as being performed by a computer, these steps may alternatively be performed manually, or computer-assisted, or any combination thereof. Likewise, although some steps are described as being performed by a computer, these steps may also be computer-assisted, or performed manually, or any combination thereof.

As discussed above, the designers create message choreographies that specify the sequence of messages between business entities during a transaction. After identifying the messages, the developers identify the fields contained in one of the messages (step 2100, FIG. 21A). The designers then determine whether each field relates to administrative data or is part of the object (step 2102). Thus, the first eleven fields identified below in the left column are related to administrative data, while the remaining fields are part of the object.

| | |
|---|---|
| MessageID | Admin |
| ReferenceID | |
| CreationDate | |
| SenderID | |
| AdditionalSenderID | |
| ContactPersonID | |
| SenderAddress | |
| RecipientID | |
| AdditionalRecipientID | |
| ContactPersonID | |
| RecipientAddress | |
| ID | Main Object |
| AdditionalID | |
| PostingDate | |
| LastChangeDate | |
| AcceptanceStatus | |
| Note | |
| CompleteTransmission Indicator | |
| Buyer | |
| BuyerOrganisationName | |
| Person Name | |
| FunctionalTitle | |
| DepartmentName | |
| CountryCode | |
| StreetPostalCode | |
| POBox Postal Code | |
| Company Postal Code | |
| City Name | |
| DistrictName | |
| PO Box ID | |
| PO Box Indicator | |
| PO Box Country Code | |

-continued

PO Box Region Code
PO Box City Name
Street Name
House ID
Building ID
Floor ID
Room ID
Care Of Name
AddressDescription
Telefonnumber
MobileNumber
Facsimile
Email
Seller
SellerAddress
Location
LocationType
DeliveryItemGroupID
DeliveryPriority
DeliveryCondition
TransferLocation
NumberofPartialDelivery
QuantityTolerance
MaximumLeadTime
TransportServiceLevel
TranportCondition
TransportDescription
CashDiscountTerms
PaymentForm
PaymentCardID
PaymentCardReferenceID
SequenceID
Holder
ExpirationDate
AttachmentID
AttachmentFilename
DescriptionofMessage
ConfirmationDescriptionof Message
FollowUpActivity
ItemID
ParentItemID
HierarchyType
ProductID
ProductType
ProductNote
ProductCategoryID
Amount
BaseQuantity
ConfirmedAmount
ConfirmedBaseQuantity
ItemBuyer
ItemBuyerOrganisationName
Person Name
FunctionalTitle
DepartmentName
CountryCode
StreetPostalCode
POBox Postal Code
Company Postal Code
City Name
DistrictName
PO Box ID
PO Box Indicator
PO Box Country Code
PO Box Region Code
PO Box City Name
Street Name
House ID
Building ID
Floor ID
Room ID
Care Of Name
AddressDescription
Telefonnumber
MobilNumber
Facsimile
Email
ItemSeller
ItemSellerAddress
ItemLocation ItemLocationType
ItemDeliveryItemGroupID
ItemDeliveryPriority
ItemDeliveryCondition
ItemTransferLocation
ItemNumberofPartialDelivery
ItemQuantityTolerance
ItemMaximumLeadTime
ItemTransportServiceLevel
ItemTranportCondition
ItemTransportDescription
ContractReference
QuoteReference
CatalogueReference
ItemAttachmentID
ItemAttachmentFilename
ItemDescription
ScheduleLineID
DeliveryPeriod
Quantity
ConfirmedScheduleLineID
ConfirmedDeliveryPeriod
ConfirmedQuantity Next, the designers determine the proper name for the object according to the ISO 11179 naming standards (step 2104). In the example above, the proper name for the "Main Object" is "Purchase Order." After naming the object, the system that is creating the business object model determines whether the object already exists in the business object model (step 2106). If the object already exists, the system integrates new attributes from the message into the existing object (step 2108), and the process is complete.

If at step 2106 the system determines that the object does not exist in the business object model, the designers model the internal object structure (step 2110). To model the internal structure, the designers define the components. For the above example, the designers may define the components identified below.

| | |
|---|---|
| ID | Purchase |
| AdditionalID | Order |
| PostingDate | |
| LastChangeDate | |
| AcceptanceStatus | |
| Note | |
| CompleteTransmission | |
| Indicator | |
| Buyer | Buyer |
| BuyerOrganisationName | |
| Person Name | |
| FunctionalTitle | |
| DepartmentName | |
| CountryCode | |
| StreetPostalCode | |
| POBox Postal Code | |
| Company Postal Code | |
| City Name | |
| DistrictName | |
| PO Box ID | |
| PO Box Indicator | |
| PO Box Country Code | |
| PO Box Region Code | |
| PO Box City Name | |
| Street Name | |
| House ID | |
| Building ID | |
| Floor ID | |
| Room ID | |
| Care Of Name | |
| AddressDescription | |
| Telefonnumber | |
| MobileNumber | |

| | |
|---|---|
| Facsimile | |
| Email | |
| Seller | Seller |
| SellerAddress | |
| Location | Location |
| LocationType | |
| DeliveryItemGroupID | Delivery- |
| DeliveryPriority | Terms |
| DeliveryCondition | |
| TransferLocation | |
| NumberofPartialDelivery | |
| QuantityTolerance | |
| MaximumLeadTime | |
| TransportServiceLevel | |
| TranportCondition | |
| TransportDescription | |
| CashDiscountTerms | |
| PaymentForm | Payment |
| PaymentCardID | |
| PaymentCardReferenceID | |
| SequenceID | |
| Holder | |
| ExpirationDate | |
| AttachmentID | |
| AttachmentFilename | |
| DescriptionofMessage | |
| ConfirmationDescriptionof | |
| Message | |
| FollowUpActivity | |
| ItemID | Purchase |
| ParentItemID | Order |
| HierarchyType | Item |
| ProductID | Product |
| ProductType | |
| ProductNote | |
| ProductCategoryID | ProductCategory |
| Amount | |
| BaseQuantity | |
| ConfirmedAmount | |
| ConfirmedBaseQuantity | |
| ItemBuyer | Buyer |
| ItemBuyerOrganisation | |
| Name | |
| Person Name | |
| FunctionalTitle | |
| DepartmentName | |
| CountryCode | |
| StreetPostalCode | |
| POBox Postal Code | |
| Company Postal Code | |
| City Name | |
| DistrictName | |
| PO Box ID | |
| PO Box Indicator | |
| PO Box Country Code | |
| PO Box Region Code | |
| PO Box City Name | |
| Street Name | |
| House ID | |
| Building ID | |
| Floor ID | |
| Room ID | |
| Care Of Name | |
| AddressDescription | |
| Telefonnumber | |
| MobilNumber | |
| Facsimile | |
| Email | |
| ItemSeller | Seller |
| ItemSellerAddress | |
| ItemLocation | Location |
| ItemLocationType | |
| ItemDeliveryItemGroupID | |
| ItemDeliveryPriority | |

-continued

| | |
|---|---|
| ItemDeliveryCondition | |
| ItemTransferLocation | |
| ItemNumberofPartial Delivery | |
| ItemQuantityTolerance | |
| ItemMaximumLeadTime | |
| ItemTransportServiceLevel | |
| ItemTranportCondition | |
| ItemTransportDescription | |
| ContractReference | Contract |
| QuoteReference | Quote |
| CatalogueReference | Catalogue |
| ItemAttachmentID | |

-continued

| | |
|---|---|
| ItemAttachmentFilename | |
| ItemDescription | |
| ScheduleLineID | |
| DeliveryPeriod | |
| Quantity | |
| ConfirmedScheduleLineID | |
| ConfirmedDeliveryPeriod | |
| ConfirmedQuantity | |

During the step of modeling the internal structure, the designers also model the complete internal structure by identifying the compositions of the components and the corresponding cardinalities, as shown below.

| | | | | |
|---|---|---|---|---|
| PurchaseOrder | | | | 1 |
| | Buyer | | | 0...1 |
| | | Address | | 0...1 |
| | | ContactPerson | | 0...1 |
| | | | Address | 0...1 |
| | Seller | | | 0...1 |
| | Location | | | 0...1 |
| | | Address | | 0...1 |
| | DeliveryTerms | | | 0...1 |
| | | Incoterms | | 0...1 |
| | | PartialDelivery | | 0...1 |
| | | QuantityTolerance | | 0...1 |
| | | Transport | | 0...1 |
| | CashDiscount Terms | | | 0...1 |
| | | MaximumCashDiscount | | 0...1 |
| | | NormalCashDiscount | | 0...1 |
| | PaymentForm | | | 0...1 |
| | | PaymentCard | | 0...1 |
| | Attachment | | | 0...n |
| | Description | | | 0...1 |
| | Confirmation Description | | | 0...1 |
| | Item | | | 0...n |
| | | HierarchyRelationship | | 0...1 |
| | | Product | | 0...1 |
| | | ProductCategory | | 0...1 |
| | | Price | | 0...1 |
| | | | NetunitPrice | 0...1 |
| | | ConfirmedPrice | | 0...1 |
| | | | NetunitPrice | 0...1 |
| | | Buyer | | 0...1 |
| | | Seller | | 0...1 |
| | | Location | | 0...1 |
| | | DeliveryTerms | | 0...1 |
| | | Attachment | | 0...n |
| | | Description | | 0...1 |
| | | ConfirmationDescription | | 0...1 |
| | | ScheduleLine | | 0...n |
| | | | DeliveryPeriod | 1 |
| | | ConfirmedScheduleLine | | 0...n |

After modeling the internal object structure, the developers identify the subtypes and generalizations for all objects and components (step 2112). For example, the Purchase Order may have subtypes Purchase Order Update, Purchase Order Cancellation and Purchase Order Information. Purchase Order Update may include Purchase Order Request, Purchase Order Change, and Purchase Order Confirmation. Moreover, Party may be identified as the generalization of Buyer and Seller. The subtypes and generalizations for the above example are shown below.

| | | | | |
|---|---|---|---|---|
| Purchase Order | | | | 1 |
| | PurchaseOrder Update | | | |
| | | PurchaseOrder Request | | |
| | | PurchaseOrder Change | | |
| | | PurchaseOrder Confirmation | | |
| | PurchaseOrder Cancellation | | | |
| | PurchaseOrder Information | | | |
| | Party | | | |
| | | BuyerParty | | 0...1 |
| | | | Address | 0...1 |
| | | | ContactPerson | 0...1 |
| | | | Address | 0...1 |
| | | SellerParty | | 0...1 |
| | Location | | | |
| | | ShipToLocation | | 0...1 |
| | | | Address | 0...1 |
| | | ShipFromLocation | | 0...1 |
| | | | Address | 0...1 |
| | DeliveryTerms | | | 0...1 |
| | | Incoterms | | 0...1 |
| | | PartialDelivery | | 0...1 |
| | | QuantityTolerance | | 0...1 |
| | | Transport | | 0...1 |
| | CashDiscount Terms | | | 0...1 |
| | | MaximumCash Discount | | 0...1 |
| | | NormalCashDiscount | | 0...1 |
| | PaymentForm | | | 0...1 |
| | | PaymentCard | | 0...1 |
| | Attachment | | | 0...n |
| | Description | | | 0...1 |
| | Confirmation Description | | | 0...1 |
| | Item | | | 0...n |
| | | HierarchyRelationship | | 0...1 |
| | | Product | | 0...1 |
| | | ProductCategory | | 0...1 |
| | | Price | | 0...1 |
| | | | NetunitPrice | 0...1 |
| | | ConfirmedPrice | | 0...1 |
| | | | NetunitPrice | 0...1 |
| | | Party | | |
| | | | BuyerParty | 0...1 |
| | | | SellerParty | 0...1 |
| | | Location | | |
| | | | ShipTo Location | 0...1 |
| | | | ShipFrom Location | 0...1 |
| | | DeliveryTerms | | 0...1 |
| | | Attachment | | 0...n |
| | | Description | | 0...1 |
| | | Confirmation Description | | 0...1 |
| | | ScheduleLine | | 0...n |
| | | | Delivery Period | 1 |
| | | ConfirmedScheduleLine | | 0...n |

After identifying the subtypes and generalizations, the developers assign the attributes to these components (step 2114). The attributes for a portion of the components are shown below.

| | | | |
|---|---|---|---|
| Purchase Order | | | 1 |
| | ID | | 1 |
| | SellerID | | 0...1 |
| | BuyerPostingDateTime | | 0...1 |
| | BuyerLastChangeDateTime | | 0...1 |
| | SellerPostingDateTime | | 0...1 |
| | SellerLastChangeDateTime | | 0...1 |
| | AcceptanceStatusCode | | 0...1 |
| | Note | | 0...1 |
| | ItemListComplete TransmissionIndicator | | 0...1 |
| | BuyerParty | | 0...1 |
| | | StandardID | 0...n |
| | | BuyerID | 0...1 |
| | | SellerID | 0...1 |
| | | Address | 0...1 |
| | | ContactPerson | 0...1 |
| | | | BuyerID 0...1 |
| | | | SellerID 0...1 |
| | | | Address 0...1 |
| | SellerParty | | 0...1 |
| | ProductRecipientParty | | 0...1 |
| | VendorParty | | 0...1 |
| | ManufacturerParty | | 0...1 |
| | BillToParty | | 0...1 |
| | PayerParty | | 0...1 |
| | CarrierParty | | 0...1 |
| | ShipToLocation | | 0...1 |
| | | StandardID | 0...n |
| | | BuyerID | 0...1 |
| | | SellerID | 0...1 |
| | | Address | 0...1 |
| | ShipFromLocation | | 0...1 |

The system then determines whether the component is one of the object nodes in the business object model (step 2116, FIG. 21B). If the system determines that the component is one of the object nodes in the business object model, the system integrates a reference to the corresponding object node from the business object model into the object (step 2118). In the above example, the system integrates the reference to the Buyer party represented by an ID and the reference to the ShipToLocation represented by an into the object, as shown below. The attributes that were formerly located in the PurchaseOrder object are now assigned to the new found object party. Thus, the attributes are removed from to the PurchaseOrder object.

```
PurchaseOrder
    ID
    SellerID
    BuyerPostingDateTime
    BuyerLastChangeDateTime
    SellerPostingDateTime
    SellerLastChangeDateTime
    AcceptanceStatusCode
    Note
    ItemListComplete
    TransmissionIndicator
    BuyerParty
                            ID
    SellerParty
    ProductRecipientParty
    VendorParty
    ManufacturerParty
    BillToParty
    PayerParty
    CarrierParty
    ShipToLocation
                            ID
    ShipFromLocation
```

During the integration step, the designers classify the relationship (i.e., aggregation or association) between the object node and the object being integrated into the business object model. The system also integrates the new attributes into the object node (step 2120). If at step 2116, the system determines that the component is not in the business object model, the system adds the component to the business object model (step 2122).

Regardless of whether the component was in the business object model at step 2116, the next step in creating the business object model is to add the integrity rules (step 2124). There are several levels of integrity rules and constraints which should be described. These levels include consistency rules between attributes, consistency rules between components, and consistency rules to other objects. Next, the designers determine the services offered, which can be accessed via interfaces (step 2126). The services offered in the example above include PurchaseOrderCreateRequest, PurchaseOrderCancellationRequest, and PurchaseOrderReleaseRequest. The system then receives an indication of the location for the object in the business object model (step 2128). After receiving the indication of the location, the system integrates the object into the business object model (step 2130).

4. Structure of the Business Object Model

The business object model, which serves as the basis for the process of generating consistent interfaces, includes the elements contained within the interfaces. These elements are arranged in a hierarchical structure within the business object model.

5. Interfaces Derived from Business Object Model

Figure 27A:
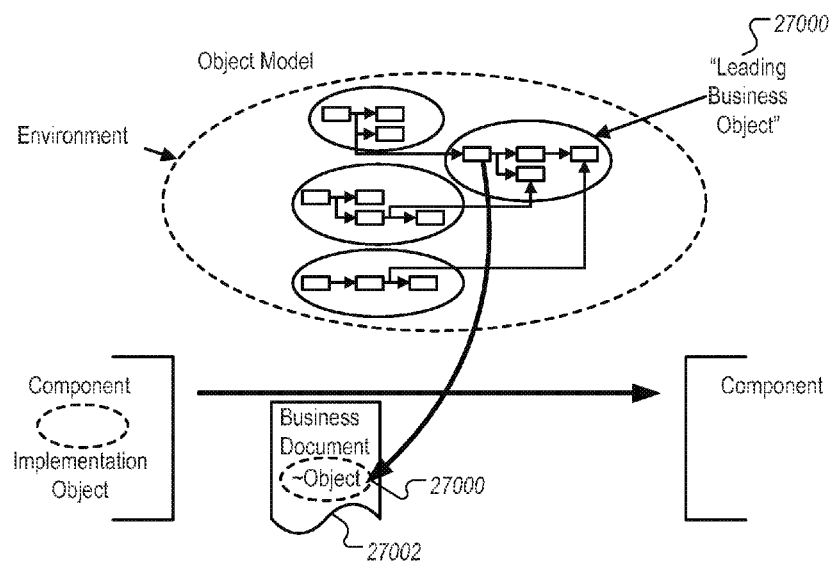
FIGS. 27A-E depict a hierarchization process in accordance with methods and systems consistent with the subject matter described herein.

Interfaces are the starting point of the communication between two business entities. The structure of each interface determines how one business entity communicates with another business entity. The business entities may act as a unified whole when, based on the business scenario, the business entities know what an interface contains from a business perspective and how to fill the individual elements or fields of the interface. As illustrated in FIG. 27A, communication between components takes place via messages that contain business documents (e.g., business document 27002). The business document 27002 ensures a holistic business-related understanding for the recipient of the message. The business documents are created and accepted or consumed by interfaces, specifically by inbound and outbound interfaces. The interface structure and, hence, the structure of the business document are derived by a mapping rule. This mapping rule is known as "hierarchization." An interface structure thus has a hierarchical structure created based on the leading business object 27000. The interface represents a usage-specific, hierarchical view of the underlying usage-neutral object model.

Figure 27B:
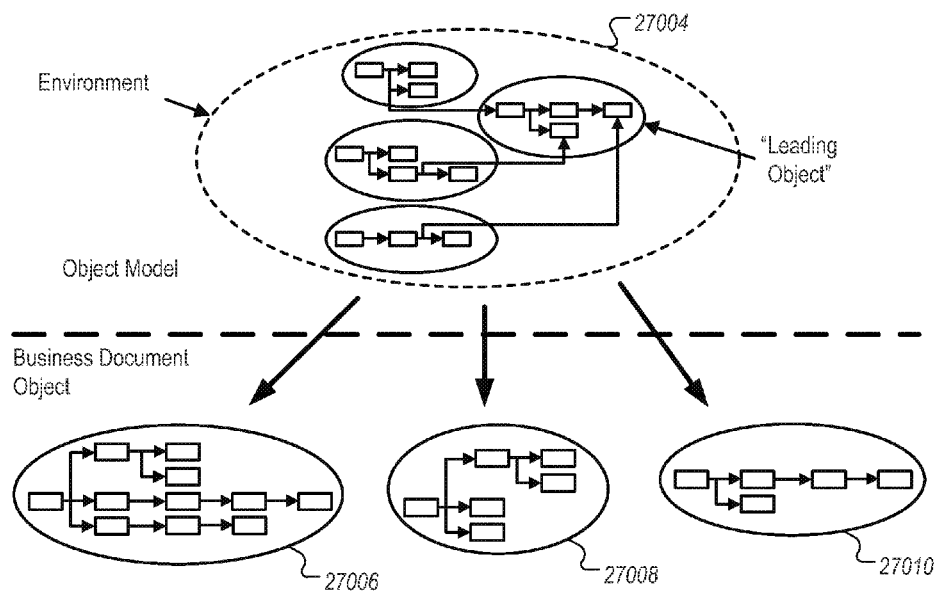

As illustrated in FIG. 27B, several business document objects 27006, 27008, and 27010 as overlapping views may be derived for a given leading object 27004. Each business document object results from the object model by hierarchization.

Figure 27C:
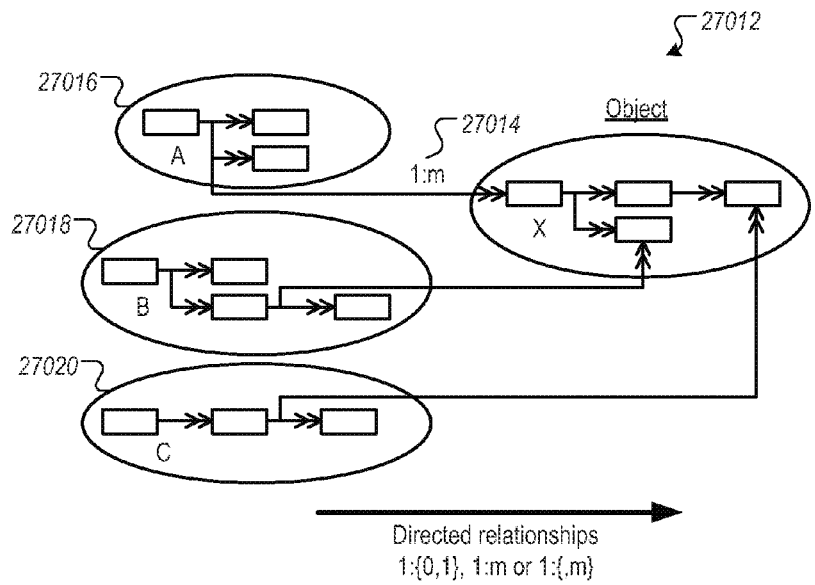

To illustrate the hierarchization process, FIG. 27C depicts an example of an object model 27012 (i.e., a portion of the business object model) that is used to derive a service operation signature (business document object structure). As depicted, leading object X 27014 in the object model 27012 is integrated in a net of object A 27016, object B 27018, and object C 27020. Initially, the parts of the leading object 27014 that are required for the business object document are adopted. In one variation, all parts required for a business document object are adopted from leading object 27014 (making such an operation a maximal service operation). Based on these parts, the relationships to the superordinate objects (i.e., objects A, B, and C from which object X depends) are inverted. In other words, these objects are adopted as dependent or subordinate objects in the new business document object.

For example, object A 27016, object B 27018, and object C 27020 have information that characterize object X. Because object A 27016, object B 27018, and object C 27020 are superordinate to leading object X 27014, the dependencies of these relationships change so that object A 27016, object B 27018, and object C 27020 become dependent and subordinate to leading object X 27014. This procedure is known as "derivation of the business document object by hierarchization."

Business-related objects generally have an internal structure (parts). This structure can be complex and reflect the individual parts of an object and their mutual dependency. When creating the operation signature, the internal structure of an object is strictly hierarchized. Thus, dependent parts keep their dependency structure, and relationships between the parts within the object that do not represent the hierarchical structure are resolved by prioritizing one of the relationships.

Relationships of object X to external objects that are referenced and whose information characterizes object X are added to the operation signature. Such a structure can be quite complex (see, for example, FIG. 27D). The cardinality to these referenced objects is adopted as 1:1 or 1:C, respectively. By this, the direction of the dependency changes. The required parts of this referenced object are adopted identically, both in their cardinality and in their dependency arrangement.

Figure 27D:
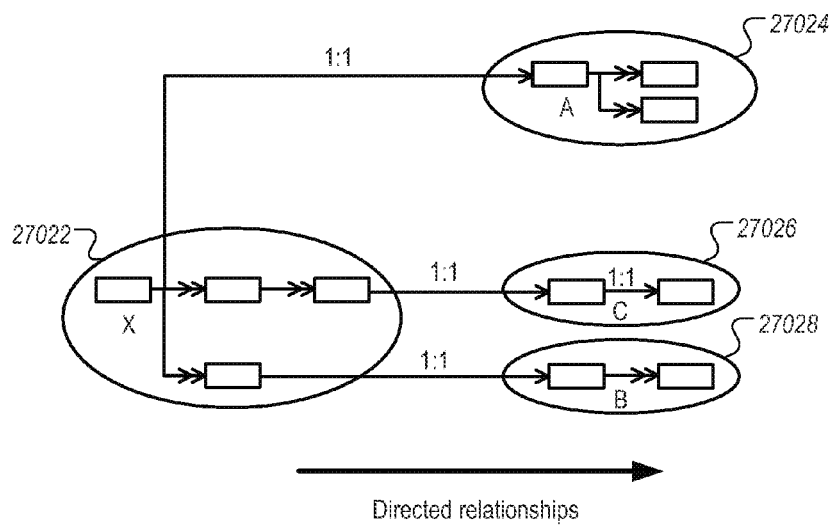

The newly created business document object contains all required information, including the incorporated master data information of the referenced objects. As depicted in FIG. 27D, components Xi in leading object X 27022 are adopted directly. The relationship of object X 27022 to object A 27024, object B 27028, and object C 27026 are inverted, and the parts required by these objects are added as objects that depend from object X 27022. As depicted, all of object A 27024 is adopted. B3 and B4 are adopted from object B 27028, but B1 is not adopted. From object C 27026, C2 and C1 are adopted, but C3 is not adopted.

Figure 27E:
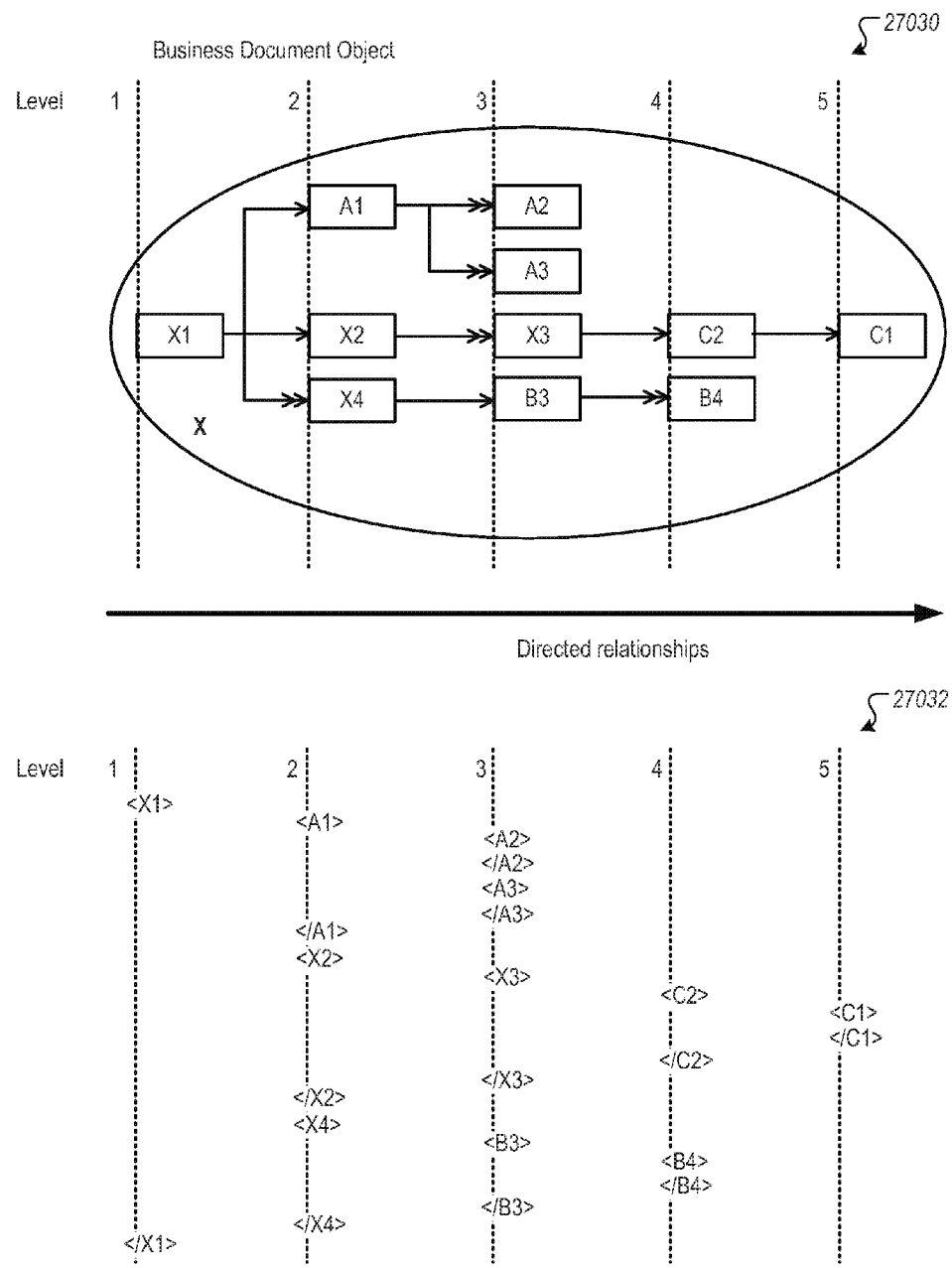

FIG. 27E depicts the business document object X 27030 created by this hierarchization process. As shown, the arrangement of the elements corresponds to their dependency levels, which directly leads to a corresponding representation as an XML structure 27032.

The following provides certain rules that can be adopted singly or in combination with regard to the hierarchization process. A business document object always refers to a leading business document object and is derived from this object. The name of the root entity in the business document entity is the name of the business object or the name of a specialization of the business object or the name of a service specific view onto the business object. The nodes and elements of the business object that are relevant (according to the semantics of the associated message type) are contained as entities and elements in the business document object.

The name of a business document entity is predefined by the name of the corresponding business object node. The name of the superordinate entity is not repeated in the name of the business document entity. The "full" semantic name results from the concatenation of the entity names along the hierarchical structure of the business document object.

The structure of the business document object is, except for deviations due to hierarchization, the same as the structure of the business object. The cardinalities of the business document object nodes and elements are adopted identically or more restrictively to the business document object. An object from which the leading business object is dependent can be adopted to the business document object. For this arrangement, the relationship is inverted, and the object (or its parts, respectively) are hierarchically subordinated in the business document object.

Nodes in the business object representing generalized business information can be adopted as explicit entities to the business document object (generally speaking, multiply TypeCodes out). When this adoption occurs, the entities are named according to their more specific semantic (name of TypeCode becomes prefix). Party nodes of the business object are modeled as explicit entities for each party role in the business document object. These nodes are given the name <Prefix><Party Role>Party, for example, BuyerParty, ItemBuyerParty. BTDReference nodes are modeled as separate entities for each reference type in the business document object. These nodes are given the name <Qualifier><BO><Node>Reference, for example SalesOrderReference, OriginSalesOrderReference, SalesOrderItemReference. A product node in the business object comprises all of the information on the Product, ProductCategory, and Batch. This information is modeled in the business document object as explicit entities for Product, ProductCategory, and Batch.

Entities which are connected by a 1:1 relationship as a result of hierarchization can be combined to a single entity, if they are semantically equivalent. Such a combination can often occurs if a node in the business document object that results from an assignment node is removed because it does not have any elements.

The message type structure is typed with data types. Elements are typed by GDTs according to their business objects. Aggregated levels are typed with message type specific data types (Intermediate Data Types), with their names being built according to the corresponding paths in the message type structure. The whole message type structured is typed by a message data type with its name being built according to the root entity with the suffix "Message". For the message type, the message category (e.g., information, notification, query, response, request, confirmation, etc.) is specified according to the suited transaction communication pattern.

In one variation, the derivation by hierarchization can be initiated by specifying a leading business object and a desired view relevant for a selected service operation. This view determines the business document object. The leading business object can be the source object, the target object, or a third object. Thereafter, the parts of the business object required for the view are determined. The parts are connected to the root node via a valid path along the hierarchy. Thereafter, one or more independent objects (object parts, respectively) referenced by the leading object which are relevant for the service may be determined (provided that a relationship exists between the leading object and the one or more independent objects).

Once the selection is finalized, relevant nodes of the leading object node that are structurally identical to the message type structure can then be adopted. If nodes are adopted from independent objects or object parts, the relationships to such independent objects or object parts are inverted. Linearization can occur such that a business object node containing certain TypeCodes is represented in the message type structure by explicit entities (an entity for each value of the TypeCode). The structure can be reduced by checking all 1:1 cardinalities in the message type structure. Entities can be combined if they are semantically equivalent, one of the entities carries no elements, or an entity solely results from an n:m assignment in the business object.

After the hierarchization is completed, information regarding transmission of the business document object (e.g., CompleteTransmissionIndicator, ActionCodes, message category, etc.) can be added. A standardized message header can be added to the message type structure and the message structure can be typed. Additionally, the message category for the message type can be designated.

Invoice Request and Invoice Confirmation are examples of interfaces. These invoice interfaces are used to exchange invoices and invoice confirmations between an invoicing party and an invoice recipient (such as between a seller and a buyer) in a B2B process. Companies can create invoices in electronic as well as in paper form. Traditional methods of communication, such as mail or fax, for invoicing are cost intensive, prone to error, and relatively slow, since the data is recorded manually. Electronic communication eliminates such problems. The motivating business scenarios for the Invoice Request and Invoice Confirmation interfaces are the Procure to Stock (PTS) and Sell from Stock (SFS) scenarios. In the PTS scenario, the parties use invoice interfaces to purchase and settle goods. In the SFS scenario, the parties use invoice interfaces to sell and invoice goods. The invoice interfaces directly integrate the applications implementing them and also form the basis for mapping data to widely-used XML standard formats such as RosettaNet, PIDX, xCBL, and CIDX.

The invoicing party may use two different messages to map a B2B invoicing process: (1) the invoicing party sends the message type InvoiceRequest to the invoice recipient to start a new invoicing process; and (2) the invoice recipient sends the message type InvoiceConfirmation to the invoicing party to confirm or reject an entire invoice or to temporarily assign it the status "pending."

An InvoiceRequest is a legally binding notification of claims or liabilities for delivered goods and rendered services—usually, a payment request for the particular goods and services. The message type InvoiceRequest is based on the message data type InvoiceMessage. The InvoiceRequest message (as defined) transfers invoices in the broader sense. This includes the specific invoice (request to settle a liability), the debit memo, and the credit memo.

InvoiceConfirmation is a response sent by the recipient to the invoicing party confirming or rejecting the entire invoice received or stating that it has been assigned temporarily the status "pending." The message type InvoiceConfirmation is based on the message data type InvoiceMessage. An InvoiceConfirmation is not mandatory in a B2B invoicing process, however, it automates collaborative processes and dispute management.

Usually, the invoice is created after it has been confirmed that the goods were delivered or the service was provided. The invoicing party (such as the seller) starts the invoicing process by sending an InvoiceRequest message. Upon receiving the InvoiceRequest message, the invoice recipient (for instance, the buyer) can use the InvoiceConfirmation message to completely accept or reject the invoice received or to temporarily assign it the status "pending." The InvoiceConfirmation is not a negotiation tool (as is the case in order management), since the options available are either to accept or reject the entire invoice. The invoice data in the InvoiceConfirmation message merely confirms that the invoice has been forwarded correctly and does not communicate any desired changes to the invoice. Therefore, the InvoiceConfirmation includes the precise invoice data that the invoice recipient received and checked. If the invoice recipient rejects an invoice, the invoicing party can send a new invoice after checking the reason for rejection (AcceptanceStatus and ConfirmationDescription at Invoice and InvoiceItem level). If the invoice recipient does not respond, the invoice is generally regarded as being accepted and the invoicing party can expect payment.

FIGS. 22A-F depict a flow diagram of the steps performed by methods and systems consistent with the subject matter described herein to generate an interface from the business object model. Although described as being performed by a computer, these steps may alternatively be performed manually, or using any combination thereof. The process begins when the system receives an indication of a package template from the designer, i.e., the designer provides a package template to the system (step 2200).

Package templates specify the arrangement of packages within a business transaction document. Package templates are used to define the overall structure of the messages sent between business entities. Methods and systems consistent with the subject matter described herein use package templates in conjunction with the business object model to derive the interfaces.

The system also receives an indication of the message type from the designer (step 2202). The system selects a package from the package template (step 2204), and receives an indication from the designer whether the package is required for the interface (step 2206). If the package is not required for the interface, the system removes the package from the package template (step 2208). The system then continues this analysis for the remaining packages within the package template (step 2210).

Figure 22A:
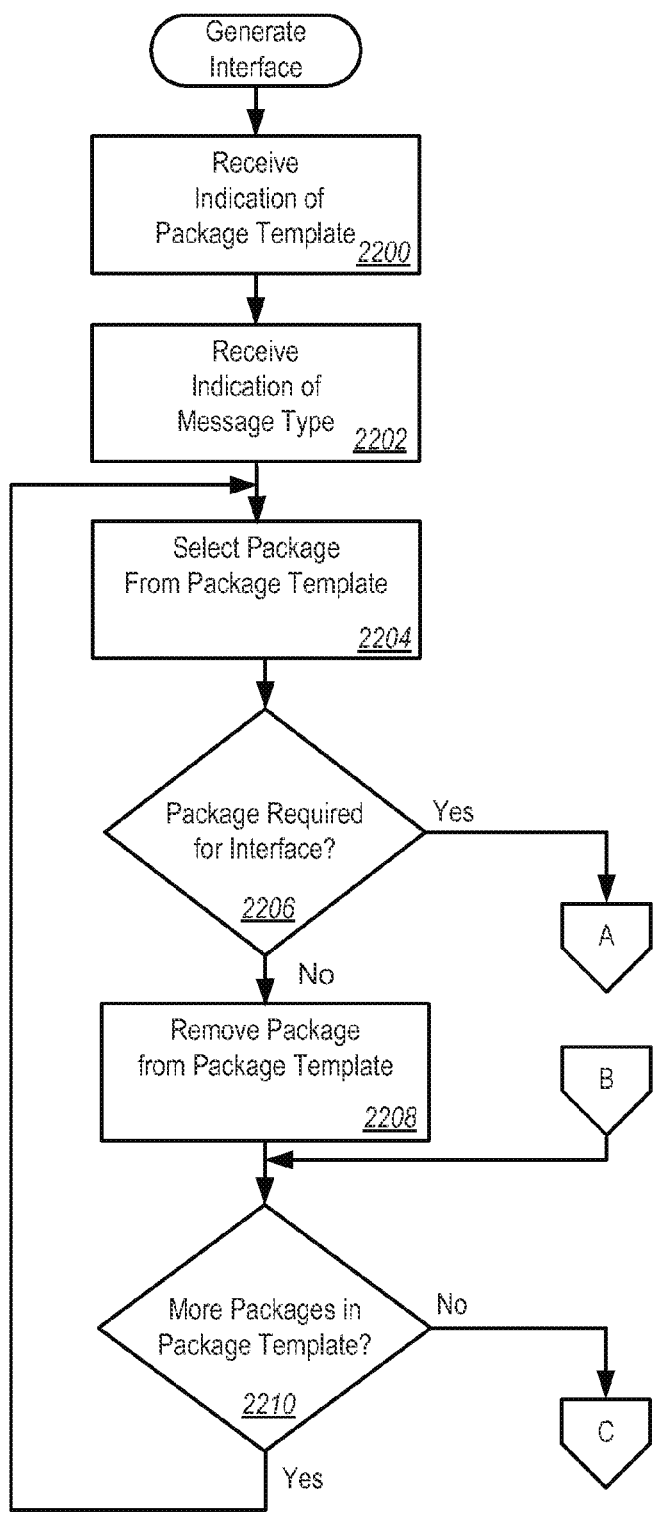
FIGS. 22A-F depict a flow diagram of the steps performed to generate an interface from the business object model in accordance with methods and systems consistent with the subject matter described herein.
Figure 22B:
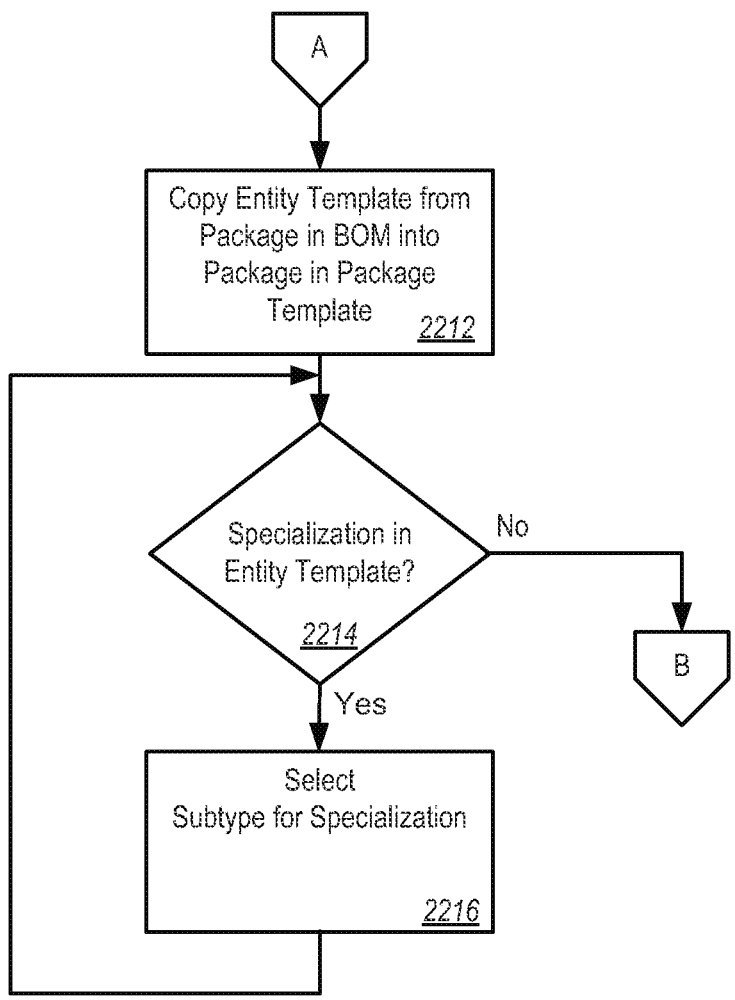
Figure 22C:
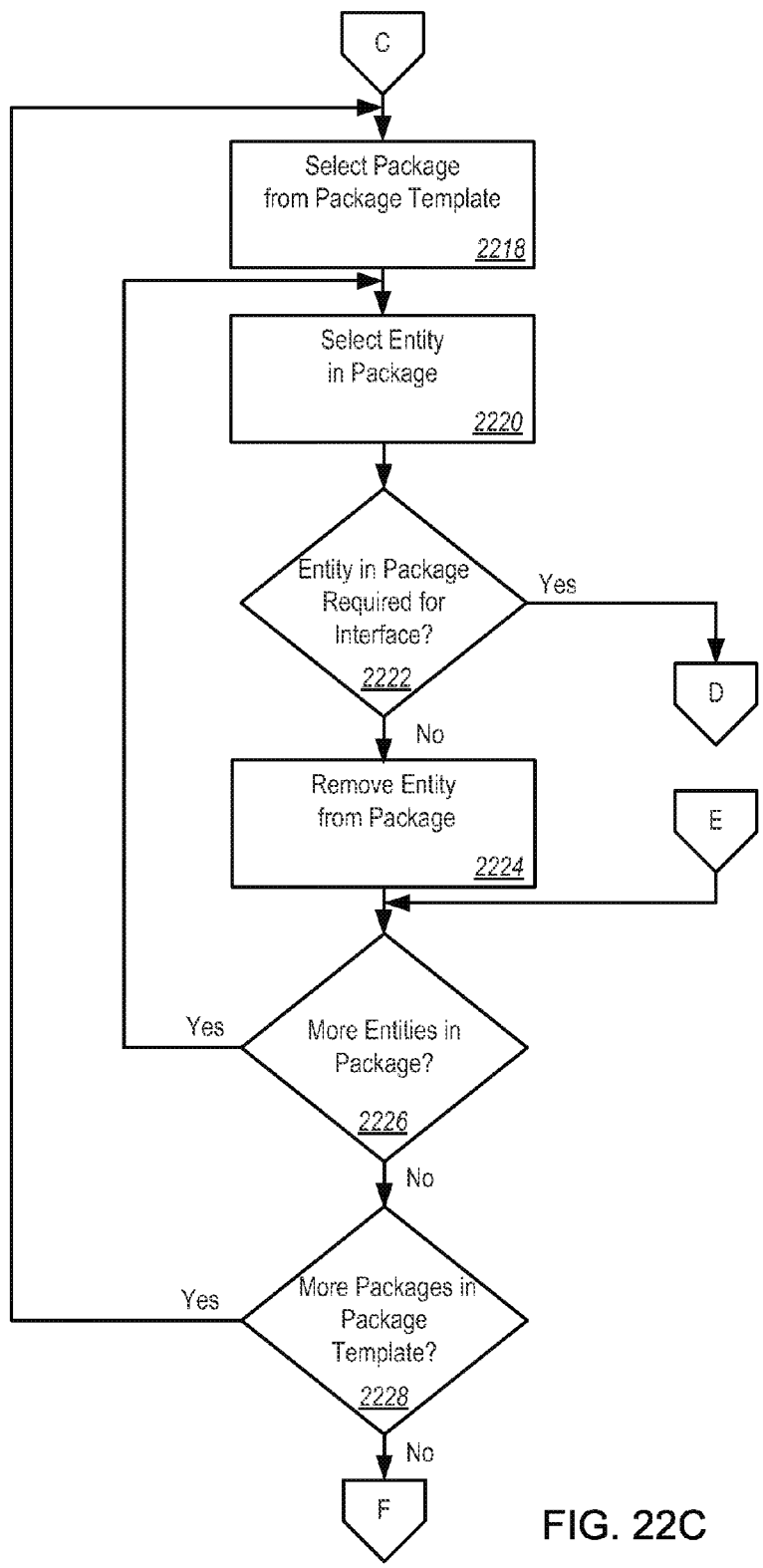

If, at step 2206, the package is required for the interface, the system copies the entity template from the package in the business object model into the package in the package template (step 2212, FIG. 22B). The system determines whether there is a specialization in the entity template (step 2214). If the system determines that there is a specialization in the entity template, the system selects a subtype for the specialization (step 2216). The system may either select the subtype for the specialization based on the message type, or it may receive this information from the designer. The system then determines whether there are any other specializations in the entity template (step 2214). When the system determines that there are no specializations in the entity template, the system continues this analysis for the remaining packages within the package template (step 2210, FIG. 22A).

At step 2210, after the system completes its analysis for the packages within the package template, the system selects one of the packages remaining in the package template (step 2218, FIG. 22C), and selects an entity from the package (step 2220). The system receives an indication from the designer whether the entity is required for the interface (step 2222). If the entity is not required for the interface, the system removes the entity from the package template (step 2224). The system then continues this analysis for the remaining entities within the package (step 2226), and for the remaining packages within the package template (step 2228).

Figure 22D:
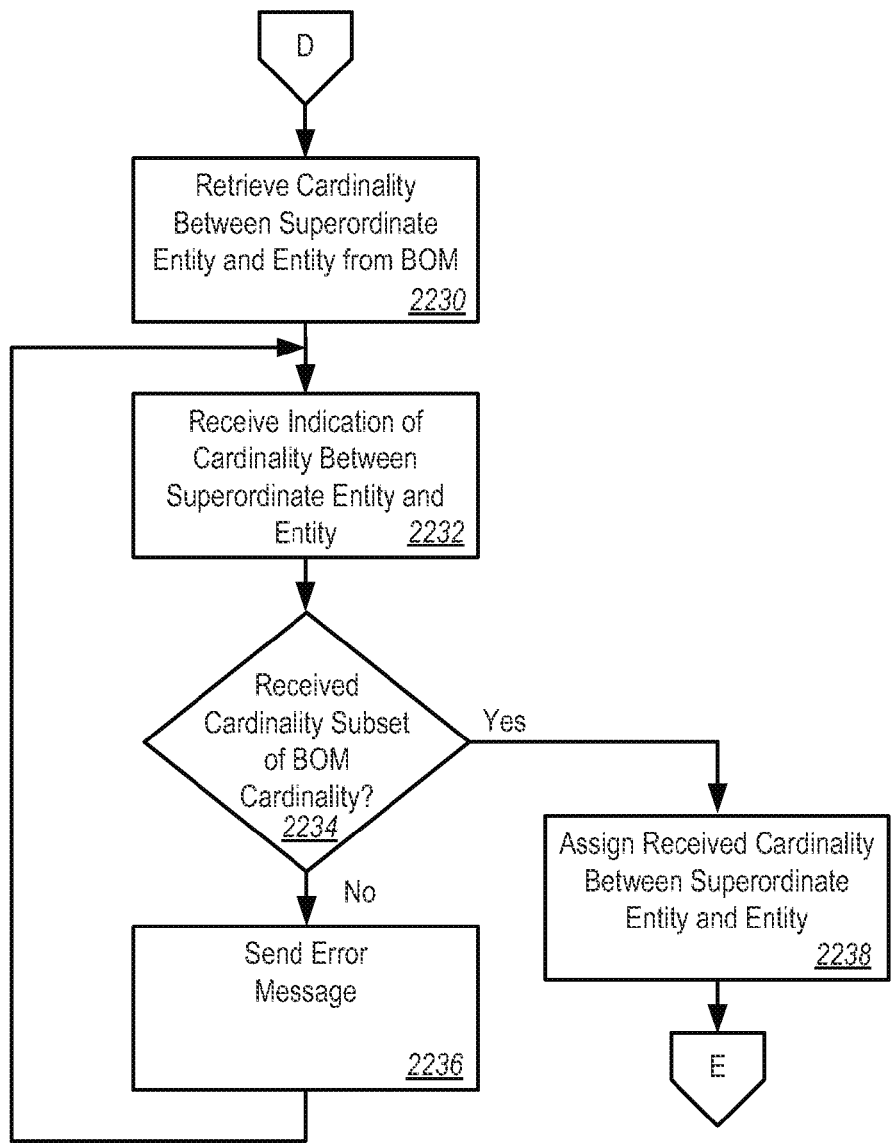

If, at step 2222, the entity is required for the interface, the system retrieves the cardinality between a superordinate entity and the entity from the business object model (step 2230, FIG. 22D). The system also receives an indication of the cardinality between the superordinate entity and the entity from the designer (step 2232). The system then determines whether the received cardinality is a subset of the business object model cardinality (step 2234). If the received cardinality is not a subset of the business object model cardinality, the system sends an error message to the designer (step 2236). If the received cardinality is a subset of the business object model cardinality, the system assigns the received cardinality as the cardinality between the superordinate entity and the entity (step 2238). The system then continues this analysis for the remaining entities within the package (step 2226, FIG. 22C), and for the remaining packages within the package template (step 2228).

Figure 22E:
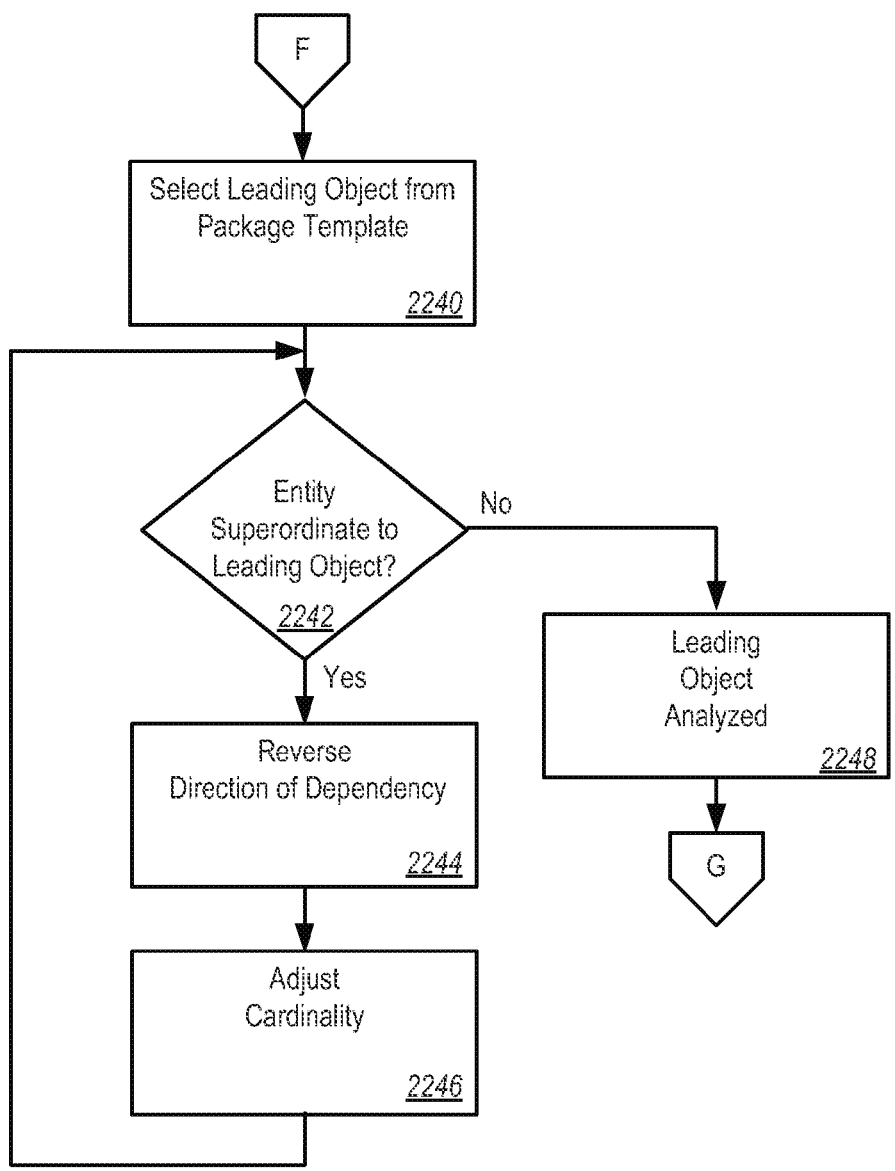

The system then selects a leading object from the package template (step 2240, FIG. 22E). The system determines whether there is an entity superordinate to the leading object (step 2242). If the system determines that there is an entity superordinate to the leading object, the system reverses the direction of the dependency (step 2244) and adjusts the cardinality between the leading object and the entity (step 2246). The system performs this analysis for entities that are superordinate to the leading object (step 2242). If the system determines that there are no entities superordinate to the leading object, the system identifies the leading object as analyzed (step 2248).

Figure 22F:
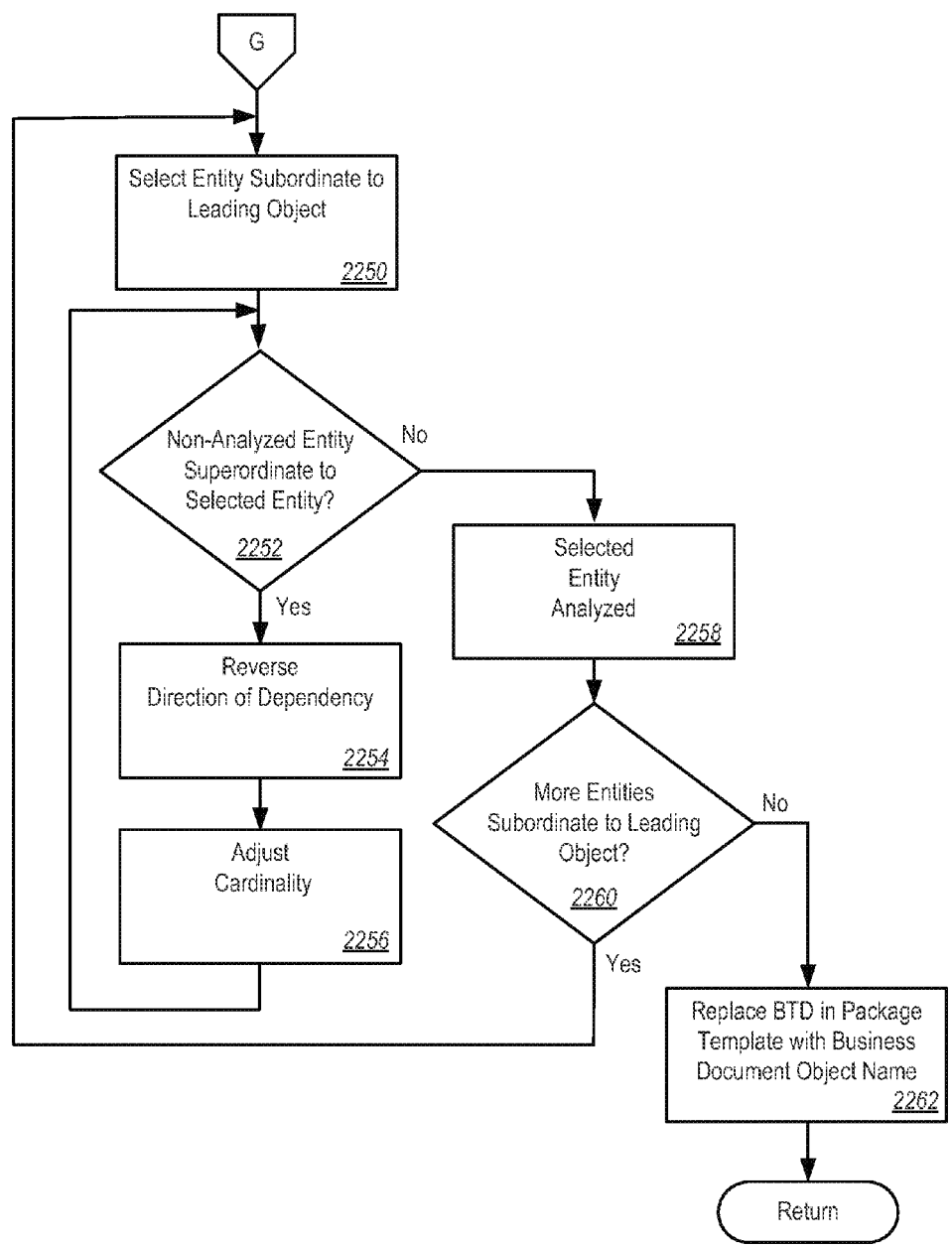

The system then selects an entity that is subordinate to the leading object (step 2250, FIG. 22F). The system determines whether any non-analyzed entities are superordinate to the selected entity (step 2252). If a non-analyzed entity is superordinate to the selected entity, the system reverses the direction of the dependency (step 2254) and adjusts the cardinality between the selected entity and the non-analyzed entity (step 2256). The system performs this analysis for non-analyzed entities that are superordinate to the selected entity (step 2252). If the system determines that there are no non-analyzed entities superordinate to the selected entity, the system identifies the selected entity as analyzed (step 2258), and continues this analysis for entities that are subordinate to the leading object (step 2260). After the packages have been analyzed, the system substitutes the BusinessTransactionDocument ("BTD") in the package template with the name of the interface (step 2262). This includes the "BTD" in the BTDItem package and the "BTD" in the BTDItemScheduleLine package.

6. Use of an Interface

Figure 23:
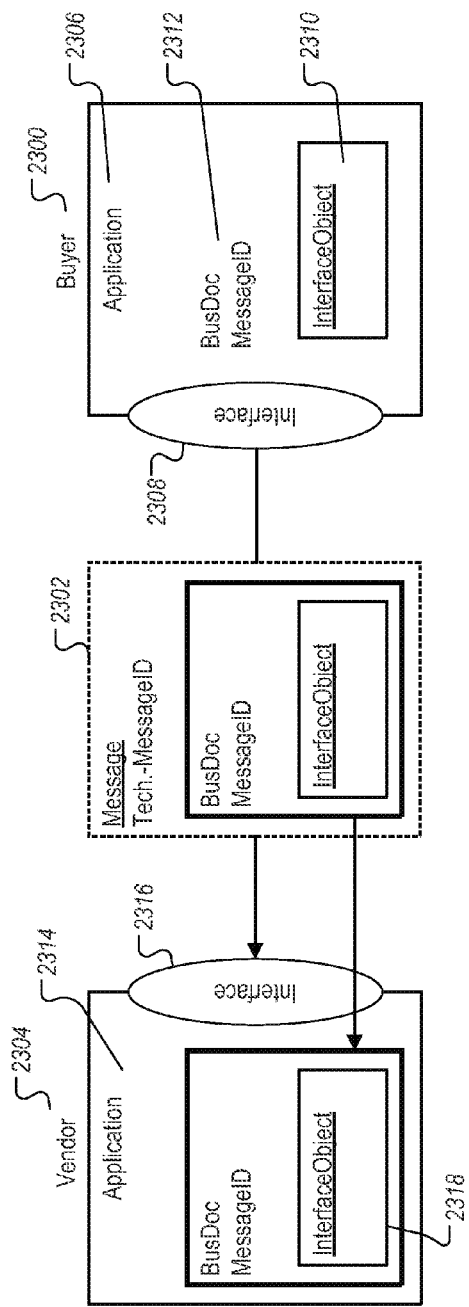
FIG. 23 depicts an example illustrating the transmittal of a business document in accordance with methods and systems consistent with the subject matter described herein.

The XI stores the interfaces (as an interface type). At runtime, the sending party's program instantiates the interface to create a business document, and sends the business document in a message to the recipient. The messages are preferably defined using XML. In the example depicted in FIG. 23, the Buyer 2300 uses an application 2306 in its system to instantiate an interface 2308 and create an interface object or business document object 2310. The Buyer's application 2306 uses data that is in the sender's component-specific structure and fills the business document object 2310 with the data. The Buyer's application 2306 then adds message identification 2312 to the business document and places the business document into a message 2302. The Buyer's application 2306 sends the message 2302 to the Vendor 2304. The Vendor 2304 uses an application 2314 in its system to receive the message 2302 and store the business document into its own memory. The Vendor's application 2314 unpacks the message 2302 using the corresponding interface 2316 stored in its XI to obtain the relevant data from the interface object or business document object 2318.

Figure 24:
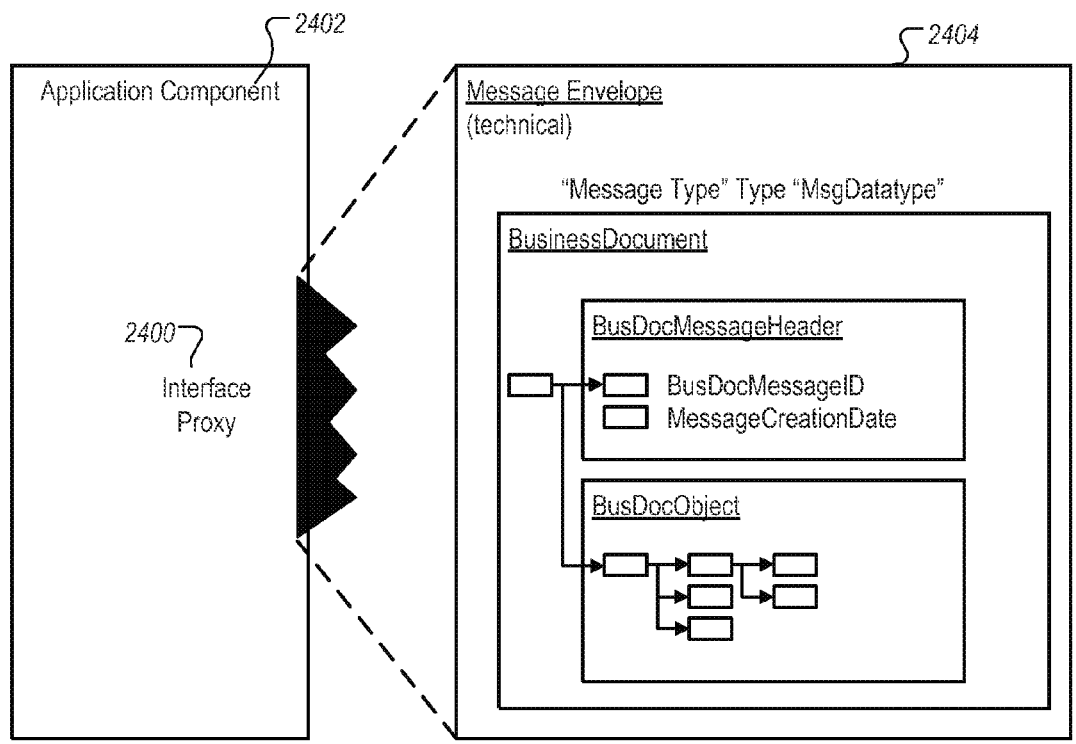
FIG. 24 depicts an interface proxy in accordance with methods and systems consistent with the subject matter described herein.
Figure 25:
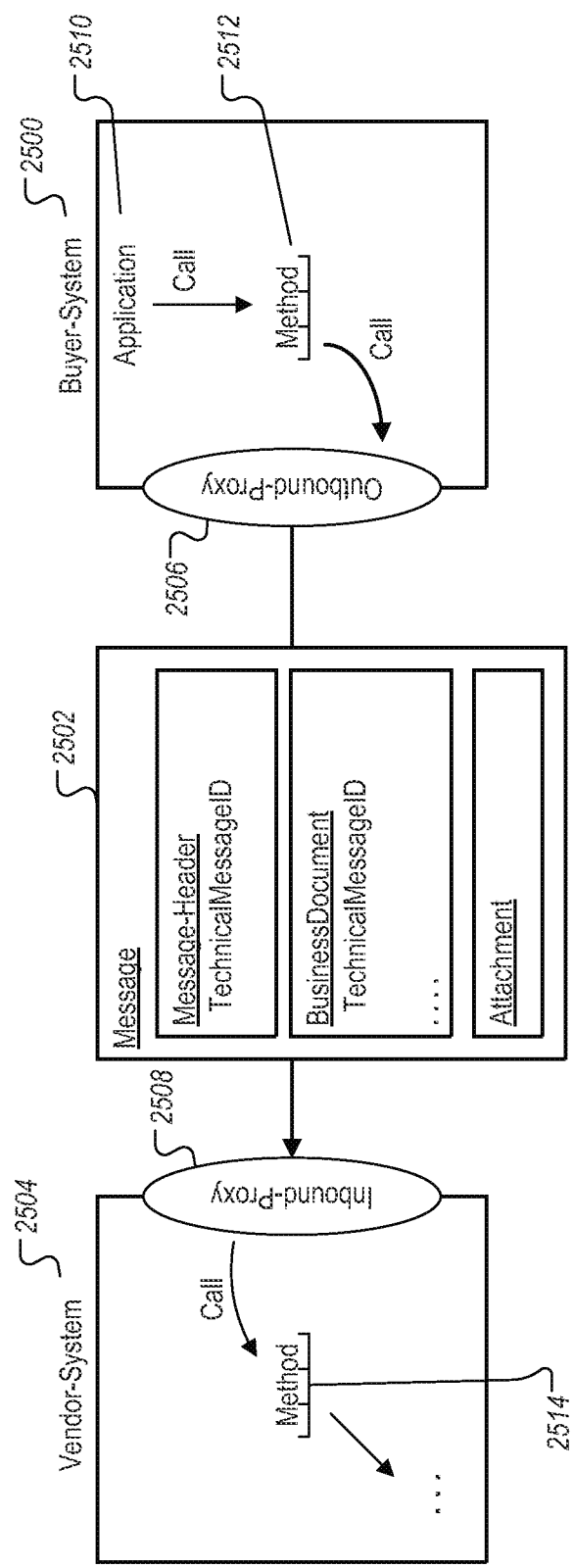
FIG. 25 depicts an example illustrating the transmittal of a message using proxies in accordance with methods and systems consistent with the subject matter described herein.

From the component's perspective, the interface is represented by an interface proxy 2400, as depicted in FIG. 24. The proxies 2400 shield the components 2402 of the sender and recipient from the technical details of sending messages 2404 via XI. In particular, as depicted in FIG. 25, at the sending end, the Buyer 2500 uses an application 2510 in its system to call an implemented method 2512, which generates the outbound proxy 2506. The outbound proxy 2506 parses the internal data structure of the components and converts them to the XML structure in accordance with the business document object. The outbound proxy 2506 packs the document into a message 2502. Transport, routing and mapping the XML message to the recipient 28304 is done by the routing system (XI, modeling environment 516, etc.).

When the message arrives, the recipient's inbound proxy 2508 calls its component-specific method 2514 for creating a document. The proxy 2508 at the receiving end downloads the data and converts the XML structure into the internal data structure of the recipient component 2504 for further processing.

Figure 26A:
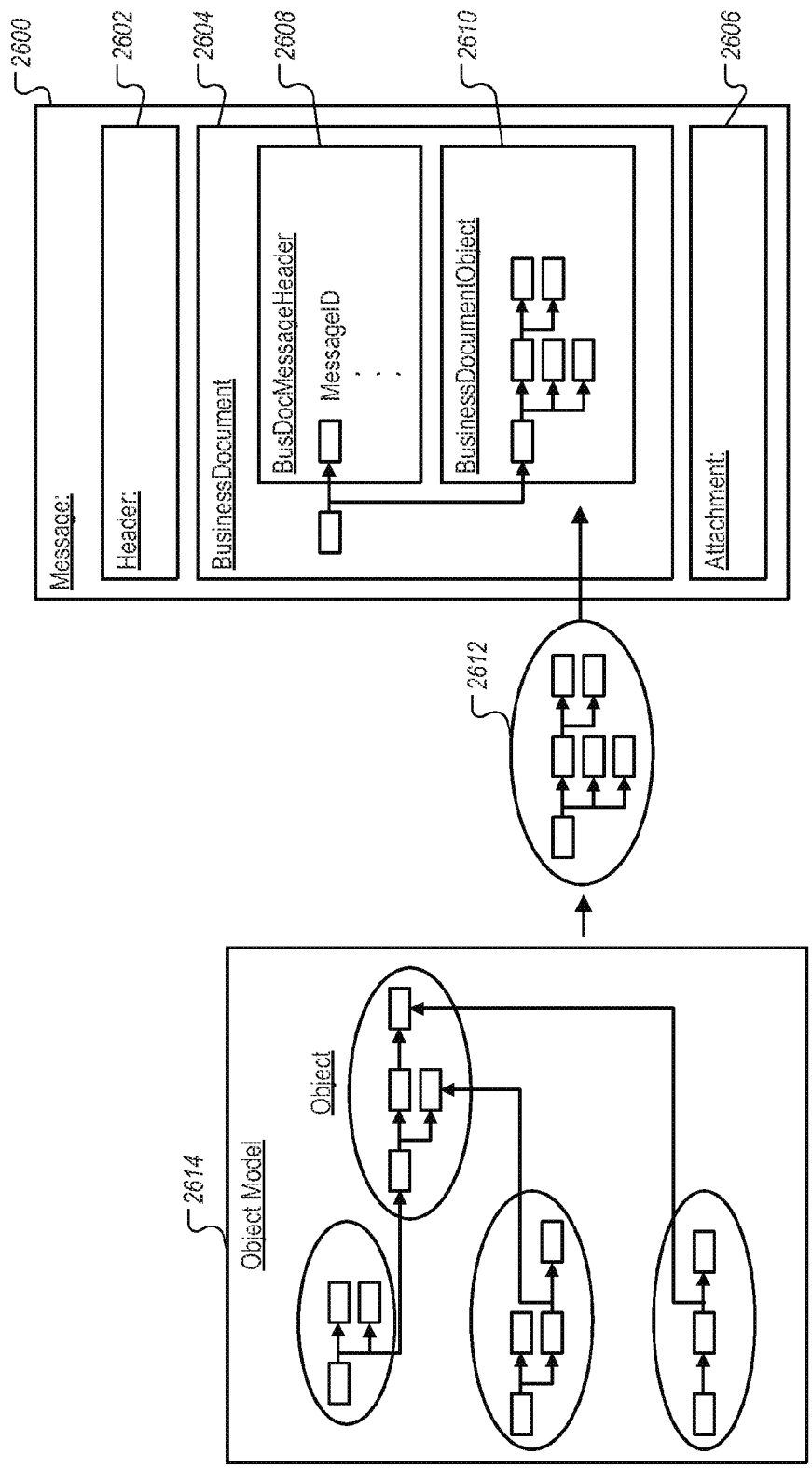
FIG. 26A depicts components of a message in accordance with methods and systems consistent with the subject matter described herein.

As depicted in FIG. 26A, a message 2600 includes a message header 2602 and a business document 2604. The message 2600 also may include an attachment 2606. For example, the sender may attach technical drawings, detailed specifications or pictures of a product to a purchase order for the product. The business document 2604 includes a business document message header 2608 and the business document object 2610. The business document message header 2608 includes administrative data, such as the message ID and a message description. As discussed above, the structure 2612 of the business document object 2610 is derived from the business object model 2614. Thus, there is a strong correlation between the structure of the business document object and the structure of the business object model. The business document object 2610 forms the core of the message 2600.

In collaborative processes as well as Q&A processes, messages should refer to documents from previous messages. A simple business document object ID or object ID is insufficient to identify individual messages uniquely because several versions of the same business document object can be sent during a transaction. A business document object ID with a version number also is insufficient because the same version of a business document object can be sent several times. Thus, messages require several identifiers during the course of a transaction.

Figure 26B:
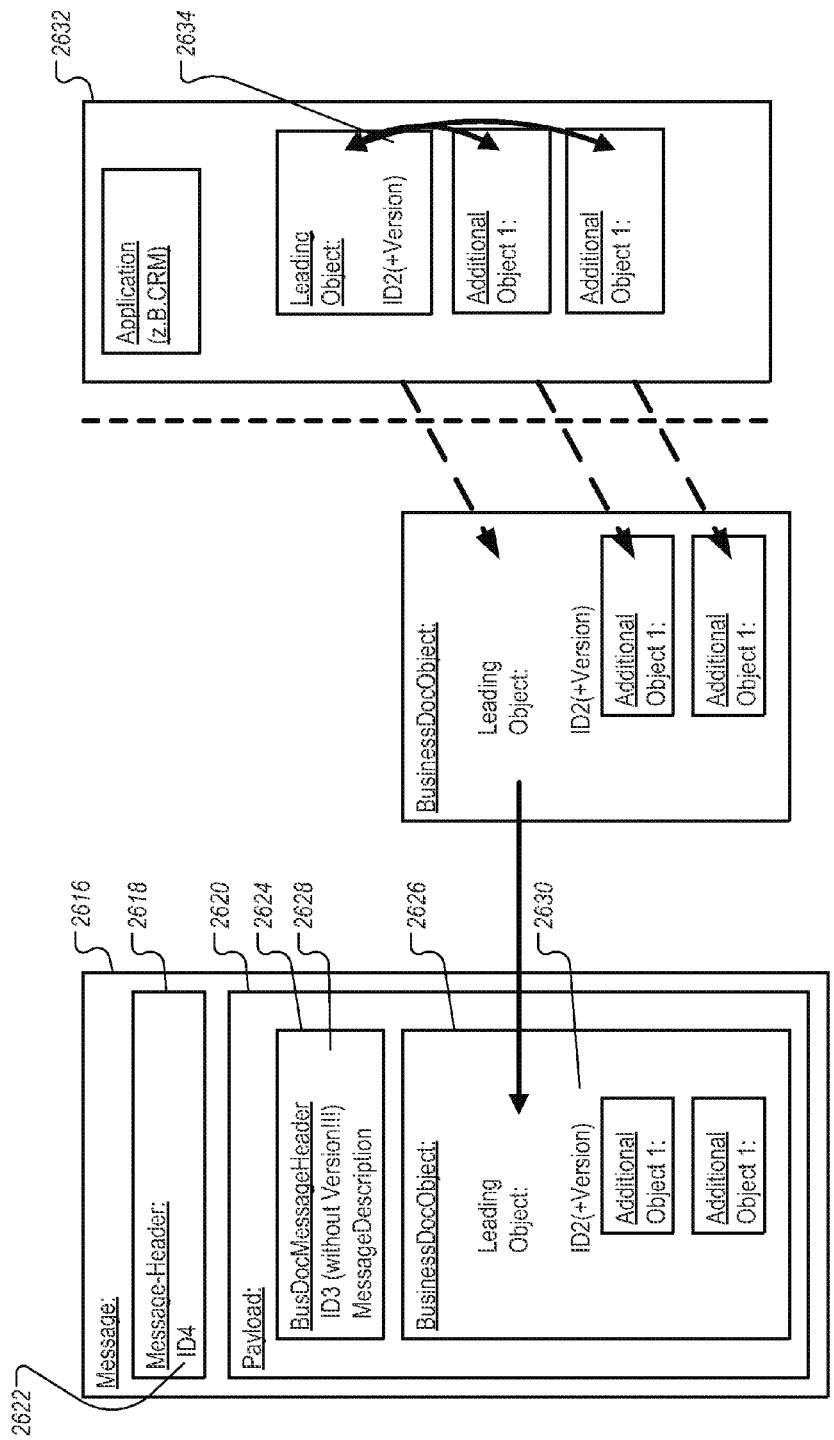
FIG. 26B depicts IDs used in a message in accordance with methods and systems consistent with the subject matter described herein.

As depicted in FIG. 26B, the message header 2618 in message 2616 includes a technical ID ("ID4") 2622 that identifies the address for a computer to route the message. The sender's system manages the technical ID 2622.

The administrative information in the business document message header 2624 of the payload or business document 2620 includes a BusinessDocumentMessageID ("ID3") 2628. The business entity or component 2632 of the business entity manages and sets the BusinessDocumentMessageID 2628. The business entity or component 2632 also can refer to other business documents using the BusinessDocumentMessageID 2628. The receiving component 2632 requires no knowledge regarding the structure of this ID. The BusinessDocumentMessageID 2628 is, as an ID, unique. Creation of a message refers to a point in time. No versioning is typically expressed by the ID. Besides the BusinessDocumentMessageID 2628, there also is a business document object ID 2630, which may include versions.

The component 2632 also adds its own component object ID 2634 when the business document object is stored in the component. The component object ID 2634 identifies the business document object when it is stored within the component. However, not all communication partners may be aware of the internal structure of the component object ID 2634. Some components also may include a versioning in their ID 2634.

7. Use of Interfaces Across Industries

Methods and systems consistent with the subject matter described herein provide interfaces that may be used across different business areas for different industries. Indeed, the interfaces derived using methods and systems consistent with the subject matter described herein may be mapped onto the interfaces of different industry standards. Unlike the interfaces provided by any given standard that do not include the interfaces required by other standards, methods and systems consistent with the subject matter described herein provide a set of consistent interfaces that correspond to the interfaces provided by different industry standards. Due to the different fields provided by each standard, the interface from one standard does not easily map onto another standard. By comparison, to map onto the different industry standards, the interfaces derived using methods and systems consistent with the subject matter described herein include most of the fields provided by the interfaces of to different industry standards. Missing fields may easily be included into the business object model. Thus, by derivation, the interfaces can be extended consistently by these fields. Thus, methods and systems consistent with the subject matter described herein provide consistent interfaces or services that can be used across different industry standards.

Figure 28:
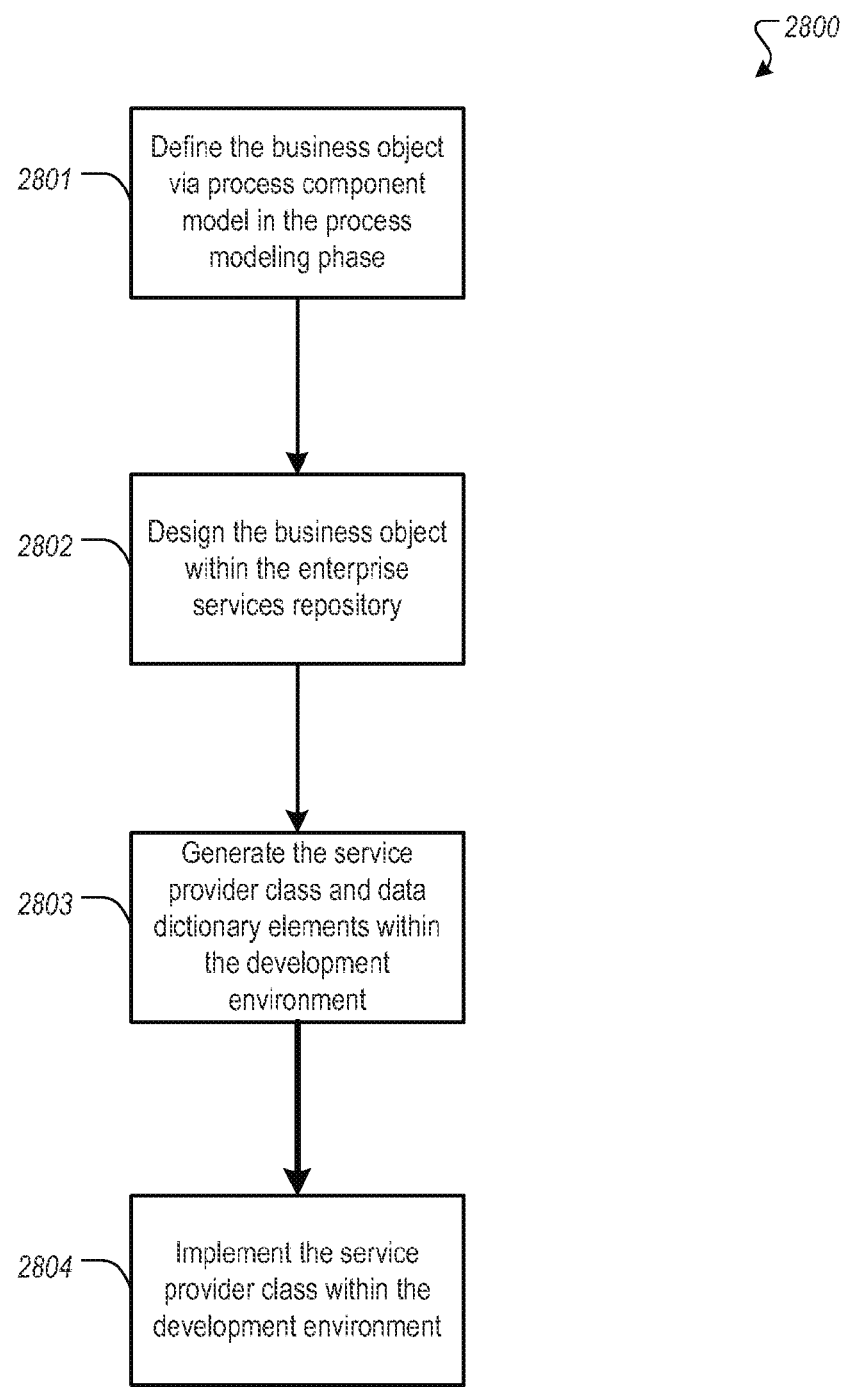
FIG. 28 illustrates an example method for service enabling in accordance with one embodiment of the present disclosure.
Figure 29:
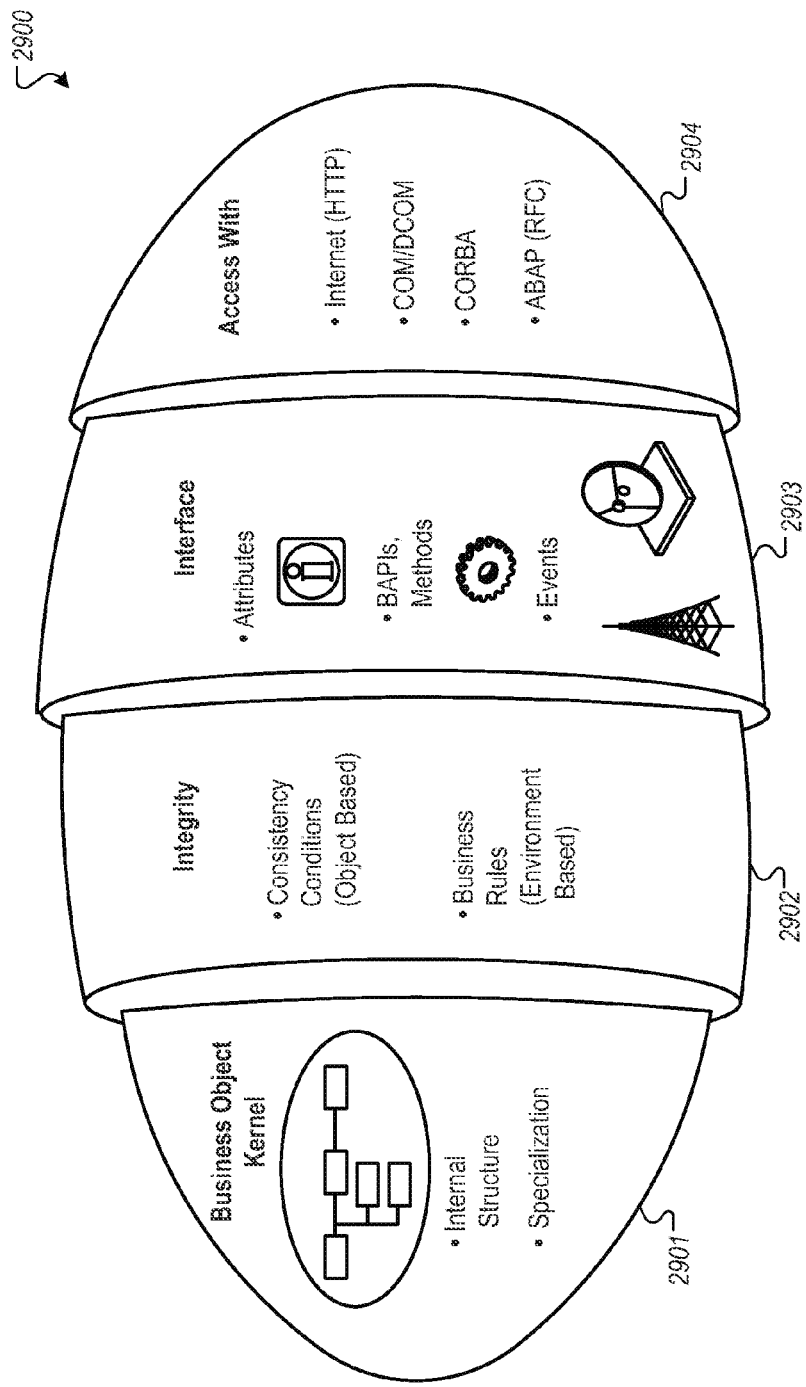
FIG. 29 is a graphical illustration of an example business object and associated components as may be used in the enterprise service infrastructure system of the present disclosure.

For example, FIG. 28 illustrates an example method 2800 for service enabling. In this example, the enterprise services infrastructure may offer one common and standard-based service infrastructure. Further, one central enterprise services repository may support uniform service definition, implementation and usage of services for user interface, and cross-application communication. In step 2801, a business object is defined via a process component model in a process modeling phase. Next, in step 2802, the business object is designed within an enterprise services repository. For example, FIG. 29 provides a graphical representation of one of the business objects 2900. As shown, an innermost layer or kernel 2901 of the business object may represent the business object's inherent data. Inherent data may include, for example, an employee's name, age, status, position, address, etc. A second layer 2902 may be considered the business object's logic. Thus, the layer 2902 includes the rules for consistently embedding the business object in a system environment as well as constraints defining values and domains applicable to the business object. For example, one such constraint may limit sale of an item only to a customer with whom a company has a business relationship. A third layer 2903 includes validation options for accessing the business object. For example, the third layer 2903 defines the business object's interface that may be interfaced by other business objects or applications. A fourth layer 2904 is the access layer that defines technologies that may externally access the business object.

Accordingly, the third layer 2903 separates the inherent data of the first layer 2901 and the technologies used to access the inherent data. As a result of the described structure, the business object reveals only an interface that includes a set of clearly defined methods. Thus, applications access the business object via those defined methods. An application wanting access to the business object and the data associated therewith usually includes the information or data to execute the clearly defined methods of the business object's interface. Such clearly defined methods of the business object's interface represent the business object's behavior. That is, when the methods are executed, the methods may change the business object's data. Therefore, an application may utilize any business object by providing the information or data without having any concern for the details related to the internal operation of the business object. Returning to method 2800, a service provider class and data dictionary elements are generated within a development environment at step 2803. In step 2804, the service provider class is implemented within the development environment.

Figure 30:
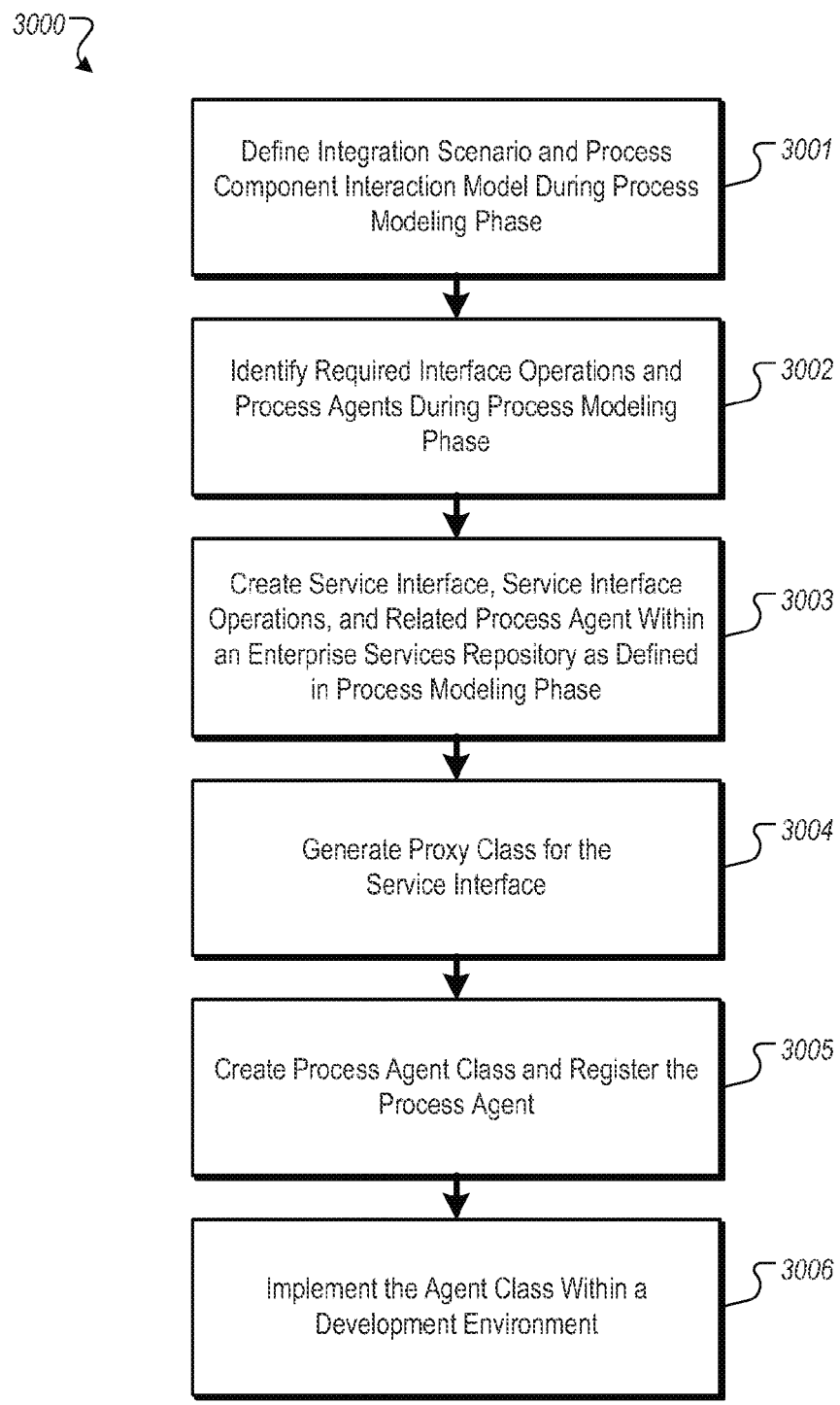
FIG. 30 illustrates an example method for managing a process agent framework in accordance with one embodiment of the present disclosure.

FIG. 30 illustrates an example method 3000 for a process agent framework. For example, the process agent framework may be the basic infrastructure to integrate business processes located in different deployment units. It may support a loose coupling of these processes by message based integration. A process agent may encapsulate the process integration logic and separate it from business logic of business objects. As shown in FIG. 30, an integration scenario and a process component interaction model are defined during a process modeling phase in step 3001. In step 3002, required interface operations and process agents are identified during the process modeling phase also. Next, in step 3003, a service interface, service interface operations, and the related process agent are created within an enterprise services repository as defined in the process modeling phase. In step 3004, a proxy class for the service interface is generated. Next, in step 3005, a process agent class is created and the process agent is registered. In step 3006, the agent class is implemented within a development environment.

Figure 31:
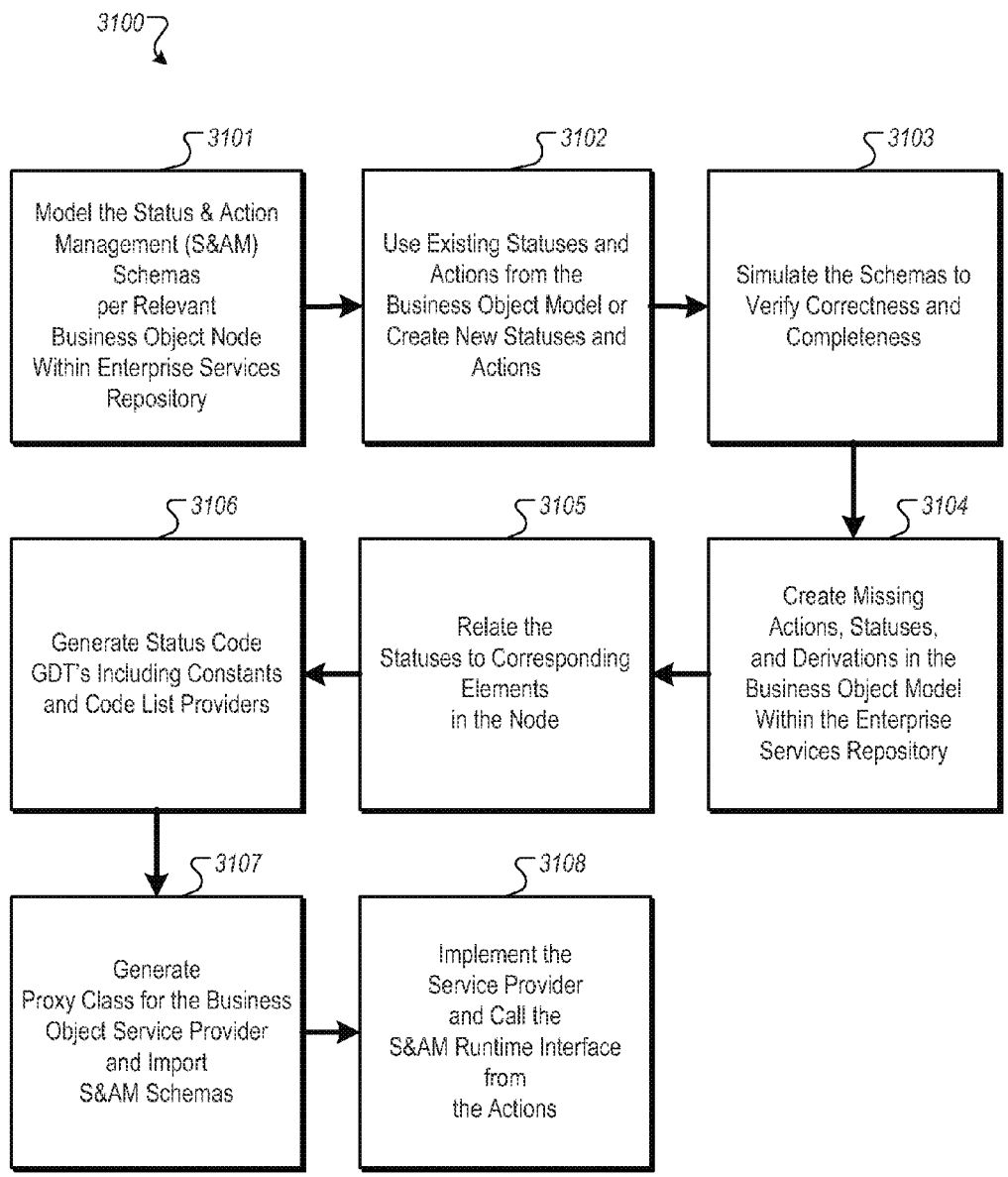
FIG. 31 illustrates an example method for status and action management in accordance with one embodiment of the present disclosure.

FIG. 31 illustrates an example method 3100 for status and action management (S&AM). For example, status and action management may describe the life cycle of a business object (node) by defining actions and statuses (as their result) of the business object (node), as well as, the constraints that the statuses put on the actions. In step 3101, the status and action management schemas are modeled per a relevant business object node within an enterprise services repository. In step 3102, existing statuses and actions from the business object model are used or new statuses and actions are created. Next, in step 3103, the schemas are simulated to verify correctness and completeness. In step 3104, missing actions, statuses, and derivations are created in the business object model with the enterprise services repository. Continuing with method 3100, the statuses are related to corresponding elements in the node in step 3105. In step 3106, status code GDT's are generated, including constants and code list providers. Next, in step 3107, a proxy class for a business object service provider is generated and the proxy class S&AM schemas are imported. In step 3108, the service provider is implemented and the status and action management runtime interface is called from the actions.

Regardless of the particular hardware or software architecture used, the disclosed systems or software are generally capable of implementing business objects and deriving (or otherwise utilizing) consistent interfaces that are suitable for use across industries, across businesses, and across different departments within a business in accordance with some or all of the following description. In short, system 100 contemplates using any appropriate combination and arrangement of logical elements to implement some or all of the described functionality.

Moreover, the preceding flowcharts and accompanying description illustrate example methods. The present services environment contemplates using or implementing any suitable technique for performing these and other tasks. It will be understood that these methods are for illustration purposes only and that the described or similar techniques may be performed at any appropriate time, including concurrently, individually, or in combination. In addition, many of the steps in these flowcharts may take place simultaneously and/or in different orders than as shown. Moreover, the services environment may use methods with additional steps, fewer steps, and/or different steps, so long as the methods remain appropriate.

Figure 32:
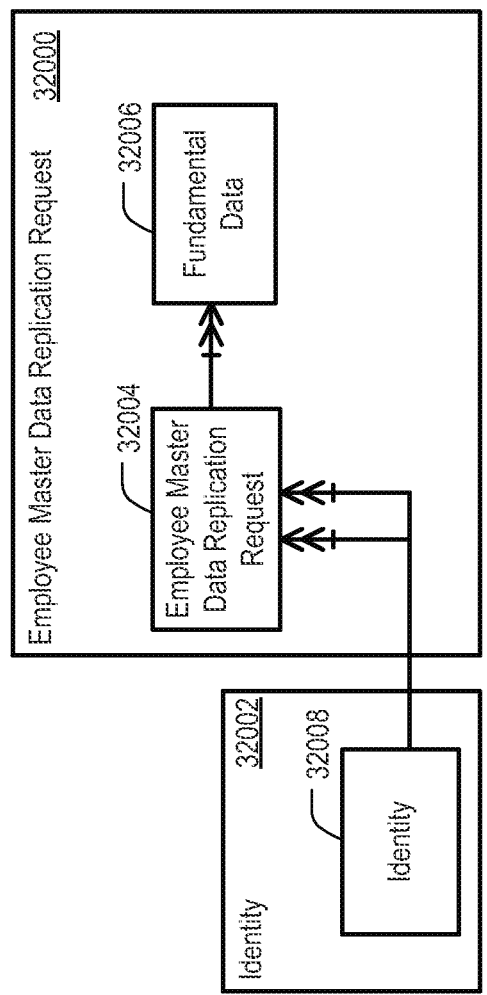
FIG. 32 depicts an example Employee Master Data Replication Request Object Model.

FIG. 32 illustrates an example object model for an Employee Master Data Replication Request business object 32000. Specifically, the object model depicts interactions among various components of the Employee Master Data Replication Request business object 32000, as well as external components that interact with the Employee Master Data Replication Request business object 32000 (shown here as 32002 and 32008). The Employee Master Data Replication Request business object 32000 includes elements 32004 through 32006. The elements 32004 through 32006 can be hierarchical, as depicted. For example, the Employee Master Data Replication Request entity 32004 hierarchically includes entity Fundamental Data 32006. Some or all of the entities 32004 through 32006 can correspond to packages and/or entities in the message data types described below.

The business object Employee Master Data Replication Request is a request to replicate employee master data. The Employee Master Data Replication Request business object belongs to the process component Human Capital Management Master Data Replication. The Employee Master Data Replication Request business object belongs to the deployment unit Human Capital Management. The Employee Master Data Replication Request can be created based on employee master data from a source, such as a system or a file, using an inbound interface. When it is processed, the Employee Master Data Replication Request business object creates or updates employee master data objects such as Work Agreement, Employment and Employee, Employee Time Agreement, Employee Compensation Agreement, and Employee Payroll Agreement. Depending on scoping and on the current state of an employee, a request can also create business process objects, such as a Personnel Hiring or a Personnel Transfer. The business object Employee Master Data Replication Request has an object category of Business Transaction Document and a technical category of Standard Business Object.

As an example, consider a Root node including the following: BusinessDocumentFileName: EmployeeData2010-08-11.xlsx, BusinessDocumentFileCreationDate: 2010-08-11, ProcessingStatusCode: Not Started, and ConsistencyStatusCode: Not Checked; and Fundamental Data including the following: EmployeeID: 22375, EmployeeFirstName: Stephen, EmployeeLastName: Rotman, EmployeeBirthDate: 1965-06-06, WorkAgreementTypeCode: Permanent, WorkAgreementAdministrativeCategoryCode: Salaried, EmploymentCountryCode: US, EmploymentCompanyID: Acron Heating, OrganisationalCentreID: 22415, JobID: MEC12, ProcessingStatusCode: Not Started, and ConsistencyStatusCode: Not Checked. In this example, for an Employee Master Data Replication Request, a root can include information about the request itself, such as a creation date, creation source, and processing status. A fundamental data node can include information about an employee whose data is to be replicated.

The elements located directly at the node Root are defined by the data type EmployeeMasterDataReplicationRequestElements. These elements are UUID, BusinessDocumentFileName, BusinessDocumentFileCreationDate, BusinessDocumentMessageID, OrganisationalCentreSourceBusinessSystemUUID, SystemAdministrativeData, and Status. Status may include Status/ProcessingStatusCode. UUID may be an alternative key, is a globally unique identifier of an employee replication request, and may be based on datatype GDT: UUID. BusinessDocumentFileName is a name of a file which was used to create a business document, and may be based on datatype GDT: LANGUAGEINDEPENDENT_MEDIUM_Name. A business document file may, for example, be a spreadsheet file transferred via a migration workbench into a request object. BusinessDocumentFileCreationDate is a creation date of a file which was used to create a business document, and may be based on datatype GDT: Date. The date represents a date where a snapshot of data has been taken. All employee master data in the request can be used as employee attributes. BusinessDocumentMessageID may be optional, is an identifier of a message which was used to create a business document, and may be based on datatype GDT: BusinessDocumentMessageID. OrganisationalCentreSourceBusinessSystemUUID may be optional and may be based on datatype GDT: UUID. SystemAdministrativeData includes information about who created or changed an instance of employee master data replication request and when the creation or change occurred, and may be based on datatype GDT: SystemAdministrativeData. Status indicates a current status in the life cycle of an employee master data replication, and may be based on datatype BOIDT: EmployeeMasterDataReplicationRequestStatus. Status/ProcessingStatusCode is a status that describes an execution progress of an Employee Master Data Replication Request, and may be based on datatype GDT: ProcessingStatusCode.

The following composition relationships to subordinate nodes may exist: Fundamental Data, in a 1:CN cardinality relationship. The following inbound association relationships may exist: CreationIdentity, from the business object Identity/node Identity, with a cardinality of 1:CN, which represents the identity that created an Employee Master Data Replication Request; and LastChangeIdentity, from the business object Identity/node Identity, with a cardinality of 1:CN, which is the identity that was a last changer of an Employee Master Data Replication Request.

A CleanUp action may be used to clean up outdated data from a business object. In some implementations, Fundamental Data subnodes which are outdated are not used for a replication process. The CleanUp action can delete such subnodes. Changes to the object resulting from the CleanUP action can include deleting all Fundamental Data subnodes which are outdated. There may be no direct status change resulting from the CleanUp action, but status at the root node might change due to aggregation.

A DetermineProcessingStatus action can determine the ProcessingStatus of an Employee Master Data Replication Request, taking into account an UpdateStatus and a RelevanceStatus of a fundamental data node. Status changes resulting from the DetermineProcessingStatus action may include: the ProcessingStatus may be not started if all fundamental data nodes are in UpdateStatus Not Started; the ProcessingStatus may be finished if all fundamental data nodes are in UpdateStatus Successful or in RelevanceStatus Irrelevant; and in other cases the ProcessingStatus may be In Process.

Query elements for a QueryByElements are defined by the data type EmployeeMasterDataReplicationRequestRootQueryByElementsQueryElements. These elements include: BusinessDocumentFileName, BusinessDocumentFileCreationDate, BusinessDocumentMessageID, SystemAdministrativeData, and EmployeeMasterDataReplicationRequestStatus. SystemAdministrativeData may include SystemAdministrativeData/CreationDateTime, SystemAdministrativeData/CreationIdentityUUID, SystemAdministrativeData/CreationIdentityID, SystemAdministrativeData/LastChangeDateTime, and SystemAdministrativeData/LastChangeIdentityUUID. EmployeeMasterDataReplicationRequestStatus may include EmployeeMasterDataReplicationRequestStatus/ProcessingStatusCode. BusinessDocumentFileName may be based on datatype GDT: LANGUAGEINDEPENDENT_MEDIUM_Name. BusinessDocumentFileCreationDate may be based on datatype GDT: Date. BusinessDocumentMessageID may be based on datatype GDT: BusinessDocumentMessageID. SystemAdministrativeData may be based on datatype QueryIDT: QueryElementSystemAdministrativeData. SystemAdministrativeData/CreationDateTime is a point in time date and time stamp of creation, and may be based on datatype GDT: GLOBAL_DateTime. SystemAdministrativeData/CreationIdentityUUID is a globally unique identifier for an identity who performed a creation, and may be based on datatype GDT: UUID. SystemAdministrativeData/CreationIdentityID is an identifier for an identity who performed a creation, and may be based on datatype GDT: IdentityID. SystemAdministrativeData/LastChangeDateTime is a point in time date and time stamp of a last change, and may be based on datatype GDT: GLOBAL_DateTime. SystemAdministrativeData/LastChangeIdentityUUID is a globally unique identifier for an identity who performed a last changes, and may be based on datatype GDT: UUID. EmployeeMasterDataReplicationRequestStatus may be based on datatype BOIDT: EmployeeMasterDataReplicationRequestStatus. EmployeeMasterDataReplicationRequestStatus/ProcessingStatusCode is a status that describes an execution progress of an Employee Master Data Replication Request, and may be based on datatype GDT: ProcessingStatusCode.

Fundamental Data includes fundamental, key date related master data of an employee in a flat structure. This data can include a name, an organizational assignment and an agreed working time. The elements located directly at the node Fundamental Data are defined by the data type EmployeeMasterDataReplicationRequestFundamentalDataElements. These elements include: EmployeeID, EmployeeFirstName, EmployeeLastName, EmployeeMiddleName, EmployeeFormOfAddressCode, EmployeeAcademicTitleCode, EmployeeGenderCode, EmployeeBirthDate, EmployeeBirthPlaceName, EmployeeMaritalStatus Code, EmployeeNationalityCode, EmployeePrivateAddressPhoneNumberDescription, EmployeePrivateAddressEmailURI, EmployeePrivateAddressMobilePhoneNumberDescription, EmployeePrivateAddressHouseID, EmployeePrivateAddressStreetName, EmployeePrivateAddressCityName, EmployeePrivateAddressStateCode, EmployeePrivateAddressCountryCode, EmployeePrivateAddressStreetPostalCode, EmployeePrivateAddressPOBoxPostalCode, EmployeePrivateAddressPOBoxID, EmployeeOfficeAddressPhoneNumberDescription, EmployeeOfficeAddressEmailURI, EmployeeOfficeAddressMobilePhoneNumberDescription, EmployeeOfficeAddressFaxNumberDescription, EmployeeOfficeAddressBuildingID, EmployeeOfficeAddressRoomID, EmployeeOfficeAddressInhouseMailID, EmployeeHireDate, EmployeeLeavingDate, WorkAgreementTerminationDismissalIndicator, WorkAgreementTypeCode, WorkAgreementAdministrativeCategoryCode, WorkAgreementServiceStartDate, AgreedWorkingHoursRate, EmploymentCompanyID, EmploymentCountryCode, JobID, OrganisationalCentreID, OrganisationalCentreRemoteObjectID, CurrentIndicator, Status, and ApplicationLogItemUUID.

EmployeeID is a unique user-assigned identifier of an employee and may be based on datatype GDT: EmployeeID. EmployeeFirstName is a first name of an employee and may be based on datatype GDT: LANGUAGEINDEPENDENT_MEDIUM_Name. EmployeeLastName is a last name of an employee and may be based on datatype GDT: LANGUAGE-INDEPENDENT_MEDIUM_Name. EmployeeMiddleName may be optional, is a middle name of an employee, and may be based on datatype GDT: LANGUAGEINDEPENDENT_MEDIUM_Name. EmployeeFormOfAddressCode may be optional, is a code of a salutation for an employee, and may be based on datatype GDT: FormOfAddressCode. EmployeeAcademicTitleCode may be optional, is a code for an academic title of an employee, and may be based on datatype GDT: AcademicTitleCode. EmployeeGenderCode may be optional, is a code for the gender of an employee, and may be based on datatype GDT: GenderCode. EmployeeBirthDate may be optional, is an employee's date of birth, and may be based on datatype GDT: Date. EmployeeBirthPlaceName may be optional, is an employee's place of birth, and may be based on datatype GDT: LANGUAGEINDEPENDENT_MEDIUM_Name. EmployeeMaritalStatusCode may be optional, is the marital status of an employee, and may be based on datatype GDT: MaritalStatusCode. EmployeeNationalityCode may be optional, is a nationality of an employee, and may be based on datatype GDT: CountryCode. EmployeePrivateAddressPhoneNumberDescription may be optional, is a private telephone number of an employee, and may be based on datatype GDT: LANGUAGEINDEPENDENT_SHORT_Description. EmployeePrivateAddressEmailURI may be optional, is a private E-mail address of an employee, and may be based on datatype GDT: EmailURI. EmployeePrivateAddressMobilePhoneNumberDescription may be optional, is a private mobile phone number of an employee, and may be based on datatype GDT: LANGUAGEINDEPENDENT_SHORT_Description. EmployeePrivateAddressHouseID may be optional, is a private address house number of an employee, and may be based on datatype GDT: HouseID. EmployeePrivateAddressStreetName may be optional, is a private address street name of an employee, and may be based on datatype GDT: StreetName. EmployeePrivateAddressCityName may be optional, is a private address city of an employee, and may be based on datatype GDT: LANGUAGEINDEPENDENT_MEDIUM_Name. EmployeePrivateAddressStateCode may be optional, is a region (e.g., federal, state, county) of a private employee address, and may be based on datatype GDT: RegionCode. EmployeePrivateAddressCountryCode may be optional, is a country of a private employee address, and may be based on datatype GDT: CountryCode. EmployeePrivateAddressStreetPostalCode may be optional, is a postal code for the street of an employee private address, and may be based on datatype GDT: PostalCode. EmployeePrivateAddressPOBoxPostalCode may be optional, is a postal code for a post office box of an employee private address, and may be based on datatype GDT: PostalCode. EmployeePrivateAddressPOBoxID may be optional and may be based on datatype GDT: POBoxID. EmployeeOfficeAddressPhoneNumberDescription may be optional, is an office telephone number of an employee, and may be based on datatype GDT: LANGUAGEINDEPENDENT_SHORT_Description. EmployeeOfficeAddressEmailURI may be optional, is an office E-mail address of an employee, and may be based on datatype GDT: EmailURI. EmployeeOfficeAddressMobilePhoneNumberDescription may be optional, is a business mobile phone number of an employee, and may be based on datatype GDT: LANGUAGEINDEPENDENT_SHORT_Description. EmployeeOfficeAddressFaxNumberDescription may be optional, is an office fax number of an employee, and may be based on datatype GDT: LANGUAGEINDEPENDENT_SHORT_Description. EmployeeOfficeAddressBuildingID may be optional, is a building identifier of an employee office address, and may be based on datatype GDT: BuildingID. EmployeeOfficeAddressRoomID may be optional, is a room identifier of the employee office address, and may be based on datatype GDT: RoomID. EmployeeOfficeAddressInhouseMailID may be optional, is an in-house mail identifier of an employee office address, and may be based on datatype GDT: InhouseMailID. EmployeeHireDate is a date on which an employee was hired, and may be based on datatype GDT: Date. EmployeeLeavingDate is a date on which an employee left the company, and may be based on datatype GDT: Date. WorkAgreementTerminationDismissalIndicator may be optional, is an indicator that specifies whether or not a termination of a work agreement is a dismissal, and may be based on datatype GDT: Indicator. WorkAgreementTypeCode may be optional, is a type of work agreement between an employer and an employee, and may be based on datatype GDT: WorkAgreementTypeCode. WorkAgreementAdministrativeCategoryCode may be optional, is a categorization of a work agreement in accordance with administrative criteria, and may be based on datatype GDT: WorkAgreementAdministrativeCategoryCode. WorkAgreementServiceStartDate may be optional, is a hire date which may be used when calculating benefits and service credits of a rehired employee, and may be based on datatype GDT: Date. AgreedWorkingHoursRate is an agreed working time of an employee which may be expressed as a rate, and may be based on datatype GDT: AgreedWorkingHoursRate. EmploymentCompanyID may be optional, is a unique user-assigned identifier of a company, and may be based on datatype GDT: OrganisationalCentreID. EmploymentCountryCode may be optional, is a country whose laws and regulations govern employment, and may be based on datatype GDT: CountryCode. JobID is a unique identifier of a job an employee performs, and may be based on datatype GDT: JobID. OrganisationalCentreID may be optional, is a unique identifier of an organizational center to which an employee is assigned, and may be based on datatype GDT: OrganisationalCentreID. OrganisationalCentreRemoteObjectID may be based on datatype GDT: NOCONVERSION_ObjectID. CurrentIndicator may be optional, is an indicator that specifies whether a fundamental data replication request is outdated, and may be based on datatype GDT: Indicator. Status is a current status in the life cycle of an employee master data replication, and may be based on datatype BOIDT: EmployeeMasterDataReplicationRequestFundamentalDataStatus. Status/UpdateStatusCode relates to a process action that starts a replication of the Fundamental Data of an employee, and may be based on datatype GDT: UpdateStatusCode. Status/RelevanceStatusCode is a status that describes the consistency of Fundamental Data of an employee, and may be based on datatype GDT: RelevanceStatusCode. ApplicationLogItemUUID may be optional and may be based on datatype GDT: UUID.

The following specialization associations for navigation may exist: Application Log Item, to the business object Application Log/node Item, with a target cardinality of C; and Parent, to the node Root, with a target cardinality of 1; and Root, to the node Root, with a target cardinality of 1.

A Mark as Irrelevant action may be used to mark a Fundamental Data node as irrelevant. In some implementations, when marked as irrelevant, the fundamental data of an employee is not replicated to employee master data objects. In some implementations, the Mark as Irrelevant action cannot be called if the update status is successful. The Mark as Irrelevant action sets a relevance status to irrelevant.

A Process action can be used to start the replication of the Fundamental Data for a referred employee. The Process action changes master data of the employee according to the provided information. Depending on the current data of an employee, the Process action can also lead to a hire, a rehire, a transfer or a leaving of that employee. In some implementations, the Process action is not called if the processing status is finished or if the relevance status is irrelevant. Depending on the current situation for the referred employee and on scoping, the Process action might change the following business objects: Employee, Employment, Work Agreement, Position, Identity, Personnel Hiring, Personnel Transfer, and Personnel Leaving. The Process action can influence the update status as follows: if the replication of an employee is successful, the update status is set to successful; and if the replication of an employee is not successful, such as due to errors, the update status is set to failed.

A Mark as Relevant action may be used to mark a Fundamental Data node as relevant. In some implementations, the action Mark as Relevant action is not called if an update status is successful. The Mark as Relevant action can set the relevance status to relevant.

Query elements for a QueryByElements query are defined by the data type EmployeeMasterDataReplicationRequestFundamentalDataQueryByElementsQueryElements. These elements include: EmployeeID, EmployeeFirstName, EmployeeLastName, EmployeeMasterDataReplicationRequestFundamentalDataStatus, and CurrentIndicator. EmployeeMasterDataReplicationRequestFundamentalDataStatus can include EmployeeMasterDataReplicationRequestFundamentalDataStatus/UpdateStatusCode and EmployeeMasterDataReplicationRequestFundamentalDataStatus/RelevanceStatusCode. EmployeeID may be based on datatype GDT: EmployeeID. EmployeeFirstName may be based on datatype GDT: LANGUAGEINDEPENDENT_MEDIUM_Name. EmployeeLastName may be based on datatype GDT: LANGUAGEINDEPENDENT_MEDIUM_Name. EmployeeMasterDataReplicationRequestFundamentalDataStatus may be based on datatype BOIDT: EmployeeMasterDataReplicationRequestFundamentalDataStatus. EmployeeMasterDataReplicationRequestFundamentalDataStatus/UpdateStatusCode may be related to a process action that starts the replication of the Fundamental Data of an employee, and may be based on datatype GDT: UpdateStatusCode. EmployeeMasterDataReplicationRequestFundamentalDataStatus/RelevanceStatusCode is a status that describes the consistency of Fundamental Data of an employee, and may be based on datatype GDT: RelevanceStatusCode. CurrentIndicator may be based on datatype GDT: Indicator.

Figure 33:
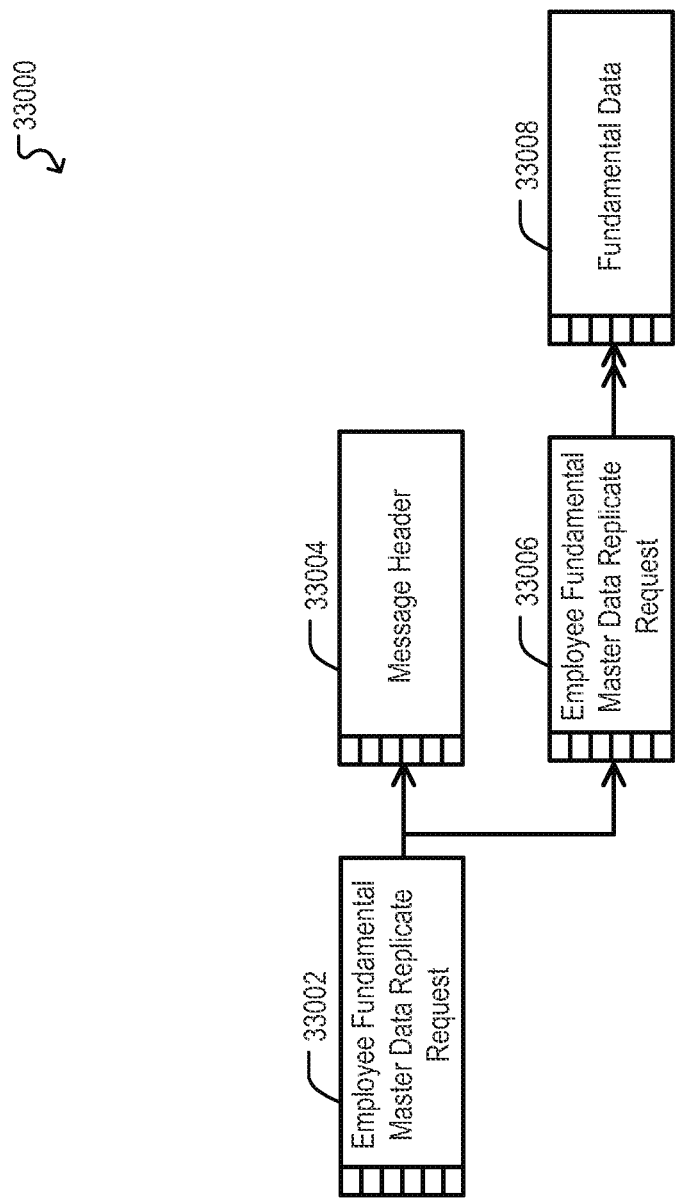
FIG. 33 depicts an example Employee Fundamental Master Data Replicate Request Message Data Type.

FIG. 33 illustrates one example logical configuration of an Employee Fundamental Master Data Replicate Request message 33000. Specifically, this figure depicts the arrangement and hierarchy of various components such as one or more levels of packages, entities, and datatypes, shown here as 33002 through 33008. As described above, packages may be used to represent hierarchy levels. Entities are discrete business elements that are used during a business transaction. Data types are used to type object entities and interfaces with a structure. For example, the Employee Fundamental Master Data Replicate Request message 33000 includes, among other things, a Fundamental Data entity 33008. Accordingly, heterogeneous applications may communicate using this consistent message configured as such.

The message type Employee Fundamental Master Data Replicate Request is derived from the business object Employee Master Data Replication Request as a leading object together with its operation signature. The Message Type Employee Fundamental Master Data Replicate Request is a request to replicate fundamental employee master data. The structure of the message type Employee Fundamental Master Data Replicate Request is determined by the message data type EmployeeFundamentalMasterDataReplicateRequestMessage. The EmployeeFundamentalMasterDataReplicateRequestMessage data type includes the MESSAGEHEADER package and the EMPLOYEEFUNDAMENTALMASTERDATAREPLICATEREQUEST package. The package MESSAGEHEADER includes the sub-packages Party and Business Scope and the MessageHeader entity. MessageHeader is typed by BusinessDocumentMessageHeader.

The package EMPLOYEEFUNDAMENTALMASTERDATAREPLICATEREQUEST includes the entity EmployeeFundamentalMasterDataReplicateRequest. EmployeeFundamentalMasterDataReplicateRequest includes the following non-node elements: OrganisationalCentreSourceBusinessSystemIntermediateDocumentLogicalSystemID, BusinessDocumentFileName, and BusinessDocumentFileCreationDate. OrganisationalCentreSourceBusinessSystemIntermediateDocumentLogicalSystemID may have a multiplicity of 0 . . . 1 and may be based on datatype BGDT:IntermediateDocumentLogicalSystemID BusinessDocumentFileName may have a multiplicity of 0 . . . 1 and may be based on datatype CDT:LANGUAGEINDEPENDENT_MEDIUM_Name. BusinessDocumentFileCreationDate may have a multiplicity of 0 . . . 1 and may be based on datatype CDT:Date. EmployeeFundamentalMasterDataReplicateRequest includes the FundamentalData node element in a 1:N cardinality relationship.

The package EMPLOYEEFUNDAMENTALMASTERDATAREPLICATEREQUEST includes the entity FundamentalData. FundamentalData includes the following non-node elements: EmployeeID, EmployeeFirstName, EmployeeLastName, EmployeeMiddleName, EmployeeFormOfAddressCode, EmployeeAcademicTitleCode, EmployeeGenderCode, EmployeeBirthDate, EmployeeBirthPlaceName, EmployeeMaritalStatusCode, EmployeeNationalityCode, EmployeePrivateAddressPhoneNumber, EmployeePrivateAddressEmailURI, EmployeePrivateAddressMobilePhoneNumber, EmployeePrivateAddressHouseID, EmployeePrivateAddressStreetName, EmployeePrivateAddressCityName, EmployeePrivateAddressStateCode, EmployeePrivateAddressCountryCode, EmployeePrivateAddressStreetPostalCode, EmployeePrivateAddressPOBoxPostalCode, EmployeePrivateAddressPOBoxID, EmployeeOfficeAddressPhoneNumber, EmployeeOfficeAddressEmailURI, EmployeeOfficeAddressMobilePhoneNumber, EmployeeOfficeAddressFaxNumber, EmployeeOfficeAddressBuildingID, EmployeeOfficeAddressRoomID, EmployeeOfficeAddressInhouseMailID, EmployeeHireDate, EmployeeLeavingDate, WorkAgreementTerminationDismissalIndicator, WorkAgreementTypeCode, WorkAgreementAdministrativeCategoryCode, WorkAgreementServiceStartDate, AgreedWorkingHoursRate, EmploymentCountryCode, JobID, and OrganisationalCentreRemoteObjectID.

EmployeeID may have a multiplicity of 1 and may be based on datatype BGDT:EmployeeID. EmployeeFirstName may have a multiplicity of 0 . . . 1 and may be based on datatype CDT:LANGUAGEINDEPENDENT_MEDIUM_Name. EmployeeLastName may have a multiplicity of 0 . . . 1 and may be based on datatype CDT:LANGUAGEINDEPENDENT_MEDIUM_Name. EmployeeMiddleName may have a multiplicity of 0 . . . 1 and may be based on datatype CDT:LANGUAGEINDEPENDENT_MEDIUM_Name. EmployeeFormOfAddressCode may have a multiplicity of 0 . . . 1 and may be based on datatype BGDT:FormOfAddressCode. EmployeeAcademicTitleCode may have a multiplicity of 0 . . . 1 and may be based on datatype BGDT:AcademicTitleCode. EmployeeGenderCode may have a multiplicity of 0 . . . 1 and may be based on datatype BGDT:GenderCode. EmployeeBirthDate may have a multiplicity of 0 . . . 1 and may be based on datatype CDT:Date. EmployeeBirthPlaceName may have a multiplicity of 0 . . . 1 and may be based on datatype CDT:LANGUAGEINDEPENDENT_MEDIUM_Name. EmployeeMaritalStatusCode may have a multiplicity of 0 . . . 1 and may be based on datatype BGDT:MaritalStatusCode. EmployeeNationalityCode may have a multiplicity of 0 . . . 1 and may be based on datatype BGDT:CountryCode. EmployeePrivateAddressPhoneNumber may have a multiplicity of 0 . . . 1 and may be based on datatype BGDT:LANGUAGEINDEPENDENT_SHORT_Description. EmployeePrivateAddressEmailURI may have a multiplicity of 0 . . . 1 and may be based on datatype BGDT:EmailURI. EmployeePrivateAddressMobilePhoneNumber may have a multiplicity of 0 . . . 1 and may be based on datatype BGDT:LANGUAGEINDEPENDENT_SHORT_Description. EmployeePrivateAddressHouseID may have a multiplicity of 0 . . . 1 and may be based on datatype BGDT:HouseID. EmployeePrivateAddressStreetName may have a multiplicity of 0 . . . 1 and may be based on datatype BGDT:StreetName. EmployeePrivateAddressCityName may have a multiplicity of 0 . . . 1 and may be based on datatype CDT:LANGUAGEINDEPENDENT_MEDIUM_Name. EmployeePrivateAddressStateCode may have a multiplicity of 0 . . . 1 and may be based on datatype BGDT:RegionCode. EmployeePrivateAddressCountryCode may have a multiplicity of 0 . . . 1 and may be based on datatype BGDT:CountryCode. EmployeePrivateAddressStreetPostalCode may have a multiplicity of 0 . . . 1 and may be based on datatype BGDT:PostalCode. EmployeePrivateAddressPOBoxPostalCode may have a multiplicity of 0 . . . 1 and may be based on datatype BGDT:PostalCode. EmployeePrivateAddressPOBoxID may have a multiplicity of 0 . . . 1 and may be based on datatype BGDT:POBoxID. EmployeeOfficeAddressPhoneNumber may have a multiplicity of 0 . . . 1 and may be based on datatype BGDT:LANGUAGEINDEPENDENT_SHORT_Description.

EmployeeOfficeAddressEmailURI may have a multiplicity of 0 . . . 1 and may be based on datatype BGDT:EmailURI.

EmployeeOfficeAddressMobilePhoneNumber may have a multiplicity of 0 . . . 1 and may be based on datatype BGDT: LANGUAGEINDEPENDENT_SHORT_Description. EmployeeOfficeAddressFaxNumber may have a multiplicity of 0 . . . 1 and may be based on datatype BGDT:LANGUAGE-INDEPENDENT_SHORT_Description. EmployeeOfficeAddressBuildingID may have a multiplicity of 0 . . . 1 and may be based on datatype BGDT:BuildingID. EmployeeOfficeAddressRoomID may have a multiplicity of 0 . . . 1 and may be based on datatype BGDT:RoomID EmployeeOfficeAddressInhouseMailID may have a multiplicity of 0 . . . 1 and may be based on datatype BGDT:InhouseMailID. EmployeeHireDate may have a multiplicity of 0 . . . 1 and may be based on datatype CDT:Date. EmployeeLeavingDate may have a multiplicity of 1 and may be based on datatype CDT: Date. WorkAgreementTerminationDismissalIndicator may have a multiplicity of 1 and may be based on datatype CDT: Indicator. WorkAgreementTypeCode may have a multiplicity of 0 . . . 1 and may be based on datatype BGDT:WorkAgreementTypeCode. WorkAgreementAdministrativeCategoryCode may have a multiplicity of 0 . . . 1 and may be based on datatype BGDT:WorkAgreementAdministrativeCategoryCode. WorkAgreementServiceStartDate may have a multiplicity of 0 . . . 1 and may be based on datatype CDT:Date. AgreedWorkingHoursRate may have a multiplicity of 0 . . . 1 and may be based on datatype AGDT:AgreedWorkingHoursRate. EmploymentCountryCode may have a multiplicity of 0 . . . 1 and may be based on datatype BGDT: CountryCode. JobID may have a multiplicity of 0 . . . 1 and may be based on datatype BGDT:JobID. OrganisationalCentreRemoteObjectID may have a multiplicity of 1 and may be based on datatype BGDT:NOCONVERSION_ObjectID.

FIGS. 34-1 through 34-9 show an example configuration of an Element Structure that includes an EmployeeFundamentalMasterDataReplicateRequest 34000 node element grouping. Specifically, these figures depict the arrangement and hierarchy of various components such as one or more levels of node element groupings, entities, and datatypes, shown here as 34000 through 34278. As described above, node element groupings may be used to represent hierarchy levels. Entities are discrete business elements that are used during a business transaction. Data types are used to type object entities and interfaces with a structure. For example, the EmployeeFundamentalMasterDataReplicateRequest 34000 includes, among other things, an EmployeeFundamentalMasterDataReplicateRequest 34002. Accordingly, heterogeneous applications may communicate using this consistent message configured as such. The EmployeeFundamentalMasterDataReplicateRequest 34000 node element grouping is an EmployeeFundamentalMasterDataReplicateRequestMessage 34004 data type. The EmployeeFundamentalMasterDataReplicateRequest 34000 node element grouping includes an EmployeeFundamentalMasterDataReplicateRequest 34002 entity. The EmployeeFundamentalMasterDataReplicateRequest 34000 node element grouping includes various node element groupings, namely a MESSAGEHEADER 34006 and an EMPLOYEEFUNDAMENTALMASTERDATAREPLICATEREQUEST 34014.

The MESSAGEHEADER 34006 node element grouping is a BusinessDocumentMessageHeader 34012 data type. The MESSAGEHEADER 34006 node element grouping includes a MessageHeader 34008 entity.

The MessageHeader 34008 entity has a cardinality of 1 34010 meaning that for each instance of the MESSAGEHEADER 34006 node element grouping there is one MessageHeader 34008 entity.

The EMPLOYEEFUNDAMENTALMASTERDATAREPLICATEREQUEST 34014 node element grouping is an EmployeeFundamentalMasterDataReplicateRequest 34020 data type. The EMPLOYEEFUNDAMENTALMASTERDATAREPLICATEREQUEST 34014 node element grouping includes an EmployeeFundamentalMasterDataReplicateRequest 34016 entity.

The EmployeeFundamentalMasterDataReplicateRequest 34016 entity has a cardinality of 1 34018 meaning that for each instance of the EMPLOYEEFUNDAMENTALMASTERDATAREPLICATEREQUEST 34014 node element grouping there is one EmployeeFundamentalMasterDataReplicateRequest 34016 entity. The EmployeeFundamentalMasterDataReplicateRequest 34016 entity includes various attributes, namely an OrganisationalCentreSourceBusinessSystemIntermediateDocumentLogicalSystemID 34022, a BusinessDocumentFileName 34028 and a BusinessDocumentFileCreationDate 34034. The EmployeeFundamentalMasterDataReplicateRequest 34016 entity includes a FundamentalData 34040 subordinate entity.

The OrganisationalCentreSourceBusinessSystemIntermediateDocumentLogicalSystemID 34022 attribute is an IntermediateDocumentLogicalSystemID 34026 data type. The OrganisationalCentreSourceBusinessSystemIntermediateDocumentLogicalSystemID 34022 attribute has a cardinality of 0 . . . 1 34024 meaning that for each instance of the EmployeeFundamentalMasterDataReplicateRequest 34016 entity there may be one OrganisationalCentreSourceBusinessSystemIntermediateDocumentLogicalSystemID 34022 attribute.

The BusinessDocumentFileName 34028 attribute is a LANGUAGEINDEPENDENT_MEDIUM_Name 34032 data type. The BusinessDocumentFileName 34028 attribute has a cardinality of 0 . . . 1 34030 meaning that for each instance of the EmployeeFundamentalMasterDataReplicateRequest 34016 entity there may be one BusinessDocumentFileName 34028 attribute.

The BusinessDocumentFileCreationDate 34034 attribute is a Date 34038 data type. The BusinessDocumentFileCreationDate 34034 attribute has a cardinality of 0 . . . 1 34036 meaning that for each instance of the EmployeeFundamentalMasterDataReplicateRequest 34016 entity there may be one BusinessDocumentFileCreationDate 34034 attribute.

The FundamentalData 34040 entity has a cardinality of 1 . . . N 34042 meaning that for each instance of the EmployeeFundamentalMasterDataReplicateRequest 34016 entity there are one or more FundamentalData 34040 entities. The FundamentalData 34040 entity includes various attributes, namely an EmployeeID 34046, an EmployeeFirstName 34052, an EmployeeLastName 34058, an EmployeeMiddleName 34064, an EmployeeFormOfAddressCode 34070, an EmployeeAcademicTitleCode 34076, an EmployeeGenderCode 34082, an EmployeeBirthDate 34088, an EmployeeBirthPlaceName 34094, an EmployeeMaritalStatusCode 34100, an EmployeeNationalityCode 34106, an EmployeePrivateAddressPhoneNumber 34112, an EmployeePrivateAddressEmailURI 34118, an EmployeePrivateAddressMobilePhoneNumber 34124, an EmployeePrivateAddressHouseID 34130, an EmployeePrivateAddressStreetName 34136, an EmployeePrivateAddressCityName 34142, an EmployeePrivateAddressStateCode 34148, an EmployeePrivateAddressCountryCode 34154, an EmployeePrivateAddressStreetPostalCode 34160, an EmployeePrivateAddressPOBoxPostalCode 34166, an EmployeePrivateAddressPOBoxID 34172, an EmployeeOfficeAddressPhoneNumber 34178, an EmployeeOfficeAddressEmailURI 34184, an EmployeeOfficeAddressMobilePhoneNumber 34190, an EmployeeOfficeAddressFaxNumber 34196, an EmployeeOfficeAddressBuildingID 34202, an EmployeeOfficeAddressRoomID 34208, an EmployeeOfficeAddressInhouseMailID 34214, an EmployeeHireDate 34220, an EmployeeLeavingDate 34226, a WorkAgreementTerminationDismissalIndicator 34232, a WorkAgreementTypeCode 34238, a WorkAgreementAdministrativeCategoryCode 34244, a WorkAgreementServiceStartDate 34250, an AgreedWorkingHoursRate 34256, an EmploymentCountryCode 34262, a JobID 34268 and an OrganisationalCentreRemoteObjectID 34274.

The EmployeeID 34046 attribute is an EmployeeID 34050 data type. The EmployeeID 34046 attribute has a cardinality of 1 34048 meaning that for each instance of the FundamentalData 34040 entity there is one EmployeeID 34046 attribute.

The EmployeeFirstName 34052 attribute is a LANGUAGEINDEPENDENT_MEDIUM_Name 34056 data type. The EmployeeFirstName 34052 attribute has a cardinality of 0 . . . 1 34054 meaning that for each instance of the FundamentalData 34040 entity there may be one EmployeeFirstName 34052 attribute.

The EmployeeLastName 34058 attribute is a LANGUAGEINDEPENDENT_MEDIUM_Name 34062 data type. The EmployeeLastName 34058 attribute has a cardinality of 0 . . . 1 34060 meaning that for each instance of the FundamentalData 34040 entity there may be one EmployeeLastName 34058 attribute.

The EmployeeMiddleName 34064 attribute is a LANGUAGEINDEPENDENT_MEDIUM_Name 34068 data type. The EmployeeMiddleName 34064 attribute has a cardinality of 0 . . . 1 34066 meaning that for each instance of the FundamentalData 34040 entity there may be one EmployeeMiddleName 34064 attribute.

The EmployeeFormOfAddressCode 34070 attribute is a FormOfAddressCode 34074 data type. The EmployeeFormOfAddressCode 34070 attribute has a cardinality of 0 . . . 1 34072 meaning that for each instance of the FundamentalData 34040 entity there may be one EmployeeFormOfAddressCode 34070 attribute.

The EmployeeAcademicTitleCode 34076 attribute is an AcademicTitleCode 34080 data type. The EmployeeAcademicTitleCode 34076 attribute has a cardinality of 0 . . . 1 34078 meaning that for each instance of the FundamentalData 34040 entity there may be one EmployeeAcademicTitleCode 34076 attribute.

The EmployeeGenderCode 34082 attribute is a GenderCode 34086 data type. The EmployeeGenderCode 34082 attribute has a cardinality of 0 . . . 1 34084 meaning that for each instance of the FundamentalData 34040 entity there may be one EmployeeGenderCode 34082 attribute.

The EmployeeBirthDate 34088 attribute is a Date 34092 data type. The EmployeeBirthDate 34088 attribute has a cardinality of 0 . . . 1 34090 meaning that for each instance of the FundamentalData 34040 entity there may be one EmployeeBirthDate 34088 attribute.

The EmployeeBirthPlaceName 34094 attribute is a LANGUAGEINDEPENDENT_MEDIUM_Name 34098 data type. The EmployeeBirthPlaceName 34094 attribute has a cardinality of 0 . . . 1 34096 meaning that for each instance of the FundamentalData 34040 entity there may be one EmployeeBirthPlaceName 34094 attribute.

The EmployeeMaritalStatusCode 34100 attribute is a MaritalStatusCode 34104 data type. The EmployeeMaritalStatusCode 34100 attribute has a cardinality of 0 . . . 1 34102 meaning that for each instance of the FundamentalData 34040 entity there may be one EmployeeMaritalStatusCode 34100 attribute.

The EmployeeNationalityCode 34106 attribute is a CountryCode 34110 data type. The EmployeeNationalityCode 34106 attribute has a cardinality of 0 . . . 1 34108 meaning that for each instance of the FundamentalData 34040 entity there may be one EmployeeNationalityCode 34106 attribute.

The EmployeePrivateAddressPhoneNumber 34112 attribute is a LANGUAGEINDEPENDENT_SHORT_Description 34116 data type. The EmployeePrivateAddressPhoneNumber 34112 attribute has a cardinality of 0 . . . 1 34114 meaning that for each instance of the FundamentalData 34040 entity there may be one EmployeePrivateAddressPhoneNumber 34112 attribute.

The EmployeePrivateAddressEmailURI 34118 attribute is an EmailURI 34122 data type. The EmployeePrivateAddressEmailURI 34118 attribute has a cardinality of 0 . . . 1 34120 meaning that for each instance of the FundamentalData 34040 entity there may be one EmployeePrivateAddressEmailURI 34118 attribute.

The EmployeePrivateAddressMobilePhoneNumber 34124 attribute is a LANGUAGEINDEPENDENT_ SHORT_ Description 34128 data type. The EmployeePrivateAddressMobilePhoneNumber 34124 attribute has a cardinality of 0 . . . 1 34126 meaning that for each instance of the FundamentalData 34040 entity there may be one EmployeePrivateAddressMobilePhoneNumber 34124 attribute.

The EmployeePrivateAddressHouseID 34130 attribute is a HouseID 34134 data type. The EmployeePrivateAddressHouseID 34130 attribute has a cardinality of 0 . . . 1 34132 meaning that for each instance of the FundamentalData 34040 entity there may be one EmployeePrivateAddressHouseID 34130 attribute.

The EmployeePrivateAddressStreetName 34136 attribute is a StreetName 34140 data type. The EmployeePrivateAddressStreetName 34136 attribute has a cardinality of 0 . . . 1 34138 meaning that for each instance of the FundamentalData 34040 entity there may be one EmployeePrivateAddressStreetName 34136 attribute.

The EmployeePrivateAddressCityName 34142 attribute is a LANGUAGEINDEPENDENT_MEDIUM_Name 34146 data type. The EmployeePrivateAddressCityName 34142 attribute has a cardinality of 0 . . . 1 34144 meaning that for each instance of the FundamentalData 34040 entity there may be one EmployeePrivateAddressCityName 34142 attribute.

The EmployeePrivateAddressStateCode 34148 attribute is a RegionCode 34152 data type. The EmployeePrivateAddressStateCode 34148 attribute has a cardinality of 0 . . . 1 34150 meaning that for each instance of the FundamentalData 34040 entity there may be one EmployeePrivateAddressStateCode 34148 attribute.

The EmployeePrivateAddressCountryCode 34154 attribute is a CountryCode 34158 data type. The EmployeePrivateAddressCountryCode 34154 attribute has a cardinality of 0 . . . 1 34156 meaning that for each instance of the FundamentalData 34040 entity there may be one EmployeePrivateAddressCountryCode 34154 attribute.

The EmployeePrivateAddressStreetPostalCode 34160 attribute is a PostalCode 34164 data type. The EmployeePrivateAddressStreetPostalCode 34160 attribute has a cardinality of 0 . . . 1 34162 meaning that for each instance of the FundamentalData 34040 entity there may be one EmployeePrivateAddressStreetPostalCode 34160 attribute.

The EmployeePrivateAddressPOBoxPostalCode 34166 attribute is a PostalCode 34170 data type. The EmployeePrivateAddressPOBoxPostalCode 34166 attribute has a cardinality of 0 . . . 1 34168 meaning that for each instance of the FundamentalData 34040 entity there may be one EmployeePrivateAddressPOBoxPostalCode 34166 attribute.

The EmployeePrivateAddressPOBoxID 34172 attribute is a POBoxID 34176 data type. The EmployeePrivateAddressPOBoxID 34172 attribute has a cardinality of 0 . . . 1 34174 meaning that for each instance of the FundamentalData 34040 entity there may be one EmployeePrivateAddressPOBoxID 34172 attribute.

The EmployeeOfficeAddressPhoneNumber 34178 attribute is a LANGUAGEINDEPENDENT_SHORT_Description 34182 data type. The EmployeeOfficeAddressPhoneNumber 34178 attribute has a cardinality of 0 . . . 1 34180 meaning that for each instance of the FundamentalData 34040 entity there may be one EmployeeOfficeAddressPhoneNumber 34178 attribute.

The EmployeeOfficeAddressEmailURI 34184 attribute is an EmailURI 34188 data type. The EmployeeOfficeAddressEmailURI 34184 attribute has a cardinality of 0 . . . 1 34186 meaning that for each instance of the FundamentalData 34040 entity there may be one EmployeeOfficeAddressEmailURI 34184 attribute.

The EmployeeOfficeAddressMobilePhoneNumber 34190 attribute is a LANGUAGEINDEPENDENT_SHORT_Description 34194 data type. The EmployeeOfficeAddressMobilePhoneNumber 34190 attribute has a cardinality of 0 . . . 1 34192 meaning that for each instance of the FundamentalData 34040 entity there may be one EmployeeOfficeAddressMobilePhoneNumber 34190 attribute.

The EmployeeOfficeAddressFaxNumber 34196 attribute is a LANGUAGEINDEPENDENT_SHORT_Description 34200 data type. The EmployeeOfficeAddressFaxNumber 34196 attribute has a cardinality of 0 . . . 1 34198 meaning that for each instance of the FundamentalData 34040 entity there may be one EmployeeOfficeAddressFaxNumber 34196 attribute.

The EmployeeOfficeAddressBuildingID 34202 attribute is a BuildingID 34206 data type. The EmployeeOfficeAddressBuildingID 34202 attribute has a cardinality of 0 . . . 1 34204 meaning that for each instance of the FundamentalData 34040 entity there may be one EmployeeOfficeAddressBuildingID 34202 attribute.

The EmployeeOfficeAddressRoomID 34208 attribute is a RoomID 34212 data type. The EmployeeOfficeAddressRoomID 34208 attribute has a cardinality of 0 . . . 1 34210 meaning that for each instance of the FundamentalData 34040 entity there may be one EmployeeOfficeAddressRoomID 34208 attribute.

The EmployeeOfficeAddressInhouseMailID 34214 attribute is an InhouseMailID 34218 data type. The EmployeeOfficeAddressInhouseMailID 34214 attribute has a cardinality of 0 . . . 1 34216 meaning that for each instance of the FundamentalData 34040 entity there may be one EmployeeOfficeAddressInhouseMailID 34214 attribute.

The EmployeeHireDate 34220 attribute is a Date 34224 data type. The EmployeeHireDate 34220 attribute has a cardinality of 0 . . . 1 34222 meaning that for each instance of the FundamentalData 34040 entity there may be one EmployeeHireDate 34220 attribute.

The EmployeeLeavingDate 34226 attribute is a Date 34230 data type. The EmployeeLeavingDate 34226 attribute has a cardinality of 1 34228 meaning that for each instance of the FundamentalData 34040 entity there is one EmployeeLeavingDate 34226 attribute.

The WorkAgreementTerminationDismissalIndicator 34232 attribute is an Indicator 34236 data type. The WorkAgreementTerminationDismissalIndicator 34232 attribute has a cardinality of 1 34234 meaning that for each instance of the FundamentalData 34040 entity there is one WorkAgreementTerminationDismissalIndicator 34232 attribute.

The WorkAgreementTypeCode 34238 attribute is a WorkAgreementTypeCode 34242 data type. The WorkAgreementTypeCode 34238 attribute has a cardinality of 0 . . . 1 34240 meaning that for each instance of the FundamentalData 34040 entity there may be one WorkAgreementTypeCode 34238 attribute.

The WorkAgreementAdministrativeCategoryCode 34244 attribute is a WorkAgreementAdministrativeCategoryCode 34248 data type. The WorkAgreementAdministrativeCategoryCode 34244 attribute has a cardinality of 0 . . . 1 34246 meaning that for each instance of the FundamentalData 34040 entity there may be one WorkAgreementAdministrativeCategoryCode 34244 attribute.

The WorkAgreementServiceStartDate 34250 attribute is a Date 34254 data type. The WorkAgreementServiceStartDate 34250 attribute has a cardinality of 0 . . . 1 34252 meaning that for each instance of the FundamentalData 34040 entity there may be one WorkAgreementServiceStartDate 34250 attribute.

The AgreedWorkingHoursRate 34256 attribute is an AgreedWorkingHoursRate 34260 data type. The AgreedWorkingHoursRate 34256 attribute has a cardinality of 0 . . . 1 34258 meaning that for each instance of the FundamentalData 34040 entity there may be one AgreedWorkingHoursRate 34256 attribute.

The EmploymentCountryCode 34262 attribute is a CountryCode 34266 data type. The EmploymentCountryCode 34262 attribute has a cardinality of 0 . . . 1 34264 meaning that for each instance of the FundamentalData 34040 entity there may be one EmploymentCountryCode 34262 attribute.

The JobID 34268 attribute is a JobID 34272 data type. The JobID 34268 attribute has a cardinality of 0 . . . 1 34270 meaning that for each instance of the FundamentalData 34040 entity there may be one JobID 34268 attribute.

The OrganisationalCentreRemoteObjectID 34274 attribute is a NOCONVERSION_ObjectID 34278 data type. The OrganisationalCentreRemoteObjectID 34274 attribute has a cardinality of 1 34276 meaning that for each instance of the FundamentalData 34040 entity there is one OrganisationalCentreRemoteObjectID 34274 attribute.

Figure 35:
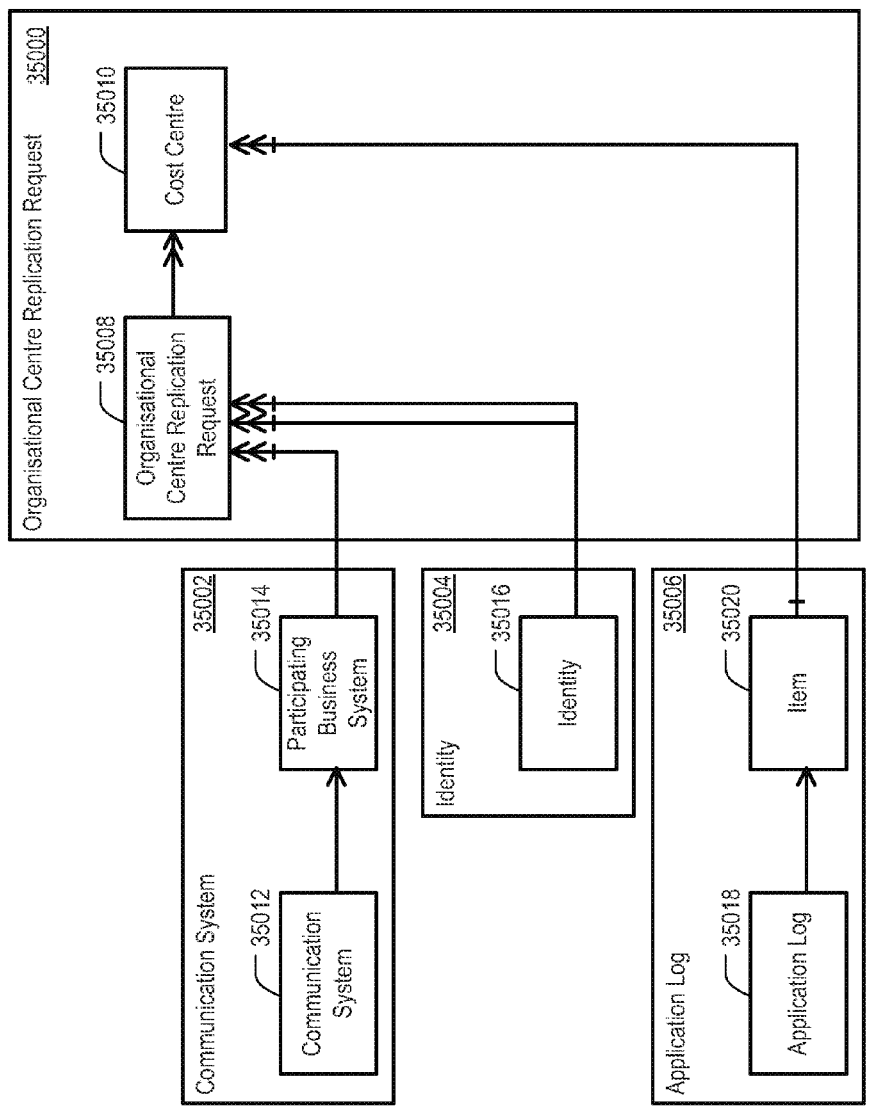
FIG. 35 depicts an example Organisational Centre Replication Request Object Model.

FIG. 35 illustrates an example object model for an Organisational Centre Replication Request business object 35000. Specifically, the object model depicts interactions among various components of the Organisational Centre Replication Request business object 35000, as well as external components that interact with the Organisational Centre Replication Request business object 35000 (shown here as 35002 through 35006 and 35012 through 35020). The Organisational Centre Replication Request business object 35000 includes elements 35008 through 35010. The elements 35008 through 35010 can be hierarchical, as depicted. For example, the Organisational Centre Replication Request entity 35008 hierarchically includes a Cost Centre entity 35010. Some or all of the entities 35008 through 35010 can correspond to packages and/or entities in the message data types described below.

The business object Organisational Centre Replication Request is a request to replicate one or more organizational centers. The Organisational Centre Replication Request business object belongs to the process component Organisational Management. The Organisational Centre Replication Request business object belongs to the deployment unit Foundation. The Organisational Centre Replication Request can be created based on organizational management data from a source, such as a system or a file, using an inbound interface.

When an Organisational Centre Replication Request is processed, it creates or updates organizational centers.

An example Organisational Centre Replication Request can include the following: in a root node: BusinessDocumentFileName: OrganisationalCentreData2010-08-11.xlsx, BusinessDocumentFileCreationDate: 2010-08-11, ProcessingStatusCode: Not Started, and ConsistencyStatusCode: Not Checked; and in a CostCentre node: ValidityPeriod: 0 until ID: 22415, Name: MechanicsQuality, and AssignedManagerEmployeeID: 34681.

An Organisational Centre Replication Request includes a root which includes information about the request itself, such as a creation time and creation data source, and a processing status, and a cost centre node which includes information about a cost centre which is to be replicated. The business object Organisational Centre Replication Request has an object category of Master Data Object and a technical category of Standard Business Object.

The elements located directly at the node Root are defined by the data type OrganisationalCentreReplicationRequestElements. These elements include: UUID, BusinessDocumentFileName, BusinessDocumentFileCreationDate, BusinessDocumentFileSourceBusinessSystemUUID, BusinessDocumentMessageID, Status, and SystemAdministrativeData. Status may include Status/ProcessingStatusCode. UUID may be an alternative key, is a universally unique identifier of an organisational center replication request, and may be based on datatype GDT: UUID. BusinessDocumentFileName may be optional, is a name of a file which was used to create a business document, and may be based on datatype GDT: LANGUAGEINDEPENDENT_MEDIUM_Name. A business document file may be, for example, a spreadsheet file transferred via a migration workbench into a request object. BusinessDocumentFileCreationDate may be optional, is a creation date of a file which was used to create a business document, may be based on datatype GDT: Date, and represents a date when a snapshot of has data been taken. BusinessDocumentFileSourceBusinessSystemUUID may be optional, is a unique universal identifier of a business system which is a source of a business document, and may be based on datatype GDT: UUID. BusinessDocumentMessageID may be optional, is an identifier of a message which was used to create a business document, and may be based on datatype GDT: BusinessDocumentMessageID. Status is a current status in the life cycle of an organisational center replication request, and may be based on datatype BOIDT: OrganisationalCentreReplicationRequestStatus. Status/ProcessingStatusCode may be based on datatype GDT: ProcessingStatusCode. SystemAdministrativeData includes information about who created or changed an instance of organisational center replication request and when the creation or change occurred, and may be based on datatype GDT: SystemAdministrativeData.

The following composition relationships to subordinate nodes exist: Cost Centre, with a cardinality of 1:N. The following inbound association relationship may exist: BusinessDocumentFileSourceBusinessSystem, from the business object Communication System/node Participating Business System, with a cardinality of 1:CN, which represents a business system which is a source of a business document; Creation Identity, from the business object Identity/node Identity, with a cardinality of 1:CN, which is an association from an identity that created an Organisational Centre Replication Request; and Last Change Identity, from the business object Identity/node Identity, with a cardinality of 1:CN, which is an association from an identity that was a last changer of an Organisational Centre Replication Request.

A DetermineProcessingStatus action can determine a ProcessingStatus of an Organisational Centre Replication Request, taking into account the UpdateStatus and the RelevanceStatus of a cost centre node. Status changes resulting from the DetermineProcessingStatus action can include: setting the ProcessingStatus to Started if all cost centre nodes are in UpdateStatus Not Started; setting the ProcessingStatus to be Finished if all cost centre nodes are in UpdateStatus Successful or in RelevanceStatus Irrelevant; and, in other cases, setting the ProcessingStatus to be In Process.

Query elements for a Query by Elements query are defined by the data type OrganisationalCentreReplicationRequestElementsQueryElements. These elements include: BusinessDocumentFileName, BusinessDocumentMessageID, BusinessDocumentFileSourceBusinessSystemUUID, CreationDateTime, LastChangeDateTime, ProcessingStatusCode, and SearchText.

BusinessDocumentFileName may be based on datatype GDT: LANGUAGEINDEPENDENT_MEDIUM_Name. BusinessDocumentMessageID may be based on datatype GDT: BusinessDocumentMessageID. BusinessDocumentFileSourceBusinessSystemUUID may be based on datatype GDT: UUID. CreationDateTime may be based on datatype GDT: GLOBAL_DateTime. LastChangeDateTime may be based on datatype GDT: GLOBAL_DateTime. ProcessingStatusCode may be based on datatype GDT: ProcessingStatusCode. SearchText may be based on datatype GDT: SearchText.

Cost Centre represents a cost center to be created or updated. Cost Centre may be time dependent on Validity Period. Cost Centre may include a name, a validity period and a responsible manager. The elements located directly at the node Cost Centre are defined by the data type OrganisationalCentreReplicationRequestCostCentreElements. These elements include: ValidityPeriod, RemoteObjectID, Name, CostCentreTypeCode, PostingAllowedIndicator, PlanUsageAllowedIndicator, UpperLegalOrganisationalCentreRemoteObjectID, UpperManagerialOrganisationalCentreRemoteObjectID, AssignedManagerEmployeeID, AssignedManagerEmployeeFormattedName, AssignedManagerEmployeeUserAccountID, ApplicationLogItemUUID, and Status. Status can include Status/UpdateStatusCode and Status/RelevanceStatusCode.

ValidityPeriod is a period in which a cost center exists and may be based on datatype GDT: CLOSED_DatePeriod. RemoteObjectID is an identifier for a cost centre as given by a remote system, and may be based on datatype GDT: NOCONVERSION_ObjectID. Name is a name of a cost center and may be based on datatype GDT: LANGUAGEINDEPENDENT_MEDIUM_Name. CostCentreTypeCode may be optional, categorizes a cost center on the basis of criteria selected by customers, and may be based on datatype GDT: CostCentreTypeCode. PostingAllowedIndicator may be optional, determines whether or not actual financial accounting postings are permitted against a cost center, and may be based on datatype GDT: Indicator. PlanUsageAllowedIndicator may be optional, determines whether or not planned financial accounting postings are permitted against a cost center, and may be based on datatype GDT: Indicator. UpperLegalOrganisationalCentreRemoteObjectID may be optional, is an identifier for an upper legal organizational center as given by a remote system, and may be based on datatype GDT: NOCONVERSION_ObjectID. UpperManagerialOrganisationalCentreRemoteObjectID may be optional, is an identifier for an upper managerial organizational center as given by a remote system, and may be based on datatype GDT: NOCONVERSION_ObjectID. AssignedManagerEmployeeID may be optional, is an identifier of an employee which is assigned as a manager to a cost centre, and may be based on datatype GDT: EmployeeID. AssignedManagerEmployeeFormattedName may be optional, is a fully-formatted name of an employee which is assigned as a manager to a cost centre, and may be based on datatype GDT: LANGUAGEINDEPENDENT_LONG_Name. AssignedManagerEmployeeUserAccountID may be optional, is an identifier of a user account of an employee which is assigned as a manager to a cost centre, and may be based on datatype GDT: UserAccountID. ApplicationLogItemUUID may be optional, is a universally unique identifier of an item of an application log of a last replication process, and may be based on datatype GDT: UUID. Status is a current status in a life cycle of a cost centre in an organisational center replication request, and may be based on datatype BOIDT: OrganisationalCentreReplicationRequestCostCentreStatus. Status/UpdateStatusCode may be based on datatype GDT: UpdateStatusCode. Status/RelevanceStatusCode may be based on datatype GDT: RelevanceStatusCode.

An Application Log Item inbound association relationship may exist from the business object Application Log/node Item, with a cardinality of C:CN, which represents an application log item of a last replication process. The following specialization associations for navigation may exist to the node Root: Parent, with a target cardinality of 1; and Root, with a target cardinality of 1.

A Process action can start replication of a cost center. The Process action creates or updates cost centers depending on whether a corresponding cost center already exists. In some implementations, the Process action is not called if a processing status is finished or if a relevance status is irrelevant. The Process action changes a Cost Centre business object.

The Process action can influence the update status as follows: if the replication of a cost centre is successful, the update status can be set to Successful; and if the replication of a cost centre is not successful, such as due to errors, the update status can be set to Failed.

A MarkAsIrrelevant action marks a Cost Centre node as irrelevant. When marked as irrelevant, a cost centre may not be replicated. In some implementations, an action cannot be called if the update status is successful. The MarkAsIrrelevant action can set the relevance status to irrelevant.

A MarkAsRelevant action marks a Cost Centre node as relevant. In some implementations, the MarkAsRelevant action is not called if an update status is successful. The MarkAsRelevant action can set the relevance status to relevant.

Query elements for a Query by Elements query are defined by the data type OrganisationalCentreReplicationRequestCostCentreElementsQueryElements. These elements include: RemoteObjectID, Name, AssignedManagerEmployeeID, AssignedManagerEmployeeFormattedName, AssignedManagerEmployeeUserAccountID, UpdateStatusCode, RelevanceStatusCode, and SearchText. RemoteObjectID may be based on datatype GDT: NOCONVERSION_ObjectID. Name may be based on datatype GDT: LANGUAGEINDEPENDENT_MEDIUM_Name. AssignedManagerEmployeeID may be based on datatype GDT: EmployeeID. AssignedManagerEmployeeFormattedName may be based on datatype GDT: LANGUAGE-INDEPENDENT_LONG_Name. AssignedManagerEmployeeUserAccountID may be based on datatype GDT: UserAccountID. UpdateStatusCode may be based on datatype GDT: UpdateStatusCode. RelevanceStatusCode may be based on datatype GDT: RelevanceStatusCode. SearchText may be based on datatype GDT: SearchText.

Figure 36:
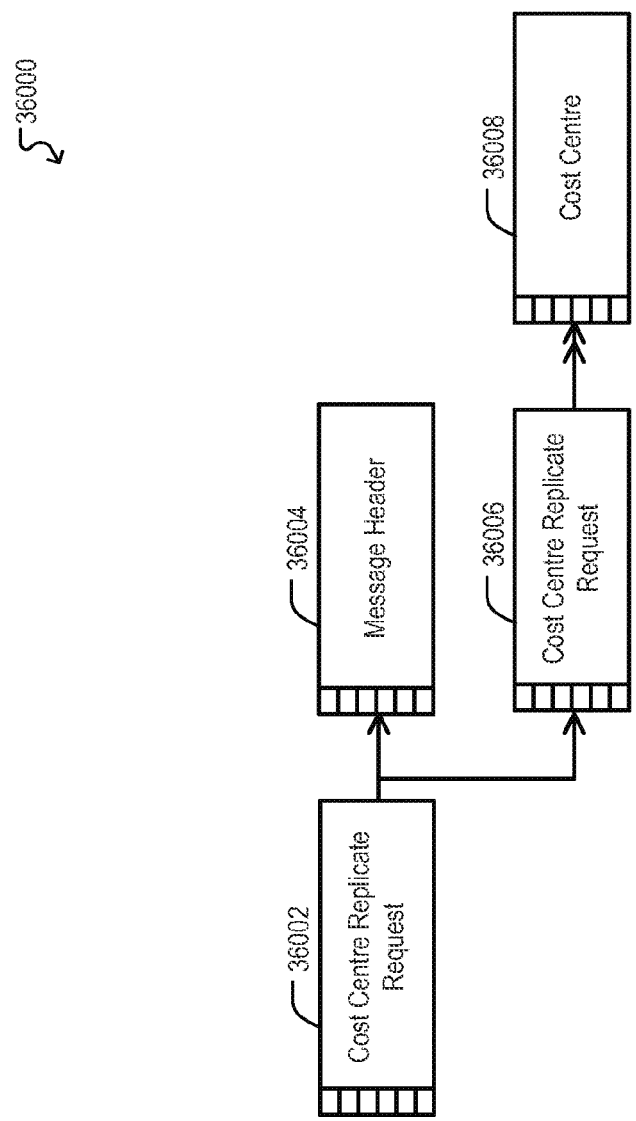
FIG. 36 depicts an example CostCentreReplicateRequest Message Data Type.

FIG. 36 illustrates one example logical configuration of a Cost Centre Replicate Request message 36000. Specifically, this figure depicts the arrangement and hierarchy of various components such as one or more levels of packages, entities, and datatypes, shown here as 36002 through 36008. As described above, packages may be used to represent hierarchy levels. Entities are discrete business elements that are used during a business transaction. Data types are used to type object entities and interfaces with a structure. For example, the Cost Centre Replicate Request message 36000 includes, among other things, a Cost Centre entity 36008. Accordingly, heterogeneous applications may communicate using this consistent message configured as such.

The message type Cost Centre Replicate Request is derived from the business object Organisational Centre Replication Request as a leading object together with its operation signature. The message type Cost Centre Replicate Request is a request to replicate cost centers. The structure of the message type Cost Centre Replicate Request is determined by the message data type CostCentreReplicateRequestMessage. The CostCentreReplicateRequestMessage message data type includes the MESSAGEHEADER package and the COSTCENTREREPLICATEREQUEST package. The package MESSAGEHEADER includes the sub-packages Party and Business Scope and the entity MessageHeader. MessageHeader is typed by BusinessDocumentMessageHeader.

The package COSTCENTREREPLICATEREQUEST includes the entity CostCentreReplicateRequest. CostCentreReplicateRequest includes the following non-node elements: BusinessDocumentFileName, BusinessDocumentFileCreationDate, and BusinessDocumentFileSource-BusinessSystemIntermediateDocumentLogicalSystemID BusinessDocumentFileName may have a multiplicity of 0 . . . 1 and may be based on datatype CDT:LANGUAGE-INDEPENDENT_MEDIUM_Name. BusinessDocumentFileCreationDate may have a multiplicity of 0 . . . 1 and may be based on datatype CDT:Date. BusinessDocumentFileSourceBusinessSystemIntermediateDocumentLogicalSystemID may have a multiplicity of 0 . . . 1, is an identifier which may be used in a message exchange area of a business system which is a source of a business document, and may be based on datatype BGDT:IntermediateDocumentLogicalSystemID. CostCentreReplicateRequest includes the node element CostCentre in a 1:N cardinality relationship.

The package COSTCENTREREPLICATEREQUEST includes the entity CostCentre. CostCentre includes the following elements: ValidityPeriod, RemoteObjectID, Name, CostCentreTypeCode, PostingAllowedIndicator, PlanUsageAllowedIndicator, UpperLegalOrganisationalCentreRemoteObjectID, UpperManagerialOrganisationalCentreRemoteObjectID, AssignedManagerEmployeeID, AssignedManagerEmployeeFormattedName, and AssignedManagerEmployeeUserAccountID.

ValidityPeriod may have a multiplicity of 0 . . . 1 and may be based on datatype AGDT:CLOSED_DatePeriod. RemoteObjectID may have a multiplicity of 0 . . . 1 and may be based on datatype BGDT:NOCONVERSION_ObjectID. Name may have a multiplicity of 0 . . . 1 and may be based on datatype CDT:LANGUAGEINDEPENDENT_MEDIUM_Name. CostCentreTypeCode may have a multiplicity of 0 . . . 1 and may be based on datatype BGDT:CostCentreTypeCode. PostingAllowedIndicator may have a multiplicity of 0 . . . 1 and may be based on datatype CDT:Indicator.

PlanUsageAllowedIndicator may have a multiplicity of 0 . . . 1 and may be based on datatype CDT:Indicator. UpperLegalOrganisationalCentreRemoteObjectID may have a multiplicity of 0 . . . 1 and may be based on datatype BGDT:NOCONVERSION_ObjectID. UpperManagerialOrganisationalCentreRemoteObjectID may have a multiplicity of 0 . . . 1 and may be based on datatype BGDT:NOCONVERSION_ObjectID. AssignedManagerEmployeeID may have a multiplicity of 0 . . . 1 and may be based on datatype BGDT:EmployeeID. AssignedManagerEmployeeFormattedName may have a multiplicity of 0 . . . 1 and may be based on datatype CDT:LANGUAGE-INDEPENDENT_LONG_Name. AssignedManagerEmployeeUserAccountID may have a multiplicity of 0 . . . 1 and may be based on datatype BGDT:UserAccountID.

FIGS. 37-1 through 37-4 show an example configuration of an Element Structure that includes a CostCentreReplicateRequest 37000 node element grouping. Specifically, these figures depict the arrangement and hierarchy of various components such as one or more levels of node element groupings, entities, and datatypes, shown here as 37000 through 37110. As described above, node element groupings may be used to represent hierarchy levels. Entities are discrete business elements that are used during a business transaction. Data types are used to type object entities and interfaces with a structure. For example, the CostCentreReplicateRequest 37000 includes, among other things, a CostCentreReplicateRequest 37002. Accordingly, heterogeneous applications may communicate using this consistent message configured as such. The CostCentreReplicateRequest 37000 node element grouping is a CostCentreReplicateRequestMessage 37004 data type. The CostCentreReplicateRequest 37000 node element grouping includes a CostCentreReplicateRequest 37002 entity. The CostCentreReplicateRequest 37000 node element grouping includes various node element groupings, namely a MESSAGEHEADER 37006 and a COSTCENTREREPLICATEREQUEST 37014.

The MESSAGEHEADER 37006 node element grouping is a BusinessDocumentMessageHeader 37012 data type. The MESSAGEHEADER 37006 node element grouping includes a MessageHeader 37008 entity.

The MessageHeader 37008 entity has a cardinality of 1 37010 meaning that for each instance of the MESSAGEHEADER 37006 node element grouping there is one MessageHeader 37008 entity.

The COSTCENTREREPLICATEREQUEST 37014 node element grouping is a CostCentreReplicateRequest 37020 data type. The COSTCENTREREPLICATEREQUEST 37014 node element grouping includes a CostCentreReplicateRequest 37016 entity.

The CostCentreReplicateRequest 37016 entity has a cardinality of 1 37018 meaning that for each instance of the COSTCENTREREPLICATEREQUEST 37014 node element grouping there is one CostCentreReplicateRequest 37016 entity. The CostCentreReplicateRequest 37016 entity includes various attributes, namely a BusinessDocumentFileName 37022, a BusinessDocumentFileCreationDate 37028 and a BusinessDocumentFileSourceBusinessSystemIntermediateDocumentLogicalSystemID 37034. The CostCentreReplicateRequest 37016 entity includes a CostCentre 37040 subordinate entity.

The BusinessDocumentFileName 37022 attribute is a LANGUAGEINDEPENDENT_MEDIUM_Name 37026 data type. The BusinessDocumentFileName 37022 attribute has a cardinality of 0 . . . 1 37024 meaning that for each instance of the CostCentreReplicateRequest 37016 entity there may be one BusinessDocumentFileName 37022 attribute.

The BusinessDocumentFileCreationDate 37028 attribute is a Date 37032 data type. The BusinessDocumentFileCreationDate 37028 attribute has a cardinality of 0 . . . 1 37030 meaning that for each instance of the CostCentreReplicateRequest 37016 entity there may be one BusinessDocumentFileCreationDate 37028 attribute.

The BusinessDocumentFileSourceBusinessSystemIntermediateDocumentLogicalSystemID 37034 attribute is an IntermediateDocumentLogicalSystemID 37038 data type. The BusinessDocumentFileSourceBusinessSystemIntermediateDocumentLogicalSystemID 37034 attribute has a cardinality of 0 . . . 1 37036 meaning that for each instance of the CostCentreReplicateRequest 37016 entity there may be one BusinessDocumentFileSourceBusinessSystemIntermediateDocumentLogicalSystemID 37034 attribute.

The CostCentre 37040 entity has a cardinality of 1 . . . N 37042 meaning that for each instance of the CostCentreReplicateRequest 37016 entity there are one or more CostCentre 37040 entities. The CostCentre 37040 entity includes various attributes, namely a ValidityPeriod 37046, a RemoteObjectID 37052, a Name 37058, a CostCentreTypeCode 37064, a PostingAllowedIndicator 37070, a PlanUsageAllowedIndicator 37076, an UpperLegalOrganisationalCentreRemoteObjectID 37082, an UpperManagerialOrganisationalCentreRemoteObjectID 37088, an AssignedManagerEmployeeID 37094, an AssignedManagerEmployeeFormattedName 37100 and an AssignedManagerEmployeeUserAccountID 37106.

The ValidityPeriod 37046 attribute is a CLOSED_DatePeriod 37050 data type. The ValidityPeriod 37046 attribute has a cardinality of 0 . . . 1 37048 meaning that for each instance of the CostCentre 37040 entity there may be one ValidityPeriod 37046 attribute.

The RemoteObjectID 37052 attribute is a NOCONVERSION_ObjectID 37056 data type. The RemoteObjectID 37052 attribute has a cardinality of 0 . . . 1 37054 meaning that for each instance of the CostCentre 37040 entity there may be one RemoteObjectID 37052 attribute.

The Name 37058 attribute is a LANGUAGEINDEPENDENT_MEDIUM_Name 37062 data type. The Name 37058 attribute has a cardinality of 0 . . . 1 37060 meaning that for each instance of the CostCentre 37040 entity there may be one Name 37058 attribute.

The CostCentreTypeCode 37064 attribute is a CostCentreTypeCode 37068 data type. The CostCentreTypeCode 37064 attribute has a cardinality of 0 . . . 1 37066 meaning that for each instance of the CostCentre 37040 entity there may be one CostCentreTypeCode 37064 attribute.

The PostingAllowedIndicator 37070 attribute is an Indicator 37074 data type. The PostingAllowedIndicator 37070 attribute has a cardinality of 0 . . . 1 37072 meaning that for each instance of the CostCentre 37040 entity there may be one PostingAllowedIndicator 37070 attribute.

The PlanUsageAllowedIndicator 37076 attribute is an Indicator 37080 data type. The PlanUsageAllowedIndicator 37076 attribute has a cardinality of 0 . . . 1 37078 meaning that for each instance of the CostCentre 37040 entity there may be one PlanUsageAllowedIndicator 37076 attribute.

The UpperLegalOrganisationalCentreRemoteObjectID 37082 attribute is a NOCONVERSION_ObjectID 37086 data type. The UpperLegalOrganisationalCentreRemoteObjectID 37082 attribute has a cardinality of 0 . . . 1 37084 meaning that for each instance of the CostCentre 37040 entity there may be one UpperLegalOrganisationalCentreRemoteObjectID 37082 attribute.

The UpperManagerialOrganisationalCentreRemoteObjectID 37088 attribute is a NOCONVERSION_ObjectID 37092 data type. The UpperManagerialOrganisationalCentreRemoteObjectID 37088 attribute has a cardinality of 0 . . . 1 37090 meaning that for each instance of the CostCentre 37040 entity there may be one UpperManagerialOrganisationalCentreRemoteObjectID 37088 attribute.

The AssignedManagerEmployeeID 37094 attribute is an EmployeeID 37098 data type. The AssignedManagerEmployeeID 37094 attribute has a cardinality of 0 . . . 1 37096 meaning that for each instance of the CostCentre 37040 entity there may be one AssignedManagerEmployeeID 37094 attribute.

The AssignedManagerEmployeeFormattedName 37100 attribute is a LANGUAGEINDEPENDENT_LONG_Name 37104 data type. The AssignedManagerEmployeeFormattedName 37100 attribute has a cardinality of 0 . . . 1 37102 meaning that for each instance of the CostCentre 37040 entity there may be one AssignedManagerEmployeeFormattedName 37100 attribute.

The AssignedManagerEmployeeUserAccountID 37106 attribute is an UserAccountID 37110 data type. The AssignedManagerEmployeeUserAccountID 37106 attribute has a cardinality of 0 . . . 1 37108 meaning that for each instance of the CostCentre 37040 entity there may be one AssignedManagerEmployeeUserAccountID 37106 attribute.

A number of implementations have been described. Nevertheless, it will be understood that various modifications may be made without departing from the spirit and scope of the disclosure. Accordingly, other implementations are within the scope of the following claims.

What is claimed is:

1. A non-transitory computer readable medium including program code for providing a message-based interface for exchanging information for employee master data replication requests, the program code, operable when executed by a processor associated with the medium, comprising:
   receiving via a message-based interface derived from a common business object model, where the common business object model includes business objects having relationships that enable derivation of message-based interfaces and message packages, the message-based interface exposing at least one service as defined in a service registry and from a heterogeneous application executing in an environment of computer systems providing message-based services, a first message for providing a request to replicate fundamental employee master data, the first message derived from the common business object model and including a first message package hierarchically organized as:
   an employee fundamental master data replicate request message entity; and
   an employee fundamental master data replicate request package comprising an employee fundamental master data replicate request entity, where the employee fundamental master data replicate request entity comprises at least one fundamental data entity, where each fundamental data entity includes an employee identifier (ID), an employee leaving date, a work agreement termination dismissal indicator and an organisational centre remote object ID; and
   processing the first message according to the hierarchical organization of the first message package, where processing the first message includes unpacking the first message package based on the common business object model; and
   sending a second message to the heterogeneous application responsive to the first message, where the second message includes a second message package derived from the common business object model to provide consistent semantics with the first message package.

2. The computer readable medium of claim 1, wherein the employee fundamental master data replicate request entity includes at least one of the following: an organisational centre source business system intermediate document logical system ID, a business document file name, and a business document file creation date.

3. The computer readable medium of claim 1, wherein each fundamental data entity further includes at least one of the following: an employee first name, an employee last name, an employee middle name, an employee form of address code, an employee academic title code, an employee gender code, an employee birth date, an employee birth place name, an employee marital status code, an employee nationality code, an employee private address phone number, an employee private address email uniform resource identifier (URI), an employee private address mobile phone number, an employee private address house ID, an employee private address street name, an employee private address city name, an employee private address state code, an employee private address country code, an employee private address street postal code, an employee private address post office (PO) box postal code, an employee private address PO box ID, an employee office address phone number, an employee office address email URI, an employee office address mobile phone number, an employee office address fax number, an employee office address building ID, an employee office address room ID, an employee office address in-house mail ID, an employee hire date, a work agreement type code, a work agreement administrative category code, a work agreement service start date, an agreed working hours rate, an employment country code, and a job ID.

4. A distributed system operating in a landscape of computer systems providing message-based services defined in a service registry, the system comprising:
   at least one processor operable to execute computer readable instructions embodied on non-transitory media;
   a graphical user interface executable by the at least one processor and comprising computer readable instructions, embedded on non-transitory, tangible media, for providing a request to replicate fundamental employee master data using a request;
   a first memory storing a user interface controller executable by the at least one processor and for processing the request and involving a first message including a first message package derived from a common business object model, where the common business object model includes business objects having relationships that enable derivation of message-based service interfaces and message packages, the first message package hierarchically organized, the hierarchical organization of the first message package including:
   an employee fundamental master data replicate request message entity; and
   an employee fundamental master data replicate request package comprising an employee fundamental master data replicate request entity, where the employee fundamental master data replicate request entity comprises at least one fundamental data entity, where each fundamental data entity includes an employee ID, an employee leaving date, a work agreement termination dismissal indicator and an organisational centre remote object ID; and a second memory, remote from the graphical user interface, storing a plurality of message-based service interfaces executable by the at least one processor and derived from the common business object model to provide consistent semantics with other messages derived from the common business object model, where one of the message-based service interfaces is operable to process the first message via the service interface based on the hierarchical organization of the first message package, where processing the first message includes unpacking the first message package based on the first message package's structure and the first message package's derivation from the common business object model.

5. The distributed system of claim 4, wherein the first memory is remote from the graphical user interface.

6. The distributed system of claim 4, wherein the first memory is remote from the second memory.

* * * * *